(12) United States Patent
Watanuki et al.

(10) Patent No.: US 7,643,447 B2
(45) Date of Patent: Jan. 5, 2010

(54) MOBILE NODE, MOBILE AGENT AND NETWORK SYSTEM

(75) Inventors: Tatsuya Watanuki, Yokohama (JP); Tetsuo Oura, Yokohama (JP); Sunao Sawada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/255,003

(22) Filed: Oct. 21, 2008

(65) Prior Publication Data

US 2009/0046635 A1 Feb. 19, 2009

Related U.S. Application Data

(63) Continuation of application No. 11/052,787, filed on Feb. 9, 2005, now Pat. No. 7,453,905, which is a continuation of application No. 09/649,960, filed on Aug. 29, 2000, now Pat. No. 6,868,089, which is a continuation of application No. 09/073,857, filed on May 7, 1998, now Pat. No. 6,172,986.

(30) Foreign Application Priority Data

| May 13, 1997 | (JP) | ................................. 09-122323 |
| Aug. 11, 1997 | (JP) | ................................. 09-216737 |

(51) Int. Cl.
*H04W 88/02* (2009.01)

(52) U.S. Cl. ........................ 370/328; 370/466

(58) Field of Classification Search ................. 370/338, 370/229, 401, 391; 709/249
See application file for complete search history.

(56) References Cited

U.S. PATENT DOCUMENTS 5,038,342 A    8/1991  Crisler et al.

(Continued)

FOREIGN PATENT DOCUMENTS

EP    1307029    5/2003

(Continued)

OTHER PUBLICATIONS

RFC 1541, "Dynamic Host Configuration Protocol", Oct. 1993.

(Continued)

*Primary Examiner*—Thong H Vu
(74) *Attorney, Agent, or Firm*—Brundidge & Stanger, P.C.

(57) ABSTRACT

A mobile node moves from a first IP (Internet Protocol) network to a second IP network in a network system in which the first IP network capable of executing communication in accordance with both first and second kinds of IPs and the second IP network capable of executing communication in accordance with only the first kind of IP are connected with each other. When the mobile node communicates a message with other nodes on the first network after its movement accordance with the second kind of IP, a header for the movement containing both home and foreign addresses of the first kind in IP is added to a header containing home and foreign addresses in the second kind of IP, and put to the message, is added. The message to which the movement header is thus added is used for the communication between a first mobile agent on the first network and a second mobile agent on the second network, or between the mobile node and the first mobile agent.

12 Claims, 40 Drawing Sheets

U.S. PATENT DOCUMENTS

| | | | |
|---|---|---|---|
| 5,319,783 A | | 6/1994 | Zink et al. |
| 5,457,680 A | | 10/1995 | Kamm et al. |
| 5,506,847 A | * | 4/1996 | Shobatake .................. 370/338 |
| 5,550,984 A | | 8/1996 | Gelb |
| 5,572,528 A | * | 11/1996 | Shuen ......................... 370/402 |
| 5,689,508 A | * | 11/1997 | Lyles ......................... 370/391 |
| 5,717,737 A | | 2/1998 | Doviak et al. |
| 5,740,374 A | | 4/1998 | Raffali-Schreinemachers |
| 5,771,459 A | | 6/1998 | Demery et al. |
| 5,809,501 A | | 9/1998 | Noven |
| 5,822,434 A | * | 10/1998 | Caronni et al. ............... 713/156 |
| 5,842,224 A | * | 11/1998 | Fenner ....................... 711/202 |
| 5,862,481 A | | 1/1999 | Kulkarni et al. |
| 5,940,598 A | * | 8/1999 | Strauss et al. ................ 709/249 |
| 5,946,634 A | | 8/1999 | Korpela |
| 5,974,028 A | * | 10/1999 | Ramakrishnan ............ 370/229 |
| 6,011,795 A | | 1/2000 | Varghese et al. |
| 6,018,524 A | | 1/2000 | Turner et al. |
| 6,038,233 A | | 3/2000 | Hamamoto et al. |
| 6,055,236 A | | 4/2000 | Nessett et al. |
| 6,061,650 A | | 5/2000 | Malkin et al. |
| 6,088,574 A | * | 7/2000 | Makino ..................... 340/7.56 |
| 6,118,784 A | | 9/2000 | Tsuchiya et al. |
| 6,172,986 B1 | | 1/2001 | Watanuki et al. |
| 6,198,920 B1 | | 3/2001 | Doviak et al. |
| 6,304,564 B1 | * | 10/2001 | Monin et al. ................. 370/338 |
| 6,304,574 B1 | * | 10/2001 | Schoo et al. ................. 370/401 |
| 6,407,988 B1 | | 6/2002 | Agraharam et al. |
| 6,442,616 B1 | | 8/2002 | Inoue et al. |
| 6,711,162 B1 | | 3/2004 | Ortega et al. |
| 2004/0054799 A1 | * | 3/2004 | Meier et al. ................. 709/230 |

FOREIGN PATENT DOCUMENTS

| | | |
|---|---|---|
| EP | 1331792 | 7/2003 |
| JP | 07-030544 | 1/1995 |
| WO | WO 97/08838 | * 12/1996 |

OTHER PUBLICATIONS

RFC 2002, "IP Mobility Support", Oct. 1996.
Internet-Draft, "Mobility Support in IPv6", Nov. 26, 1996.
Afifi, et al., IEEE 1999, "Methods for IPv4-IPv6 Transition", pp. 478-484.
Grosse et al., IEEE Network, "Network Processors Applied to IPv4/1Pv6 Transition", Jul./Aug. 2003, pp. 35-39.

* cited by examiner

FIG. 2

119 MOVEMENT STATUS MANAGEMENT TABLE

| | | |
|---|---|---|
| 200 | OWN IPv4 ADDRESS | 10.0.0.1 |
| 201 | OWN IPv4 NETWORK ADDRESS | 10.0.0.0 |
| 202 | OWN IPv6 ADDRESS | ::11.0.0.1 |
| 203 | OWN IPv6 NETWORK ADDRESS | ::11.0.0.0 |
| 204 | IPv4 MOBILE AGENT IPv4 ADDRESS | 10.0.0.11 |
| 205 | IPv6 MOBILE AGENT IPv4 ADDRESS | 10.0.0.20 |
| 206 | IPv6 MOBILE AGENT IPv6 ADDRESS | ::11.0.0.20 |
| 207 | POST-MOVEMENT IPv4 NETWORK ADDRESS | 10.0.0.0 |
| 208 | PRE-MOVEMENT IPv4 NETWORK ADDRESS | 10.0.0.0 |
| 209 | POST-MOVEMENT IPv6 NETWORK ADDRESS | ::11.0.0.0 |
| 210 | PRE-MOVEMENT IPv6 NETWORK ADDRESS | ::11.0.0.0 |

FIG. 3

126 MOBILE NODE MANAGEMENT TABLE

| MOBILE NODE IPv6 ADDRESS | FOREIGN IPv6 ADDRESS | FOREIGN IPv4 ADDRESS |
|---|---|---|
| ::11.0.0.1 | NULL | 20.0.0.1 |
| ::11.0.0.5 | ::31.0.0.5 | NULL |
| ::11.0.0.6 | ::41.0.0.6 | NULL |
| ⋮ | ⋮ | ⋮ |

FIG. 19

| MOBILE NODE IPv6 ADDRESS | FOREIGN IPv6 ADDRESS | FOREIGN IPv6 MOBILE AGENT IPv4 ADDRESS |
|---|---|---|
| 11::30 | 21::30 | 20.0.0.1 |
| 11::5 | 31::5 | NULL |
| 11::6 | 41::6 | NULL |
| ... | ... | ... |

FIG. 21

| MOBILE NODE IPv6 ADDRESS | HOME IPv6 MOBILE AGENT IPv4 ADDRESS | REGISTRATION FLAG |
|---|---|---|
| 11::30 | 10.0.0.1 | REAL REGISTRATION |
| 31::1 | 30.0.0.3 | TENTATIVE REGISTRATION |
| 41::1 | 40.0.0.4 | REAL REGISTRATION |
| ... | ... | ... |

FIG. 33

| MOBILE NODE IPv4 ADDRESS | FOREIGN IPv4 ADDRESS | FOREIGN IPv4 MOBILE AGENT IPv6 ADDRESS |
|---|---|---|
| 10.0.0.30 | 20.0.0.30 | 21::1 |
| 10.0.0.5 | 30.0.0.5 | NULL |
| 10.0.0.6 | 40.0.0.6 | NULL |
| ... | ... | ... |

FIG. 34

| HOME IPv4 MOBILE AGENT IPv6 ADDRESS | HOME IPv4 MOBILE AGENT IPv4 ADDRESS |
|---|---|
| 11::1 | 10.0.0.1 |
| 31::3 | 30.0.0.3 |
| 41::4 | 40.0.0.4 |
| ... | ... |

FIG. 35

| MOBILE NODE IPv4 ADDRESS | HOME IPv4 MOBILE AGENT IPv6 ADDRESS | REGISTRATION FLAG |
|---|---|---|
| 10.0.0.30 | 11::1 | REAL REGISTRATION |
| 30.0.0.1 | 31::3 | TENTATIVE REGISTRATION |
| 40.0.0.1 | 41::4 | REAL REGISTRATION |
| ... | ... | ... |

MOBILE NODE, MOBILE AGENT AND NETWORK SYSTEM

This application is a continuation application of U.S. application Ser. No. 11/052,787, filed Feb. 9, 2005, now U.S. Pat. No. 4,453,905, which is a continuation application of U.S. Ser. No. 09/649,960, filed Aug. 29, 2000, now U.S. Pat. No. 6,868,089, which is a continuation application of U.S. Ser. No. 09/073,857, filed May 7, 1998, now U.S. Pat. No. 6,172,986, the entirety of which are incorporated herein by reference. This application is related to U.S. application Ser. No. 10/128,257, now U.S. Pat. No. 6,724,775, U.S. application Ser. No. 10/128,544, now U.S. Pat. No. 6,785,293, and U.S. application Ser. No. 10/128,253, now U.S. Pat. No. 6,888,845.

BACKGROUND OF THE INVENTION

This invention relates to a mobile node, a mobile agent and a network system. More particularly, this invention relates to a control method which assists the movement of a node between an IP (Internet Protocol) network capable of executing communication in accordance with both IP version 4 and an IP version 6 and an IP network capable of executing communication in accordance with only the IP version 4 or an IP network capable of executing communication in accordance with only the IP version 6, a mobile agent, and a network system for assisting the movement of the node.

With a drastic development of small and lightweight nodes and the Internet, the demand for taking out a node from an office or a home to utilize it everywhere has been increased. When the node is moved to other network in the conventional network environment making use of the TCP/IP (Transmission Control Protocol/Internet Protocol), however, setting of the IP address, which is the information for primarily identifying the node in the IP network, must be changed so as to match with the foreign or visiting network environment.

Even if this change of setting of the IP address is automatically made by utilizing a DHCP (Dynamic Host Configuration Protocol) described in RFC (Request For Comment) 1541 as one of the methods of distributing automatically the IP addresses, there remains the problem that the network connection that has been established already with other nodes by using the IP addresses used in the network before the movement cannot be maintained in succession.

Therefore, methods of assisting the movement of the node between the networks have been devised. A typical among them is a protocol of the third layer (network layer) of an OSI (Open Systems Interconnection) reference model and this protocol pertains to the IP version 4 (hereinafter called the "IPv4") that has gained a wide application in the Internet and the IP version 6 (hereinafter called the "IPv6") the specification of which has now been stipulated so as to solve the problems of address exhaustion in the IPv4. As to these IPv4 and IPv6, "IP Mobility Support in IPv4") (hereinafter called "Mobile IPv4") described in RFC2002 and "Mobility Support in IPv6") (hereinafter called "Mobile IPv6") described in IETF (Internet Engineering Task Force) draft (the latest version of which is "draft-ietf-mobile-ip-ipv6-02.txt") are examples of the known references.

Incidentally, the term "IPv4" used in this specification designates an IP address having an address length of 32 bits while the term "IPv6" designates an IP address having an address length greater than 32 bits.

By making use of these Mobile IPv4 and Mobile IPv6, a user can execute communication in the same way before the movement of the node even when the node is moved to another network, without the necessity for changing the IP address of the node or cutting off the network connection that has already been established with other node before the movement.

Incidentally, the term "node" used in this specification designates all those devices which have an IP address and execute communication by utilizing the IP, such as a PC (Personal Computer), a WS (Work Station), a router, and so forth.

Generally, it is assumed that the movement from the IPv4 to the IPv6 is effected gradually and all the networks do not utilize at once the IPv6. In the mean time, therefore, there exist a network (hereinafter called the "IPv4 network") comprising only those nodes which execute communication by utilizing only the IPv4 (hereinafter called the "IPv4 nodes"), a network (hereinafter called the "IPv6 network") comprising only those nodes which execute communication by utilizing only the IPv6 (hereinafter called the "IPv6 node") and a network (hereinafter called the "IPv4/v6 network") comprising those nodes which execute communication by utilizing both of IPv4 and IPv6 in mixture (hereinafter called the "IPv4/v6 node"), the IPv4 nodes and the Ipv6 nodes.

To beginning with, let's consider the case where the Ipv4/v6 network is the one that supports both of Mobile IPv4 and Mobile IPv6. In the Mobile IPv4, messages are exchanged between a mobile node moving between the networks and a mobile agent (hereinafter called the "IPv4 mobile agent") for assisting the movement of the mobile node which executes communication by utilizing the IPv4, in accordance with the Mobile IPv4 procedures. Similarly, in the Mobile IPv6, messages are exchanged between a mobile node moving between the networks and a mobile agent (hereinafter called the "IPv6 mobile agent") for assisting the movement of the mobile node that executes communication by utilizing the IPv6, in accordance with the Mobile IPv6 procedures.

Let's consider the case where the IPv4/v6 mobile node supporting both of Mobile IPv4 and Mobile IPv6 inside the IPv4/v6 network moves to another IPv4/v6 network. Because the foreign IPv4/v6 network can execute communication by utilizing both of IPv4 and IPv6, the IPv4/v6 mobile node can exchange the messages with both of the IPv4 mobile agent and the IPv6 mobile agent on the network in accordance with the procedures of the Mobile IPv4 and the Mobile IPv6. Therefore, the movement of this IPv4/v6 mobile node between the networks is supported by both of the Mobile IPv4 and the Mobile IPv6. In consequence, the IPv4/v6 mobile node that has moved to the foreign network can successively execute communication without changing setting of the IP address and without cutting off the network connection that has been established already with other IPv4 node or the IPv6 node before its movement by utilizing the IPv4 or IPv6. It can also execute afresh communication with other node by utilizing the IPv4 and the IPv6.

Next, let's consider the case where the IPv4/v6 mobile node moves from the IPv4/v6 network to the IPv4 network which can execute communication in accordance with only the IPv4 and supports the Mobile IPv4. In this case, since communication by utilizing the IPv4 is possible between the IPv4/v6 mobile node and the IPv4 mobile agent, the assistance of movement of this mobile node between the networks by the Mobile IPv4 can be made. Therefore, the IPv4/v6 mobile node can execute communication successively after the movement without cutting off the network connection that has been previously established already with other IPv4 node by utilizing the IPv4. The mobile node can also execute communication afresh by utilizing the IPv4.

However, the mobile node cannot execute communication by utilizing the IPv6 on the IPv4 network and consequently, the exchange of the message on the IPv4 network in accordance with the Mobile IPv6 procedure becomes impossible between the IPv4/v6 mobile node and the IPv6 mobile agent. In other words, the assistance of the movement of the mobile node to the IPv4 network in accordance with the Mobile IPv6 becomes impossible and the IPv4/v6 mobile node that has moved to the IPv4 network cannot maintain the network that has been established already with other IPv6 node by utilizing the IPv6 before the movement and consequently, cannot execute communication. This mobile node cannot execute afresh communication with other node on the IPv4 network by utilizing the IPv6, either.

Similarly, let's consider the case where the IPv4/v6 mobile node moves from the IPv4/v6 network to the IPv6 network which can execute communication by utilizing only the IPv6 and supports the Mobile IPv6. In this case, too, the IPv4/v6 mobile node cannot execute communication by utilizing the IPv4 on the IPv6 network. In consequence, the exchange of the message in accordance with the Mobile IPv4 procedure is not possible on the IPv6 network between the IPv4/v6 mobile agent and the IPv4 mobile agent, so that the assistance of the movement of this mobile node to the IPv6 network in accordance with the Mobile IPv4 becomes impossible on the IPv6 network.

SUMMARY OF THE INVENTION

It is therefore an object of the present invention to provide a mobile node, a mobile agent and a network system which can successively maintain the network connection the IPv6 that has been established already by utilizing the IPv6 before the movement when the IPv4/v6 mobile node moves from the IPv4/v6 network to the IPv4 network, and which can also execute afresh communication by utilizing the IPv6.

It is another object of the present invention to provide a control method of a mobile node, a mobile agent and a network system for assisting the movement, which can execute communication by utilizing the IPv4 between an IPv4/v6 mobile node and other IPv4 node even when the IPv4/v6 mobile node moves from an IPv4/v6 network to an IPv6 network, without changing at all existing IPv6 mobile agents and existing IPv4/v6 mobile agents and without changing setting of the address of the IPv4/v6 mobile node.

According to one aspect of the present invention, there is provided a mobile node including IPv4 (Internet Protocol version 4) processing means for executing services in accordance with the IPv4, IPv6 (Internet Protocol version 6) processing means for executing services in accordance with the IPv6, and communication processing means for executing transmission/reception control of packets to and from networks, and moving between IP networks, wherein the mobile node further comprises movement registration processing means for adding an IPv4 header (IP header used for the IPv4), in which the IPv4 address of a mobile agent is set as a foreign address and the IPv4 address of the mobile node usable in a foreign IPv4 network is set as a home address, to a message used for the IPv6 for registering the movement to a mobile agent connected to the IPv4/v6 network to assist the movement of the mobile node, and transmitting the message, when this mobile node moves from the IPv4/v6 network (a network capable of executing communication by utilizing both of the IPv4 and the IPv6) to an IPv4 network (a network capable of executing communication by utilizing only the IPv4).

In the mobile node according to the aspect of the invention described above, the IPv4 header is added to the message used for the IPv6 and the message is then transmitted. Therefore, the message to be used for the IPv6 can be substantially transmitted from the foreign IPv4 network, and the information necessary for the network connection utilizing the IPv6 can be registered to the mobile agent.

According to another aspect of the present invention, there is provided a mobile agent including IPv4 processing means for executing services in accordance with an IPv4, IPv6 processing means for executing services in accordance with an IPv6 and communication processing means for executing transmission/reception control of packets to and from networks, and moving between the networks, wherein the mobile agent further comprises packet transmission processing means for generating an IPv4 encapsulated IPv6 packet by adding an IPv4 header, in which the IPv4 address of the mobile agent is set as a foreign address and the IPv4 address of a mobile node usable in a foreign IPv4 network is set as a home address, to an IPv6 packet (packet used for the IPv6) to be transmitted to other node, and transmitting the IPv4 encapsulated IPv6 packet so generated.

In the mobile agent according to the aspect of the invention described above, after the IPv4 header is added to the IPv6 packet, the packet is transmitted. Therefore, the IPv6 packet can be transmitted substantially from the foreign IPv4 network.

According to still another aspect of the present invention, there is provided a mobile node including IPv4 processing means for executing services in accordance with the IPv4, IPv6 processing means for executing services in accordance with the IPv6 and communication processing means for executing transmission/reception control of packets to and from networks, and moving between the networks, wherein the mobile node further comprises movement detection means for detecting whether the mobile node has moved from the network in which a mobile agent used by this mobile node exists to another IPv4 network or to an IPv6 network (network capable of executing communication by utilizing only the IPv6) or to an IPv4/v6 network, and movement status management means for managing the movement status so detected.

Since the mobile node according to this aspect of the invention automatically detects the kind of the network in which the mobile node itself exists at present and manages itself, the necessity for adding an IPv4 header to the message used for the IPv6 or the IPv6 packet can be judged appropriately.

According to still another aspect of the present invention, there is provided a mobile agent for assisting the movement of a mobile node executing communication by utilizing an IPv6, including IPv4 processing means for executing services in accordance with an IPv4, IPv6 processing means for executing services in accordance with the IPv6 and communication processing means for executing transmission/reception control of packets to and from networks, wherein the mobile agent further comprises mobile node management means for managing the IPv4 address of a mobile node usable in a foreign IPv4 network when receiving a message for use in the IPv6 for registering the movement, to which an IPv4 header transmitted from the mobile node to the IPv6 network to the mobile agent when the mobile agent moves to the IPv4 network is added, and movement assistance processing means for adding an IPv4 header, in which the IPv4 address of the mobile node usable in a foreign IPv4 network is set as a foreign address and the IPv4 address of the mobile agent is set as a home address, to the message used for the IPv6 to permit registration of the movement to the mobile node, and transmitting the message.

In the mobile agent according to the aspect of the invention described above, after the IPv4 header is added to the message used for the IPv6 and then the message is transmitted. Therefore, the message used for the IPv6 can be transmitted substantially to the mobile node that is moving to the IPv4 network.

According to still another aspect of the present invention, there is provided a mobile agent for assisting the movement of a mobile node executing communication by utilizing the IPv6, including IPv4 processing means for executing services in accordance with the IPv4, IPv6 processing means for executing services in accordance with the IPv6 and communication processing means for executing transmission/reception control of packets to and from networks, wherein the mobile agent further comprises transfer-to-other node processing means for deleting the IPv4 header when receiving an IPv4 encapsulated IPv6 packet transmitted by the mobile node, and transmitting again the IP packet so taken out to the network.

In the mobile agent according to the aspect of the invention described above, after only the IPv6 packet is taken out from the IPv4 encapsulated IPv6 packet, the IPv6 is again transmitted. Therefore, the IPv6 packet can be transmitted substantially from the mobile node, that is moving to the IPv4 network, to the node on the IPv6 network or on the IPv4/v6 network.

According to still another aspect of the present invention, there is provided a mobile agent for assisting the movement of a node executing communication by utilizing the IPv6, including IPv4 processing means for executing services in accordance with the IPv4, IPv6 processing means for executing services in accordance with the IPv6 and communication processing means for executing transmission/reception control of packets to and from networks, wherein the mobile agent further comprises transfer-to-other node processing means for generating an IPv4 encapsulated IPv6 packet by adding an IPv4 header, in which the IPv4 address of a foreign node usable in a foreign IPv4 network is set as a foreign IPv4 address and the IPv4 address of the mobile agent is set as a home IPv4 address, to the received IPv6 packet when receiving this IPv6 packet transmitted by other node to the mobile node that has moved to the IPv4 network, and for transmitting this IPv4 encapsulated IPv6 packet.

In the mobile agent according to the aspect of the invention described above, after the IPv4 header is added to the IPv6 packet, the IPv6 packet is transmitted. Therefore, the IPv6 packet can be transmitted substantially from the node on the IPv6 network or on the IPv4/v6 network to the mobile node that is moving to the IPv4 network.

According to still another aspect of the present invention, there is provided a network system in which an IPv4/v6 network and an IPv4 network are connected with each other by a connecting device or by the connection device and a third network, wherein the mobile agent according to the fourth, fifth or sixth aspect is provided on the IPv4/v6 network and the mobile node according to the first, second or third aspect is provided on the IPv4/v6 network or on the IPv4 network.

The network system according to the aspect described above can successively keep the network connection, which utilizes the IPv6 and has been already established before the movement of the IPv4/v6 node, when the IPv4/v6 node moves from the IPv4/v6 network to the IPv4 network, and can execute afresh communication by utilizing the IPv6.

According to still another aspect of the present invention, there is provided a method of controlling a mobile node by a mobile agent in a network system in which a first IP network capable of executing communication in accordance with first and second kinds of IPs and a second IP network capable of executing communication in accordance with only the first kind of IP, so that the mobile node capable of executing communication in accordance with the second kind of IP can communicate with other node belonging to the first IP network in accordance with the second kind of IP when the mobile node moves from the first IP network to the second IP network, which method comprises the steps of adding a first kind of IP header, in which the IP address of a second mobile agent belonging to the second IP network in accordance with the first kind of IP is set as a foreign address by the first mobile agent belonging to the first IP network and the IP address of the first mobile agent in accordance with the first kind of IP is set as a home address, to an IP packet transmitted in accordance with the second kind of IP from other node to the mobile node, and transmitting the IP packet to the second mobile agent; and deleting the first kind of IP header by the second mobile agent and transmitting the IP packet to the mobile node.

On the other hand, the IP packet may be transmitted to other node by adding the first kind of IP header, in which the IP address of the first mobile agent in accordance with the first kind of IP is set as a foreign address by the second mobile agent and the IP address of the second mobile agent in accordance with the first kind of IP is set as a home address, to the IP packet in accordance with the second kind of IP transmitted from the mobile node to other node, transmitting this IP address to the first mobile agent, deleting the first kind of IP header by the first mobile agent and then transmitting the IP packet to other node.

Alternatively, it is possible to employ a method comprising adding the first kind of IP header, in which the IP address of the first mobile agent in accordance with the first kind of IP is set as a foreign address by the second mobile agent and the IP address of the second mobile agent in accordance with the first kind of IP is set as a home address, to a movement registration request message in accordance with the second kind of IP that is received from the mobile node, transmitting this message to the first mobile agent, adding the first kind of IP header, in which the IP address of the second mobile agent in accordance with the first kind of IP is set as a foreign address by the first mobile agent and the IP address of the first mobile agent in accordance with the first kind of IP is set as a home address, to a message in accordance with the second kind of IP for permitting the movement, and transmitting this message to the second mobile agent.

The present invention provides also a network system for assisting the movement of the mobile node, having the features described above.

Furthermore, the present invention provide the first and second mobile agents for assisting the movement of the mobile node, having the features described above.

BRIEF DESCRIPTION OF THE DRAWINGS

FIG. 2 is a structural view of a movement status management table used in an IPv4/v6 mobile node shown in FIG. 1;

FIG. 3 is a structural view of a mobile node management table used in an IPv6 mobile agent shown in FIG. 1;

FIG. 19 is an explanatory view showing a structural example of a mobile node management table used in a home IPv6 mobile agent shown in FIG. 18;

FIG. 21 is an explanatory view showing a structural example of a movement assistance management table used in the foreign IPv6 mobile agent shown in FIG. 18;

FIG. 33 is an explanatory view showing a structural example of a mobile node management table used in a home IPv4 mobile agent shown in FIG. 32;

FIG. 34 is an explanatory view showing a structural example of a mobile agent address table used in the foreign IPv4 mobile node shown in FIG. 32;

FIG. 35 is an explanatory view showing a structural example of a movement assistance management table used in the foreign IPv4 mobile agent shown in FIG. 32;

DESCRIPTION OF THE PREFERRED EMBODIMENTS

Hereinafter, preferred embodiments of the present invention will be explained with reference to the accompanying drawings.

Figure 1:
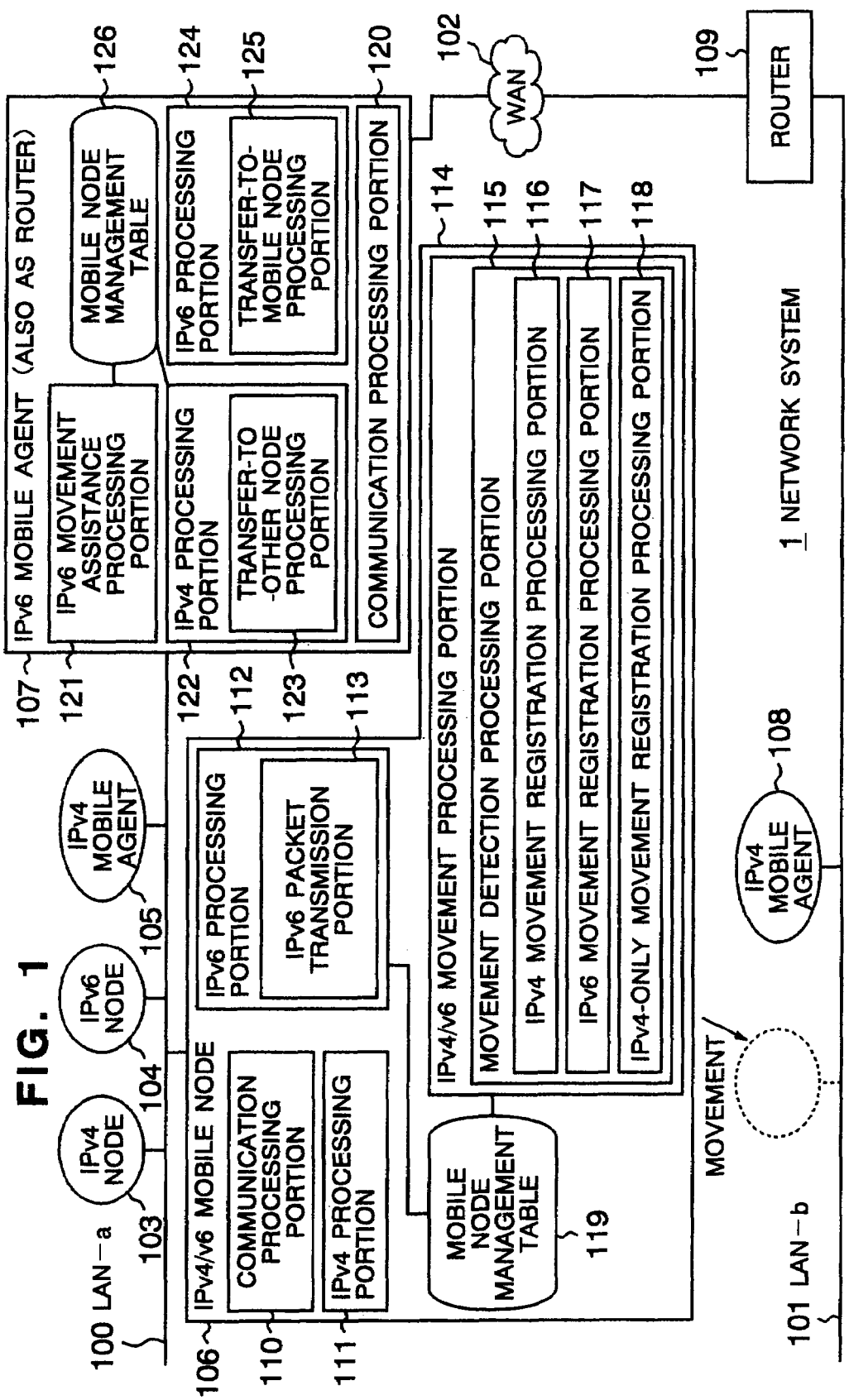
FIG. 1 is a structural view of a network system according to one embodiment of the present invention.

FIG. 1 is a structural view showing a network system according to one embodiment of the present invention.

This network system 1 includes a LAN (Local Area Network)-a 100 which makes use of both an IPv4 and an IPv6, a LAN-b 101 which makes use of only the IPv4 and a WAN (Wide Area Network) 102 which connects the LAN-a 100 and the LAN-b 101 by a public line or an exclusive line.

On the LAN-a 100 exist an IPv4 node 103, an IPv6 node 104, an IPv4 mobile agent-a 105 for assisting the movement of a node executing communication by utilizing the IPv4 by the procedure in accordance with a Mobile IPv4 between the networks, an IPv4/v6 mobile node 106 and an IPv6 mobile agent 107 for assisting the movement of the node which executes communication by utilizing the IPv4 and IPv6 and also executes communication by utilizing the IPv6 between the networks. The IPv6 mobile agent 107 functions also as a router and connects the LAN-a 100 and the WAN 102.

An IPv4 mobile agent-b 108 and a router 109 exist on the LAN-b 101. The router 109 connects the LAN-b 101 and the WAN 102.

In this embodiment, the following IP addresses are allocated, respectively:

|  | IPv4 address | IPv6 address |
|---|---|---|
| LAN-a 100 | "10.0.0.0" | "::11.0.0.0" |
| IPv4 node 103 | "10.0.0.10" |  |
| IPv6 node 104 |  | "::11.0.0.30" |
| IPv4/v6 mobile node 106 | "10.0.0.1" | "::11.0.0.1" |
| IPv4 mobile agent-a 105 | "10.0.0.11" |  |
| IPv6 mobile agent 107 | "10.0.0.20" | "::11.0.0.20" |
| LAN-b 101 | "20.0.0.0" |  |
| IPv4 mobile agent-b 108 | "20.0.0.11" |  |

The IPv4/v6 mobile node 106 includes an IPv4/v6 movement processing portion 114 for executing various processings when the node moves to another network, a movement detection processing portion 115 for executing a detection processing which detects the movement to another network, an IPv4 movement registration processing portion 116 for executing a movement notification processing which notifies the movement of the node to another IPv4 network or to an IPv4/v6 network, to the IPv4 mobile agent-a 105, an IPv6 movement registration processing portion 117 for executing a movement notification processing which notifies the movement of the node to another IPv6 network or to the IPv4/v6 network, to the IPv6 mobile agent 107, an IPv4-only movement registration processing portion 118 for executing a movement notification processing which notifies the movement of the node to another IPv4 network to the IPv6 mobile agent 107, a movement status management table 119 for managing the movement status, an IPv4 processing portion 111 for executing a processing in accordance with the services offered by the IPv4, an IPv6 processing portion 112 for executing a processing in accordance with the services offered by the IPv6, an IPv6 packet transmission processing portion 113 for executing a transmission processing of the IPv6 packet, and a communication processing portion 110 for executing a transmission/reception control of the packet to and from the LAN.

Among the constituent elements of the IPv4/v6 mobile node 106 described above, the present invention disposes specifically the movement detection processing portion 114, the IPv4-only movement registration processing portion 118, the IPv6 packet transmission processing portion 113 and the movement status management table 119.

The IPv6 mobile agent 107 includes an IPv6 movement assistance processing portion 121 which receives the movement report (a report representing the movement to the IPv6 network or to the IPv4/v6 network) from the IPv6 mobile node (not shown in the drawing) effecting communication by utilizing the IPv4/v6 mobile node 106 or IPv6 and moving between the networks, and assists the mobile node, a mobile node management table 126 for managing the movement status information of the mobile nodes, an IPv4 processing portion 122 for executing a processing in accordance with the services offered by the IPv4, a transfer processing portion 123 to another node, for transferring the packet which is transmitted by the IPv4/v6 mobile node 106 to the IPv6 node 104, an IPv6 processing portion 124 for executing a processing in accordance with the services offered from the IPv6, a transfer processing portion 125 to a mobile node, for transferring the packet which is transmitted from the IPv6 node 104 to the IPv4/v6 mobile node 106, and a communication processing portion 120 for executing transmission/reception control of the packet to the LAN.

Among the constituent elements of the IPv6 mobile agent 107 described above, it is the IPv6 movement assistance processing portion 121, the transfer processing portion 123 to another node, the transfer processing portion 125 to a mobile node, and a mobile node management table 126 that constitute the characterizing part of the present invention.

FIG. 2 shows a structural example of the movement status management table 119.

This movement status management table 119 has the following fields:

own IPv4 address 200:

This is the IPv4 address of the IPv4/v6 mobile node 106 on the LAN-a 100 on which the IPv6 mobile agent 107 for assisting the movement of the IPv4/v6 mobile node 106 exists.

own IPv4 network address 201:

This is the IPv4 network address of the LAN-a 100 on which the IPv6 mobile agent 107 for assisting the movement of the Ipv4/v6 mobile node 106 exists.

own IPv6 address 202:

This is the IPv6 address of the IPv4/v6 mobile node 106 on the LAN-a 100 on which the IPv6 mobile agent 107 for assisting the movement of the IPv4/v6 mobile node 106 exists.

own IPv6 network address 203:

This is the IPv6 network address of the LAN-a 100 on which the IPv6 mobile agent 107 for assisting the movement of the IPv4/v6 mobile node 106 exists.

IPv4 mobile agent IPv4 address 204:

This is the IPv4 address of the IPv4 mobile agent-a 105 on the LAN-a 100 on which the IPv4 mobile agent-a 105 for assisting the movement of the IPv4/v6 mobile node 106 exists.

IPv6 mobile agent IPv4 address 205:

This is the IPv4 address of the IPv6 mobile agent 107 on the LAN-a 100 on which the IPv6 mobile agent 107 for assisting the movement of the IPv4/v6 mobile node 106 exists.

IPv6 mobile agent IPv6 address 206:

This is the IPv6 address of the IPv6 mobile agent 107 on the LAN-a 100 on which the IPv6 mobile agent 107 for assisting the movement of the IPv4/v6 mobile node 106 exists.

post-movement IPv4 network address 207:

This is the IPv4 network address of the network on which the IPv4/v6 mobile node 106 exists at the present moment.

pre-movement IPv4 network address 208:

This is the IPv4 network address of the network before the IPv4/v6 mobile node 106 moves.

post-movement IPv6 network address 209:

This is the IPv6 network address of the network in which the IPv4/v6 mobile node 106 exists at the present moment. When the network existing at present is the IPv4 network, "NULL" is set.

pre-movement IPv6 network address 210:

This is the IPv6 network address of the network before the IPv4/v6 mobile node 106 moves. When the network before the movement is the IPv4 network, "NULL" is set.

Incidentally, the network address of the LAN-a 100 in which the IPv6 mobile agent 107 for assisting the movement of the IPv4/v6 mobile node 106 exists is set at the time of initialization to the field of each of the post-movement IPv4 network address 207, the pre-movement IPv4 network address 208, the post-movement IPv6 network address 209 and the pre-movement IPv6 network address 210.

FIG. 3 shows a structural example of the mobile node management table 126.

This mobile node management table 126 includes the following entries:

mobile node IPv6 address 30:

This is the IPv6 address of the mobile node the movement of which is assisted by the IPv6 mobile agent 107.

foreign IPv6 address 31:

This is the IPv6 address on the network on which the mobile node exists at the present moment. When the network existing at present is the IPv4 network, "NULL" is set.

foreign IPv4 address 32:

This is the IPv4 address on the network on which the mobile node exists at the present moment. When the network existing at present is the IPv6 network, "NULL" is set.

Incidentally, the entry of the mobile node does not exist in the mobile node management table 126 at the time of initialization.

Figure 4:
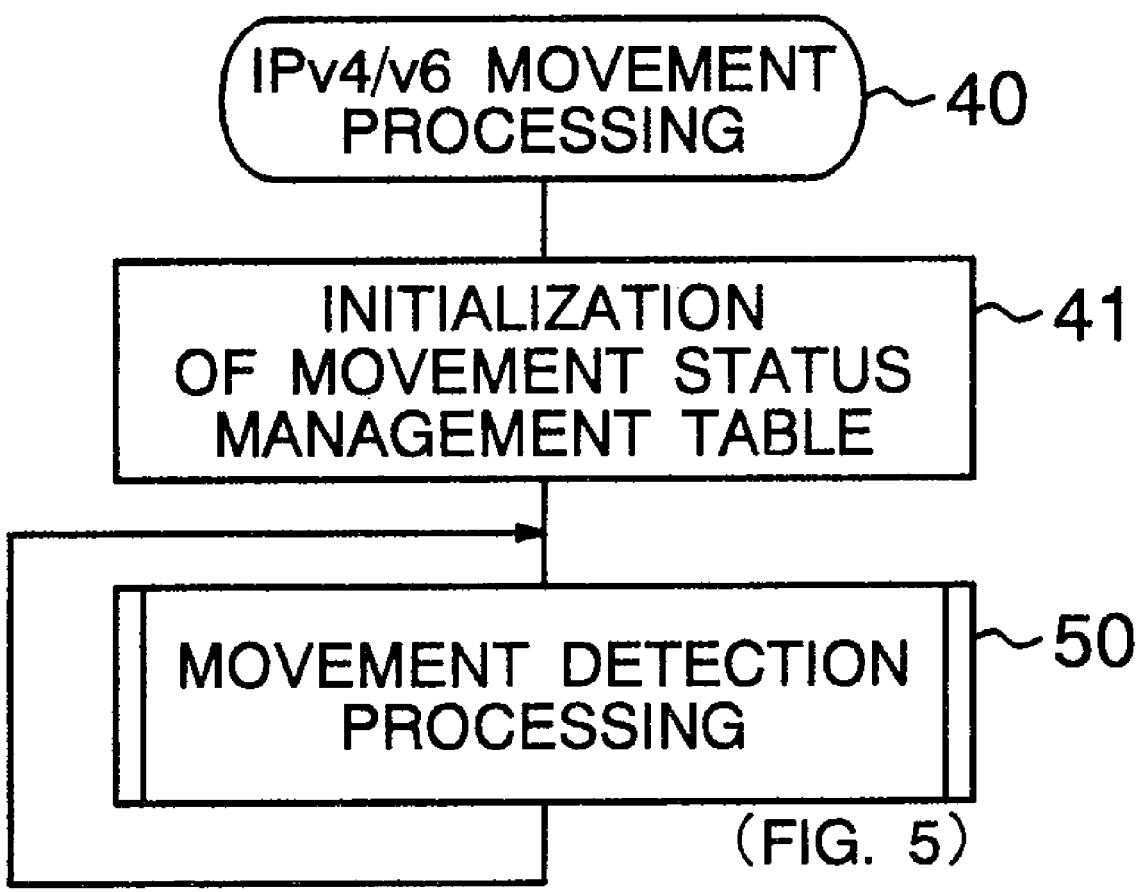
FIG. 4 is a flowchart showing an IPv4/v6 movement processing in the IPv4/v6 mobile node shown in FIG. 1.

FIG. 4 is a flowchart showing the IPv4/v6 movement processing 40 executed by the IPv4/v6 movement processing portion 114.

Initialization of the movement status management table 119 is effected at Step 41.

At the next Step 50, the movement detection processing portion 115 is caused to repeatedly execute a movement detection processing 50.

Figure 5:
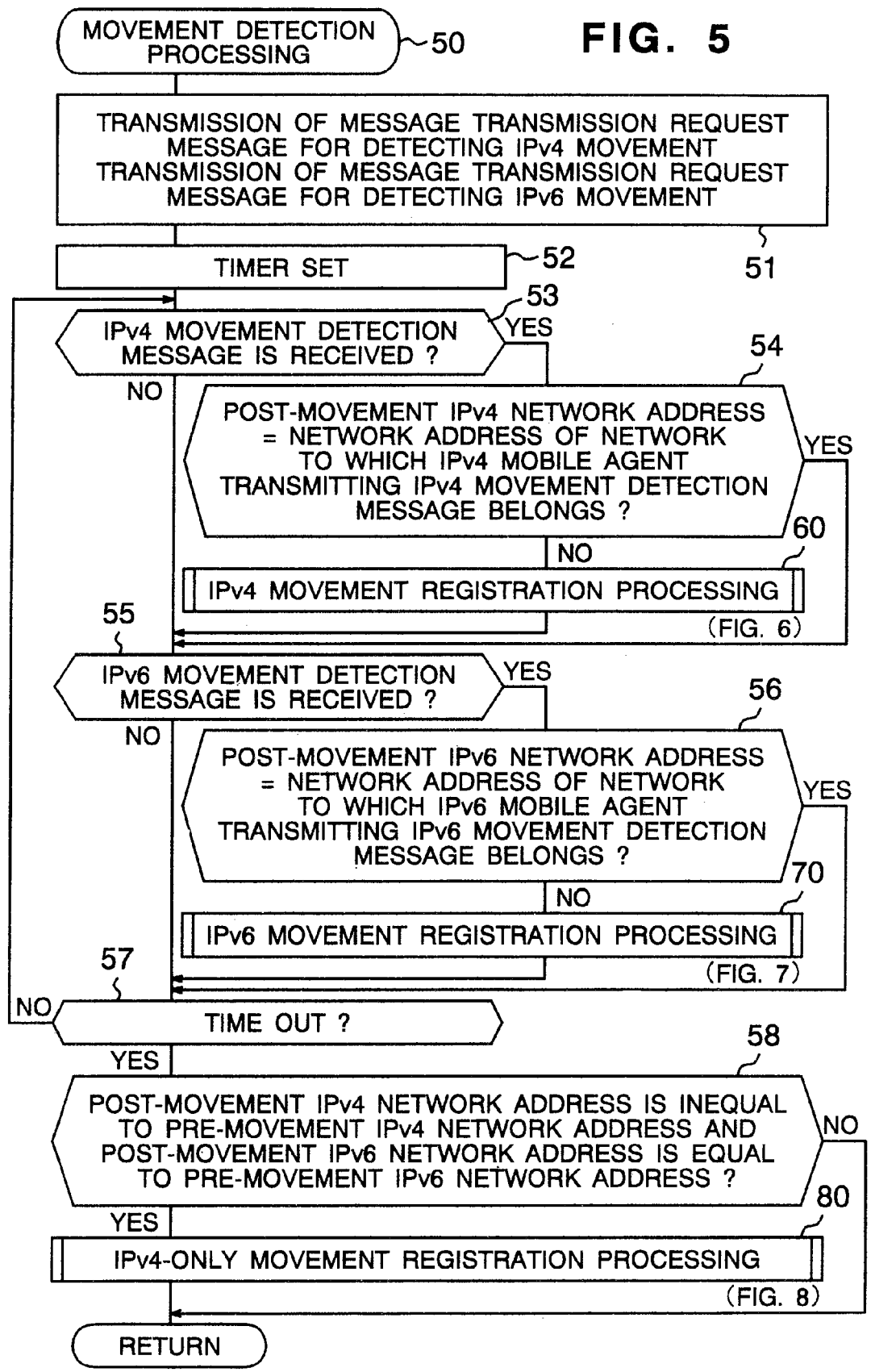
FIG. 5 is a flowchart showing a movement detection processing in the IPv4/v6 shown in FIG. 1.

FIG. 5 is a flowchart showing the movement detection processing 50 executed by the movement detection processing portion 115.

At Step 51, the IPv4/v6 mobile node 106 transmits a message transmission request message for detecting the IPv4 movement and a message transmission request message for detecting the IPv6 movement, which request an IPv4 movement detection message and an IPv6 movement detection message for detecting the movement to another IPv4 network, the IPv6 network or the IPv4/v6 network, respectively. The IPv4 mobile agent and the IPv6 mobile agent that receive these message transmission request message for detecting the IPv4 movement and message transmission request message for detecting the IPv6 movement, respectively, transmit the IPv4 movement detection message and the IPv6 movement detection message, respectively. In addition, the IPv4 mobile agent and the IPv6 mobile agent periodically transmit the IPv4 movement detection message and the IPv6 movement detection message, respectively.

Next, a timer is set at Step 52.

If the IPv4 movement detection message is received at Step 53, the flow proceeds to Step 54 and when it is not, the flow proceeds to Step 55.

At Step 54, the network address of the network, to which the IPv mobile agent transmitting the received IPv4 movement detection message belongs is compared with the post-movement IPv4 network address 207 inside the movement status management table 119. If they are the same network address, the flow proceeds to Step 55 and if they are different network addresses, the flow proceeds to Step 60.

If the IPv6 movement detection message is received at Step 55, the flow proceeds to Step 56 and if it is not, the flow proceeds to Step 57.

At Step 56, the network address of the network to which the IPv6 mobile agent transmitting the IPv6 movement detection message received belongs is compared with the post-movement IPv6 network address 209 inside the movement status management table 119. If they are the same network address, the flow proceeds to Step 57 and if they are different network addresses, the flow proceeds to Step 70.

At Step 57, the flow returns to Step 53 if the time is not out, and proceeds to Step 58 if the time is out.

At Step 58, whether or not the post-movement IPv4 network address 207 inside the movement status management table 119 and the pre-movement IPv4 network address 208 are different addresses and whether or not the post-movement IPv6 network address 209 and the pre-movement IPv6 network address are the same network address are judged, and if the result of this judgement proves Yes, the flow proceeds to Step 80 and if the result proves No, the processing is completed.

At Step 60, the IPv4 movement registration processing portion 116 is caused to execute the IPv4 movement registration processing 60.

At Step 70, the IPv6 movement registration processing portion 117 is caused to execute the IPv6 movement registration processing 70.

At Step 80, the IPv4-only movement registration processing portion 118 is caused to execute the IPv4-only movement registration processing 80.

The movement detection processing 50 described above will be explained more concretely. When the IPv4/v6 mobile node 106 exists on the LAN-a 100 at the present moment, it receives the IPv4 movement detection message and the IPv6 movement detection message transmitted by the IPv4 mobile agent-a 105 and by the IPv6 mobile agent 107, respectively. In this instance, since the network address (="10.0.0.0") of the LAN-a 100 to which the IPv4 mobile agent-a 105 transmitting the IPv4 movement detection message belongs is the same as the post-movement IPv4 network address 207 (="10.0.0.0") of the movement status table 119, it is possible to know that the mobile node does not move to another IPv4 network or another IPv4/v6 network. Therefore, the flow proceeds from Step 54 to Step 55 but Step 60 (IPv4 movement registration processing) is not executed. Since the network address (=":: 11.0.0.0") of the network to which the IPv6 mobile agent 107 transmitting the IPv6 movement detection message belongs is the same as the post-movement IPv6 network address 209 (="::11.0.0.0") of the movement status table 119, it is possible to know that the mobile node does not move to another IPv6 or another IPv4/v6 network. Therefore, the flow proceeds from Step 56 to Step 57 but Step 70 (IPv6 movement registration processing) is not executed.

Next, when the IPv4/v6 mobile node 106 has moved to the LAN-b 101 at the present moment, this mobile node 106 receives the IPv4 movement detection message transmitted by the IPv4 mobile agent-b 108. Since the network address (="20.0.0.0") of the LAN-b 101 to which the IPv4 mobile agent-b 108 transmitting the IPv4 movement detection message belongs is different from the post-movement IPv4 network address 207 (="10.0.0.0") of the movement status table 119, it is possible to know that the IPv4/v6 mobile node 106 has moved to another IPv4 network or another IPv4/v6 network. Therefore, the flow proceeds from Step 54 to Step 60, where the IPv4 movement registration processing 60 is executed. As will be described later with reference to FIG. 6, the pre-movement IPv4 network address 208 of the movement status table 119 is updated to "10.0.0.0" and the post-movement IPv4 network address 207 is updated to "20.0.0.0", by this IPv4 movement registration processing 60.

On the other hand, because the IPv6 mobile agent does not exist in the LAN-b 101, the IPv6 movement detection message is not received. In consequence, the flow proceeds from Step 55 to Step 57 and the processing of Steps 56 and 70 (IPv6 movement registration processing) is not executed.

Because the post-movement IPv4 network address 207 (="20.0.0.0") of the movement status table 119 is different from the pre-movement IPv4 network address 208

(="10.0.0.0") and because the post-movement IPv6 network address 209 (=":: 11.0.0.0") is the same as the pre-movement IPv6 network address 210 (=":: 11.0.0.0") after time-out, it is possible to know that the mobile node has moved to the IPv4 network. Therefore, the flow proceeds from Step 58 to Step 80 and the IPv4-only movement registration processing 80 is executed.

Incidentally, when the IPv4/v6 mobile node 106 moves to another IPv4/v6 network such as the LAN-a 100, both of the IPv4 movement detection message and the IPv6 movement detection message are received. Therefore, both of the IPv4 movement registration processing 60 and the IPv6 movement registration processing 70 are executed. On the other hand, the post-movement IPv4 network address 207 of the movement status table 119 becomes inequal (≠) to the pre-movement IPv4 network address 208 and the post-movement IPv6 network address 209 becomes inequal (≠) to the pre-movement IPv6 network address 210. Therefore, the flow does not proceed from Step 58 to Step 80 and the IPv4-only movement registration processing 80 is not executed.

Figure 6:
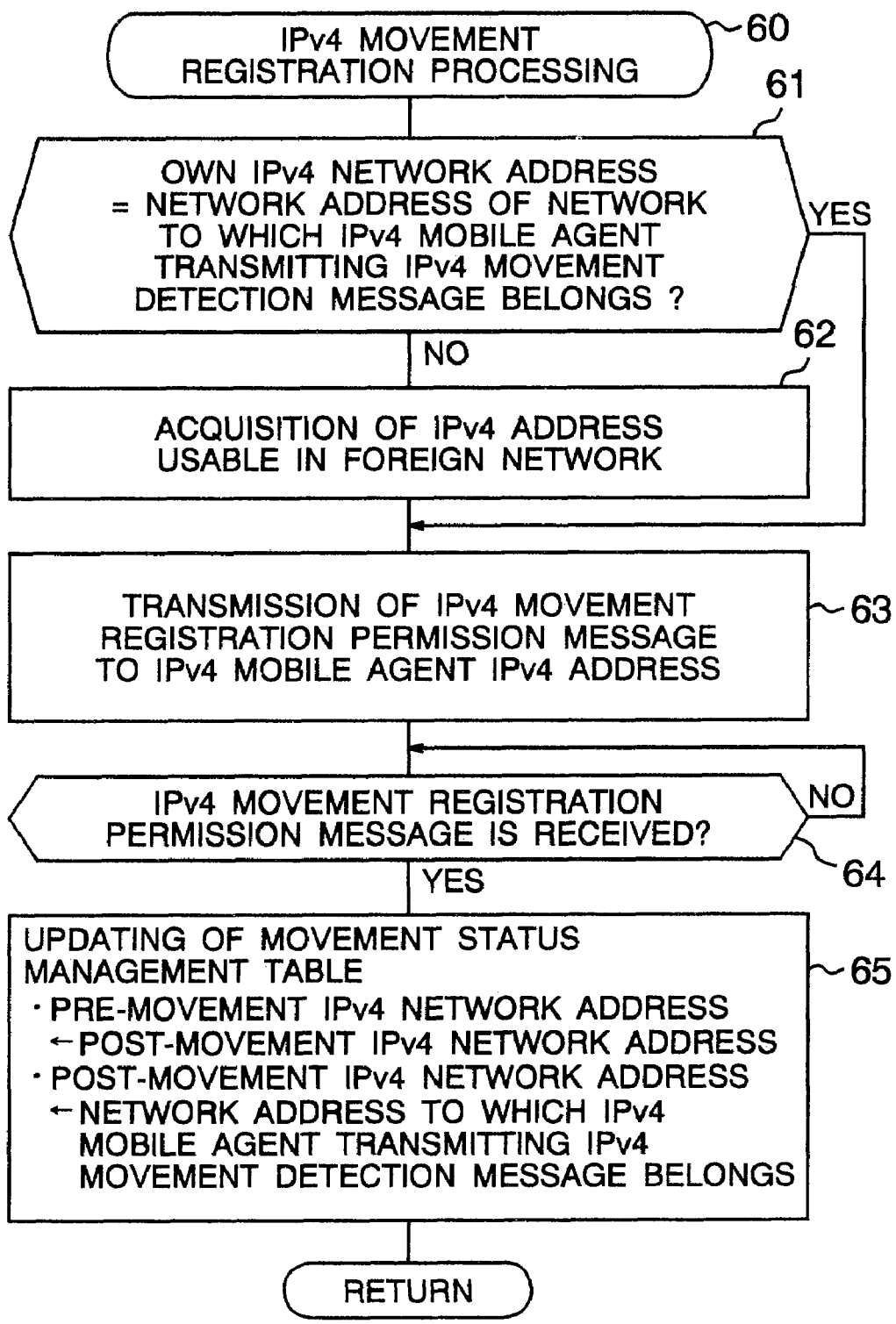
FIG. 6 is a flowchart showing an IPv4 movement registration processing in the IPv4/v6 mobile node shown in FIG. 1.

FIG. 6 is a flowchart showing an example of the IPv4 movement registration processing executed by the IPv4 movement registration processing portion 116. Incidentally, this IPv4 movement registration processing 60 is the processing which follows the processing procedure of the Mobile IPv4.

At Step 61, the IPv4 network address 201 of the movement status management table 119 of its own is compared with the network address of the network to which the IPv4 mobile agent transmitting the IPv4 movement detection message belongs. When they are not the same network address, it is possible to know that the mobile node has moved to another network, and the flow proceeds to Step 62. When they are the same network address, on the other hand, it is possible to know that the mobile node has returned to the LAN-a 100 in which the IPv6 mobile agent 107 assisting the movement of the IPv4/v6 mobile node 106 exists, and the flow then proceeds to Step 63.

At Step 62, the IPv4 address on the foreign network which the IPv4/v6 mobile node 106 can make use of is acquired. This IPv4 address can be acquired by utilizing a DHCP for executing automatic distribution of the addresses or by manual setting, for example.

At Step 63, the IPv4 movement registration request message is transmitted to the IPv4 mobile agent registered to the IPv4 mobile node IPv4 address 204 of the movement status management table 119.

At Step 64, the movement registration permission message as the reply to the IPv4 movement registration request message is awaited from the IPv4 mobile agent, and after this IPv4 movement registration permission message is received, the flow proceeds to Step 65.

At Step 65, the post-movement IPv4 network address 207 of the movement status management table 119 is substituted for the pre-movement IPv4 network address 208 and then the network address of the network to which the IPv4 mobile agent transmitting the IPv4 movement detection message is substituted for the post-movement IPv4 network address 207.

The IPv4 movement registration processing 60 described above will be explained more concretely. When the IPv4/v6 mobile node 106 moves from the LAN-a 100 to the LAN-b 101, the flow proceeds from Step 61 to Step 62 and further to Step 63, and transmits the IPv4 movement registration request message to the IPv4 mobile agent-a 105. After the IPv4 movement registration permission is received from the IPv4 mobile agent-a 105, the flow proceeds from Step 64 to Step 65. Next, "10.0.0.0" is set to the pre-movement IPv4 network address 208 while "20.0.0.0" is set to the post-movement IPv4 network address 207.

Figure 7:
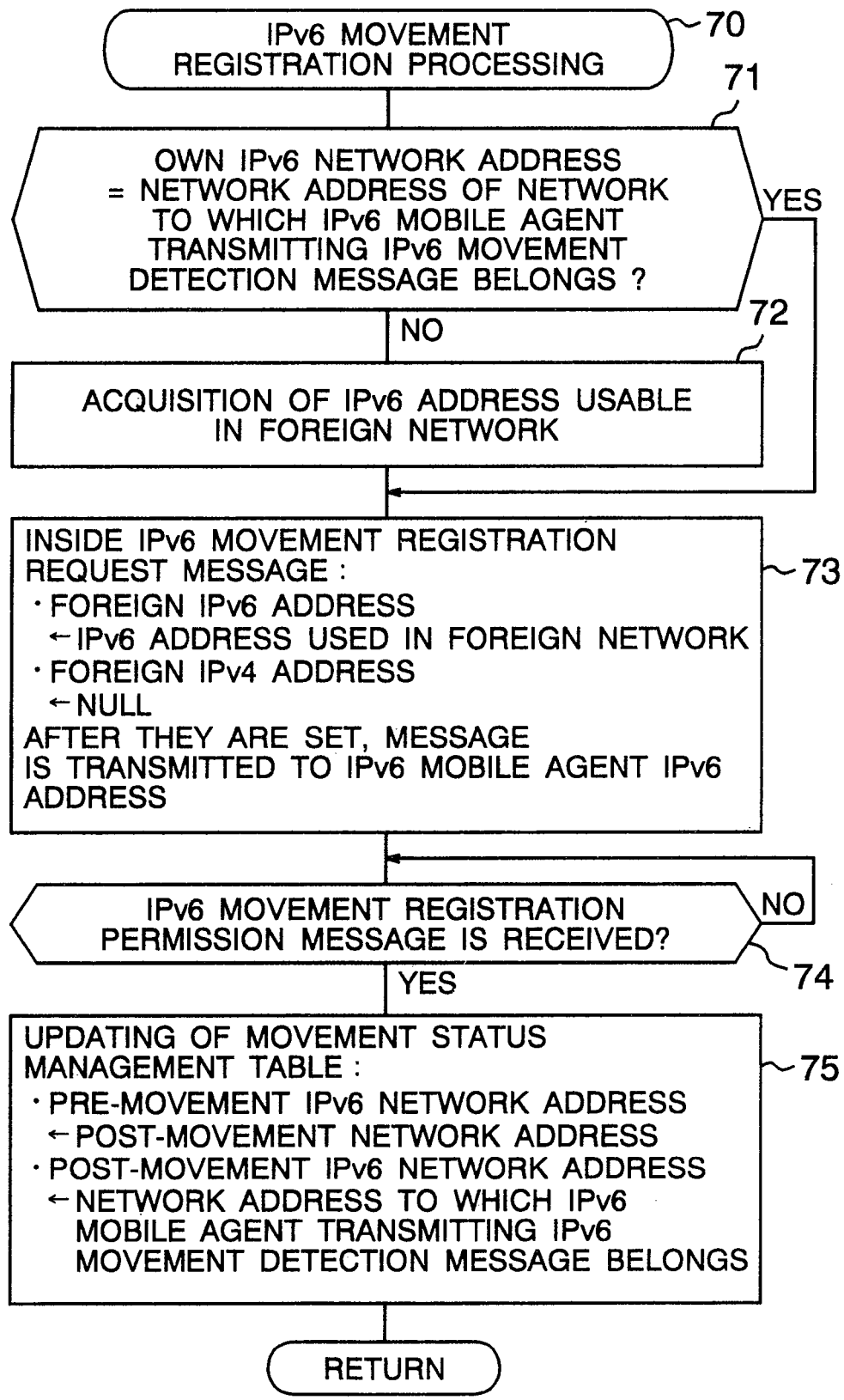
FIG. 7 is a flowchart showing an IPv6 movement registration processing in the IPv4/v6 mobile node shown in FIG. 1.

FIG. 7 is a flowchart showing an example of the IPv6 movement registration processing executed by the IPv6 movement registration processing portion 117. Incidentally, this IPv6 movement registration processing 70 is the processing that follows the processing procedure of the Mobile IPv6.

At Step 71, own IPv6 network address 203 of the movement status management table 119 is compared with the network address of the network to which the IPv6 mobile agent transmitting the IPv6 movement detection message belongs. When they are not the same network address, it is possible to know that the mobile node has moved to another network and the flow proceeds to Step 72. When they are the same network address, on the other hand, it is possible to know that the mobile node has returned to the LAN-a 100 in which the IPv6 mobile agent 107 assisting the movement of the IPv4/v6 mobile node 106 exists, and the flow then proceeds to Step 73.

At Step 72, the IPv6 address on the foreign network which the IPv4/v6 mobile node 106 can make use of is acquired. Acquisition of this IPv6 address is made by utilizing the DHCP for executing automatic distribution of the addresses or by manual setting, for example.

Figure 13:
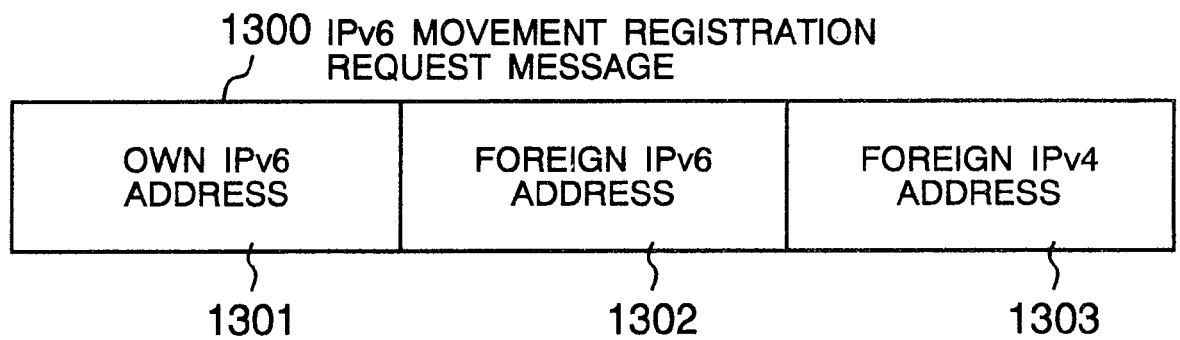
FIG. 13 is a structural view of an IPv6 movement registration request message.

At Step 73, the IPv6 movement registration request message is transmitted to the IPv6 mobile agent registered to the IPv6 mobile agent IPv6 address 206 of the movement status management table 119. This IPv6 movement registration request message contains its own IPv6 address 1301, the foreign IPv6 address 1302 and the foreign IPv4 address 303 as shown in FIG. 13. This IPv6 movement registration processing 70 sets the IPv6 address held by own IPv6 address 202 of the movement status management table 119 to its own IPv6 address 1301, the foreign IPv6 address to the foreign IPv6 address 1302 and "NULL" to the foreign IPv4 address 1303.

At Step 74, the IPv6 movement registration permission message as the reply to the IPv6 movement registration request message is awaited from the IPv6 mobile agent, and after this permission message is received, the flow proceeds to Step 75.

At Step 75, the post-movement IPv6 network address 209 of the movement status management table 119 is substituted for the pre-movement IPv6 network address 210 and then the network address of the network to which the IPv6 mobile agent transmitting the IPv6 movement detection message belongs is substituted for the post-movement IPv6 network address 209.

Figure 8:
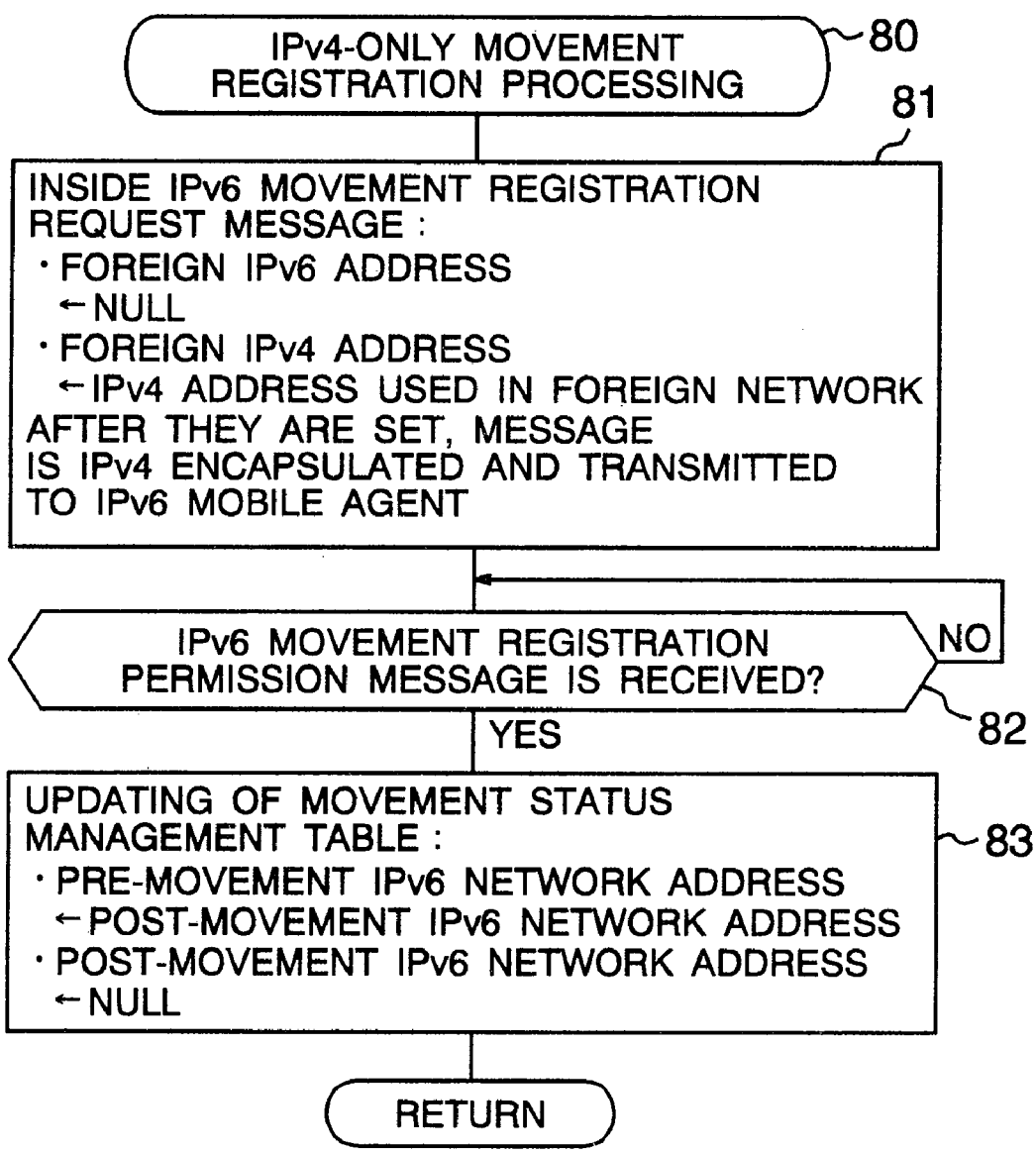
FIG. 8 is a flowchart showing an IPv4-only movement registration processing in the IPv4/v6 mobile node shown in FIG. 1.

FIG. 8 is a flowchart showing an example of the IPv4-only movement registration processing executed by the IPv4-only movement registration processing portion 118.

Figure 14:
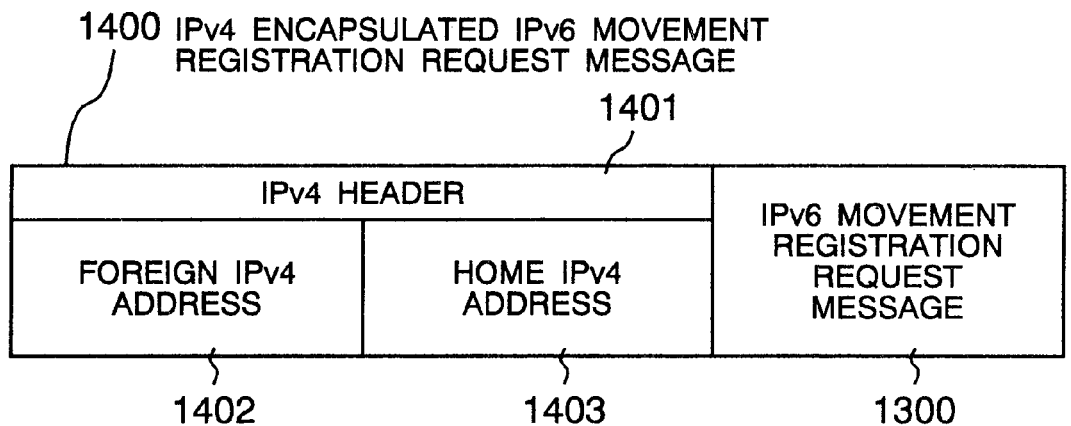
FIG. 14 is a structural view of an IPv4 encapsulated IPv6 movement registration request message.

At Step 81, the IPv4 encapsulated IPv6 movement registration request message is transmitted to the IPv6 mobile agent registered to the IPv6 mobile agent IPv6 address 206 of the movement status management table 119. As shown in FIG. 14, this IPv4 encapsulated IPv6 movement registration request message contains an IPv4 header 1401 and an IPv6 movement registration request message 1300. The IPv4 header 1401 contains in turn a foreign IPv4 address 1402 and a source IPv4 address 1403. The address of the IPv6 mobile agent IPv4 address 205 of the movement status management table 119 is set to the foreign IPv4 address 1402 and the IPv4 address acquired in the foreign IPv4 network is set to the source IPv4 address 1403. The IPv6 movement registration request message 1300 shown in FIG. 14 contains its own IPv6 address 1301, the foreign IPv6 address 1302 and the foreign IPv4 address 1303 as shown in FIG. 13.

The IPv4-only movement registration processing 80 sets the IPv6 address held by the IPv6 address 202 of the movement status management table 119 to its own IPv6 address 1301, "NULL" to the foreign IPv6 address 1302 and the IPv4 address at the destination to the foreign IPv4 address 1303.

At Step 82, the IPv4 encapsulated IPv6 movement registration permission request message as the reply to the IPv4 encapsulated IPv6 movement registration request message is awaited from the IPv6 mobile agent, and after this IPv4 encapsulated IPv6 movement registration permission message is received, and the flow proceeds to Step 83. Incidentally, the IPv4 processing portion 111 removes the IPv4 header from the IPv4 encapsulated IPv6 movement registration permission message (this procedure will be hereinafter called the "IPv4 decapsulation") and delivers it to the IPv4-only movement registration processing portion 118. This IPv4 decapsulation in the IPv4 processing portion 111 is one of the services offered by the existing IPv4.

At Step 83, the post-movement IPv6 network address 209 of the movement status management table 119 is substituted for the pre-movement IPv6 network address 210 and then "NULL" is substituted for the post-movement IPv6 network address 209.

The IPv4-only movement registration processing 80 described above will be explained more concretely. When the IPv4/v6 mobile node 106 has moved from the LAN-a 100 to the LAN-b 101, the following IPv4 encapsulated IPv6 movement registration request message 1400 is generated at Step 81.

IPv4 header:
foreign IPv4 address 1402: "10.0.0.20"
(IPv4 address of IPv6 mobile agent 107)
home IPv4 address 1403: "20.0.0.1"
(IPv4 address that the IPv4/v6 mobile node 106 uses afresh on the LAN-b 101)
IPv6 movement registration message 1300:
own IPv6 address 1301: "::11.0.0.1"
foreign IPv6 address 1302: "NULL"
foreign IPv6 address 1303: "20.0.0.1"

The IPv4 encapsulated IPv6 movement registration permission message 1400 is transmitted to the IPv6 mobile agent 107.

Next, after the IPv4 encapsulated IPv6 movement registration permission message is received from the IPv6 mobile agent 107 at Step 82, "::11.0.0.1" is set to the pre-movement IPv6 network address 210 at Step 83 and "NULL" is set to the post-movement IPv6 network address 209.

Figure 9:
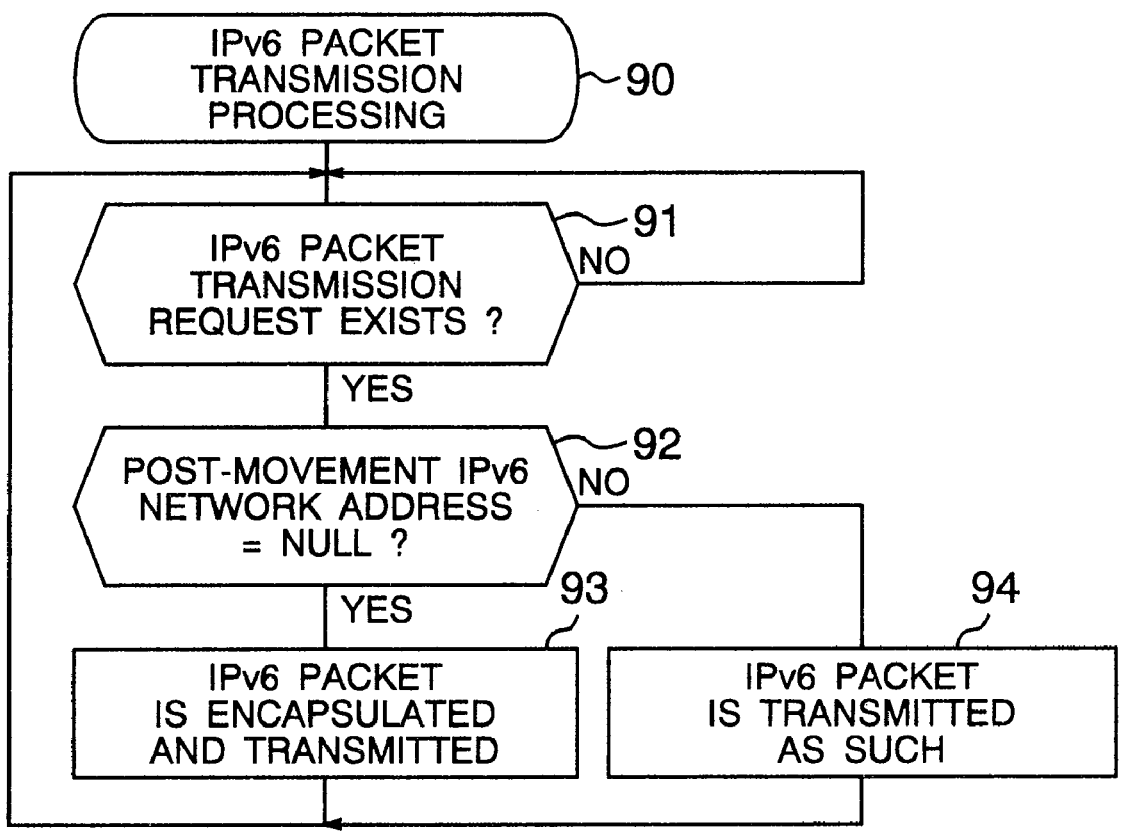
FIG. 9 is a flowchart showing an IPv6 packet transmission processing in the IPv4/v6 mobile node shown in FIG. 1.

FIG. 9 is a flowchart showing an example of the IPv6 packet transmission processing 90 executed by the IPv6 packet transmission processing portion 113 of the IPv6 processing portion 112 in the IPv4/v6 mobile node 106.

At Step 91, the IPv6 packet transmission request by the network application, etc., is awaited, and the flow proceeds to Step 92 if the transmission request is made.

At Step 92, whether or not the IPv6 network address 209 after the movement of the movement status management table 119 is "NULL" is checked and if it is "NULL", the flow proceeds to Step 93 and if it is not, the flow proceeds to Step 94.

Figure 15:
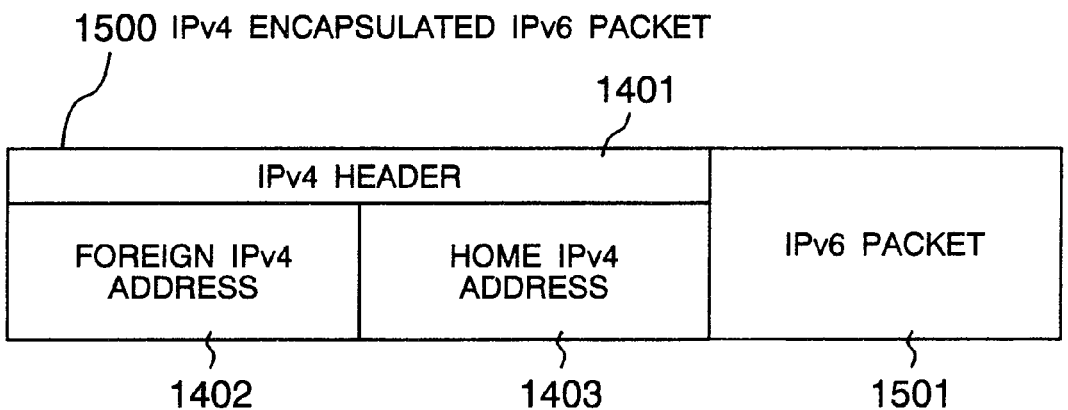
FIG. 15 is a structural view of an IPv4 encapsulated IPv6 packet.

At Step 93, since the destination is the IPv4 network, the IPv6 packet is encapsulated by IPv4 encapsulation and is transmitted. In other words, the IPv4 header 1401 is added to the IPv6 packet 1501 as shown in FIG. 15, the IPv6 mobile agent IPv4 address 205 of the movement status management table 119 is set to the foreign IPv4 address 1402 of that IPv4 header 1401, the IPv4 address acquired by the foreign IPv4 network is set to the home IPv4 address, and the IPv4 encapsulated IPv6 packet 1500 is generated and transmitted. The flow then returns to Step 91 described above.

At Step 94, since the destination is the IPv6 network or the IPv4/v6 network, the IPv6 is transmitted as such. The flow then returns to Step 91 described above.

The IPv6 packet transmission processing 90 will be explained more concretely. When the IPv4/v6 mobile node 106 moves from the LAN-a 100 to the LAN-b 101, for example, the IPv4/v6 mobile node 106 receives the transmission request of the IPv6 packet 1501 by the network application at Step 91. Then, "10.0.0.20" (IPv4 address of the IPv6 mobile agent 107) is set as the foreign IPv4 address to this IPv6 packet 1501 at Step 92 and furthermore, the IPv4 header 1401 to which "20.0.0.1" is set as the home IPv4 address 1403 is added. The IPv6 packet encapsulated by this IPv4 encapsulation is transmitted to the IPv6 mobile agent 107.

Figure 10:
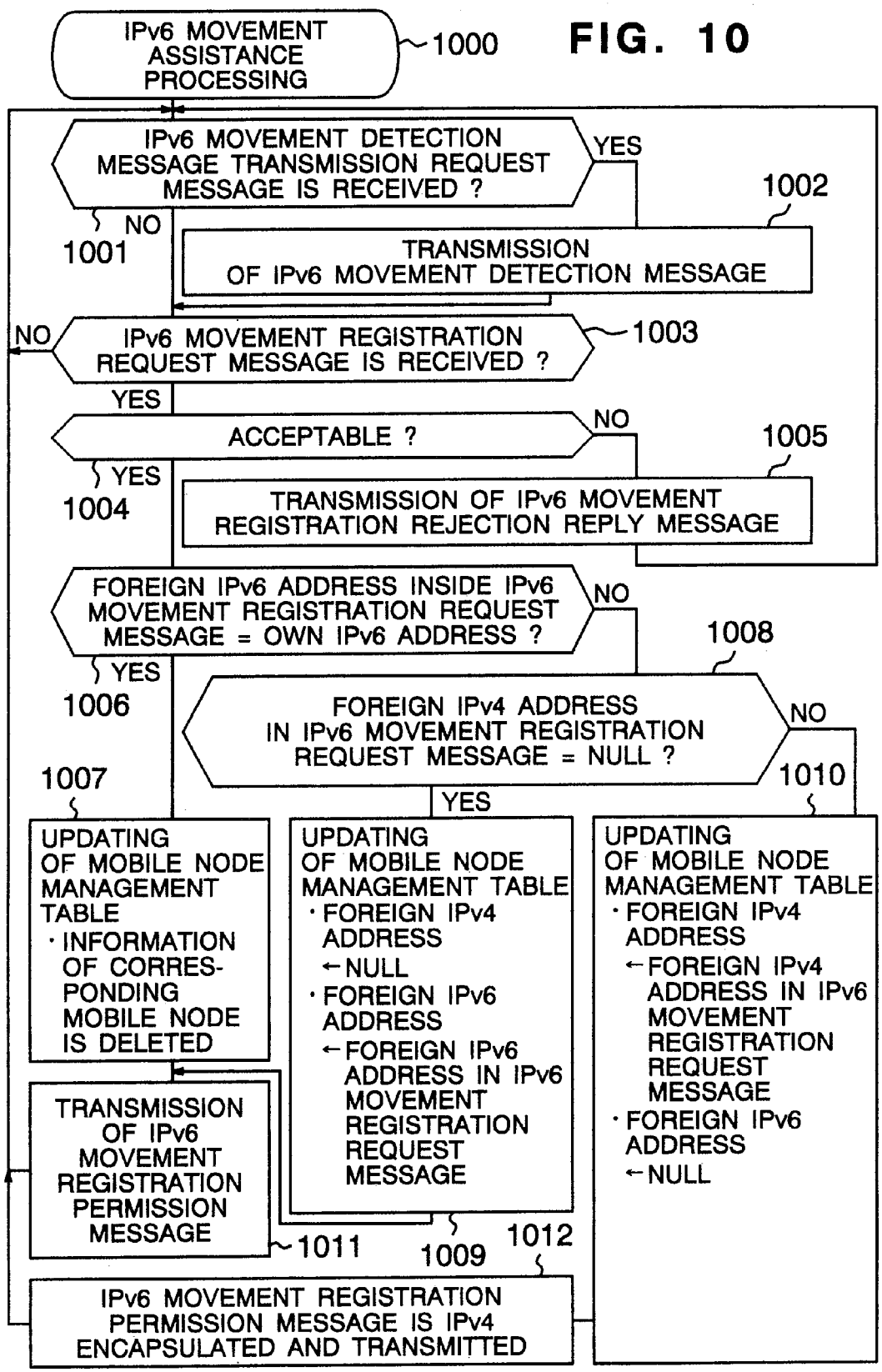
FIG. 10 is a flowchart showing an IPv6 movement assistance processing in an IPv6 mobile agent shown in FIG. 1.

FIG. 10 is a flowchart showing an example of the IPv6 movement assistance processing 1000 executed by the IPv6 movement assistance processing portion 121 of the IPv6 mobile agent 107.

At Step 1001, whether or not the message transmission request message for detecting the IPv6 movement is received from the IPv6 mobile node (not shown in the drawing) or the IPv4/v6 mobile node 106 is checked, and if it is, the flow proceeds to Step 1002 and if it is not, the flow proceeds to Step 1003.

At Step 1002, the IPv6 movement detection message is transmitted to the node which transmits the IPv6 movement detection message transmission request message described above.

At Step 1003, whether or not the IPv6 movement registration request message 1300 is received is checked, and if it is, the flow proceeds to Step 1004 and if it is not, the flow returns to Step 1001.

At Step 1004, whether or not the movement registration request can be accepted is checked, and if it cannot be accepted, the flow proceeds to Step 1005 and if it can, the flow proceeds to Step 1006.

At Step 1005, the IPv6 movement registration rejection message is transmitted to the node that transmits the IPv6 movement registration request message 1300. The flow then returns to Step 1001 described above.

At Step 1006, own IPv6 address 1301 of the IPv6 movement registration request message 1300 is compared with the foreign IPv6 address 1302 and when they are the same address, the flow proceeds to Step 1007 and when they are different addresses, the flow proceeds to Step 1008.

At Step 1007, the information of the corresponding mobile node inside the mobile node management table 126 is deleted by judging that this mobile node returns to its own network. The flow then proceeds to Step 1011.

At Step 1008, the foreign IPv4 address 1303 inside the IPv6 movement registration request message 1300 is checked, and if "NULL" is set, the flow proceeds to Step 1009 and if it is not, the flow proceeds to Step 1010.

At Step 1009, the information of the mobile node is set to the mobile node management table 126 by judging that this mobile node moves to the IPv6 network or to the IPv4/v6 network. In other words, the value of the foreign IPv6 address 1302 inside the IPv6 movement registration request message 1300 so received is set to the foreign IPv6 address 31 inside the mobile node management table 126 and "NULL" is set to the foreign IPv4 address 32. The flow then proceeds to Step 1011.

At Step 1010, the information of the corresponding mobile node is set to the mobile node management table 126 by judging that this mobile node has moved to the IPv4 network.

In other words, "NULL" is set to the foreign IPv6 address 31 inside the mobile node management table 126 while the value of the foreign IPv4 address 1303 inside the IPv6 movement registration request message 1300 so received is set to the foreign IPv4 address 32. The flow then proceeds to Step 1012.

At Step 1011, the IPv6 movement registration permission message is transmitted to the mobile node, and the flow returns to Step 1001 described above.

Figure 16:
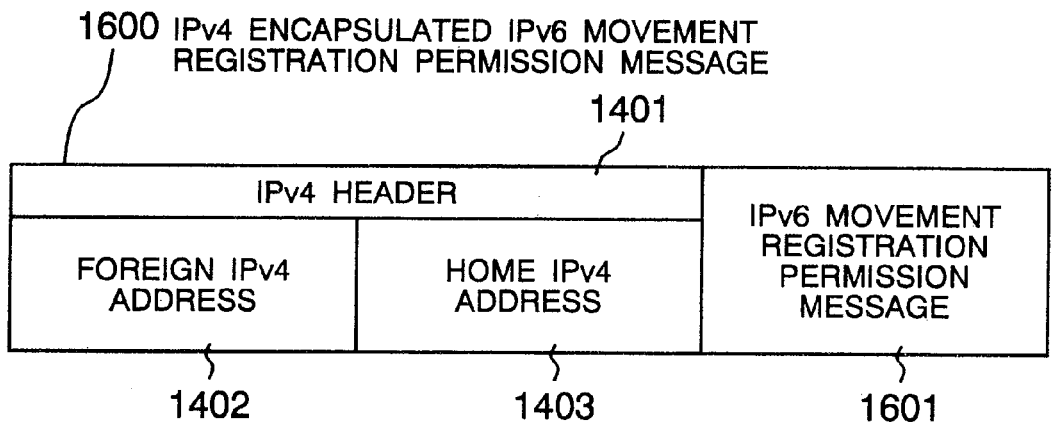
FIG. 16 is a structural view of an IPv4 encapsulated IPv6 movement registration permission message.

At Step 1012, the IPv6 movement registration permission message encapsulated by IPv4 encapsulation is transmitted to the mobile node. In other words, as shown in FIG. 16, the IPv4 header 1401 is added to the IPv6 movement registration permission message 1601, and the foreign IPv4 address 1303 inside the IPv6 movement registration request message 1300 is set to the foreign IPv4 address 1402 of the IPv4 header 1401. Further, the IPv4 address of the IPv6 mobile agent 107 is set to the home IPv4 address 1403 and the IPv4 encapsulated IPv6 movement registration permission message is generated and transmitted. The flow then returns to Step 1001.

Incidentally, when the IPv4/v6 mobile node 106 moves to the IPv4 network, the IPv4/v6 mobile node 106 transmits the IPv4 encapsulated IPv6 movement registration request message 1300 to the IPv6 mobile agent 107 as described already. When the IPv6 mobile agent 107 receives this IPv4 encapsulated IPv6 movement registration request message 1300, IPv4 decapsulation of this message is executed at the IPv4 processing portion 122 and the IPv6 movement registration request message 1300 is taken out and delivered to the IPv6 movement assistance processing portion 121. Since this processing is one of the services offered by the existing IPv4, any new function need not be added to the IPv4 processing portion 122.

The IPv6 movement assistance processing 1000 described above will be explained more concretely. When the IPv4/v6 mobile node 106 has moved from the LAN-a 100 to the LAN-b 101, the flow proceeds serially to Steps 1001, 1002, 1003 and 1004, and since the foreign IPv6 address 1302 (="NULL") inside the IPv6 movement registration request message 1300 is different from own IPv6 address 1301 (=":: 11.0.0.1") at Step 1005, the flow proceeds to Step 1008.

At Step 1008, since the foreign IPv4 address 1303 (="20.0.0.1") inside the IPv6 movement registration request message 1300 is not "NULL", the flow proceeds to Step 1010. At this Step 1010, "::11.0.0.1" is registered to the mobile node IPv6 address 30 in the mobile node management table 126 as the information of the IPv4/v6 mobile node 106, "20.0.0.1" is registered to the foreign IPv4 address 32, and "NULL" is registered to the foreign IPv6 address 31. At Step 1012, the IPv4 header 1401 to which "20.0.0.1" is set as the foreign IPv4 address 1402 and "10.0.0.20" is set as the home IPv4 address 1403 is added to the IPv6 movement registration permission message 1601 and is transmitted to the IPv4/v6 mobile node 106.

Figure 11:
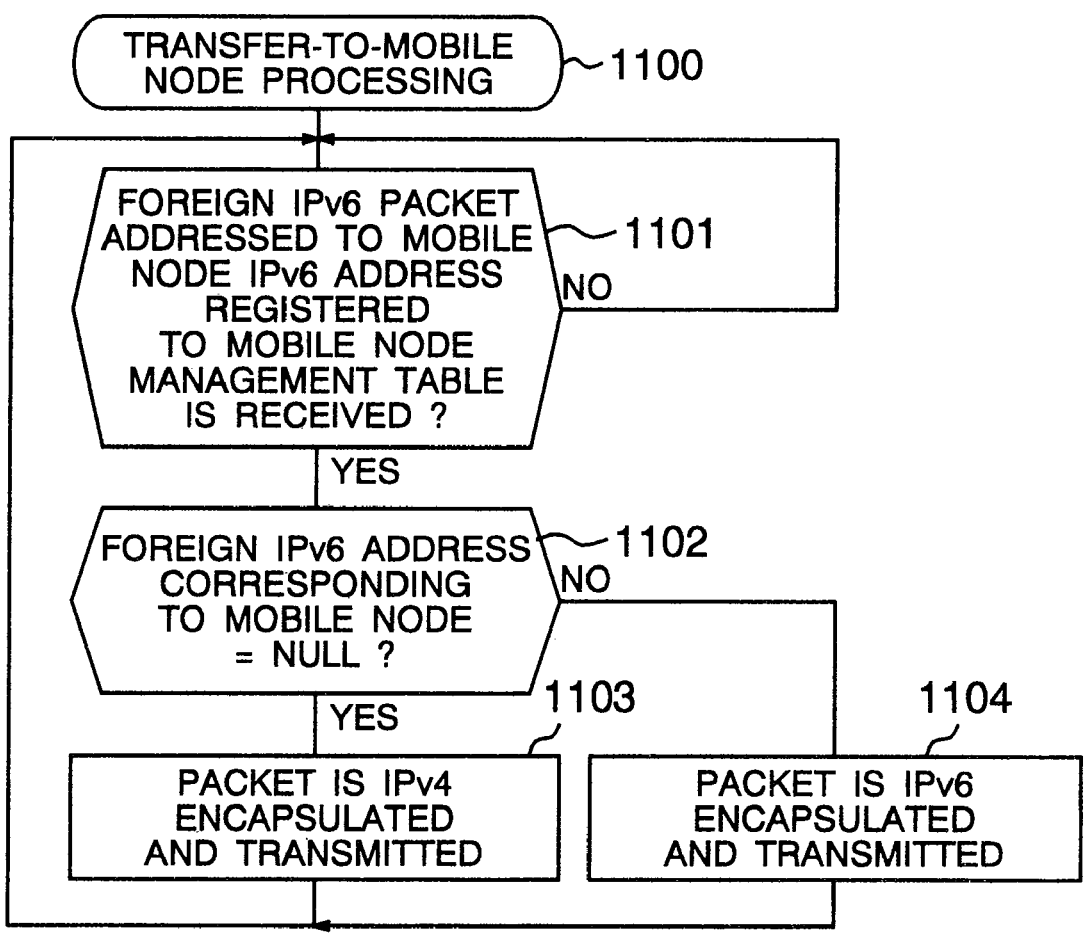
FIG. 11 is a flowchart showing a transfer-to-mobile node processing in the IPv6 mobile agent shown in FIG. 1.

FIG. 11 is a flowchart showing an example of the transfer-to-mobile node processing 1100 which is executed by the transfer-to-mobile node processing portion 125 of the IPv6 processing portion 124 in the IPv6 mobile agent 107.

At Step 1101, reception of the IPv6 packet to the mobile node registered to the mobile node management table 126 among the IPv6 packets transmitted by the IPv6 node 104 and other IPv6 nodes (not shown in the drawing) is awaited, and after this packet is received, the flow proceeds to Step 1102.

At Step 1102, whether or not the foreign IPv6 address 31 of the corresponding mobile node inside the mobile node management table 126 is "NULL" is checked, and if it is "NULL", the flow proceeds to Step 1103 and if it is not, the flow proceeds to Step 1104.

At Step 1103, the mobile node as the destination of the IPv6 packet is judged as moving to the IPv4 network, and the IPv6 packet is encapsulated by IPv4 encapsulation and is transmitted to the IPv4 network to which the mobile node as the destination of this packet is moving. The structure of the IPv4 encapsulated IPv6 packet at this time is shown in FIG. 15. The foreign IPv4 address 32 of the corresponding mobile node inside the mobile node management table 126 is set to the foreign IPv4 address 1402 and the IPv4 address of the IPv6 mobile agent 107 is set to the home IPv4 address 1403. The flow then returns to Step 1101.

Figure 17:
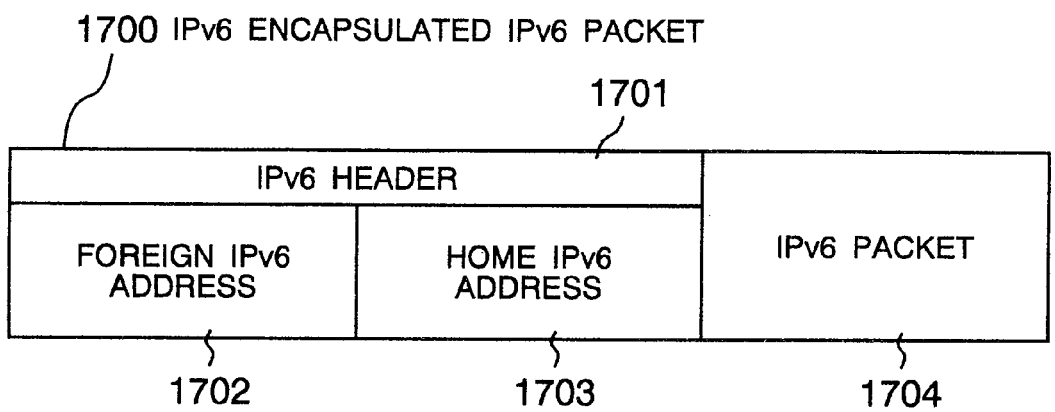
FIG. 17 is a structural view of an IPv6 encapsulated IPv6 packet.

At Step 1104, the mobile node as the destination of the IPv6 packet is judged as moving to the IPv6 network or to the IPv4/v6 network, and the IPv6 header is added afresh to the IPv6 packet (this processing will be hereinafter called "IPv6 encapsulation") and is transmitted to the IPv6 network or to the IPv4/v6 network to which the mobile node is moving. In other words, as shown in FIG. 17, the IPv6 header 1701 is added to the IPv6 packet 1704, the foreign IPv6 address 31 of the corresponding mobile node inside the mobile node management table 126 is set to the foreign IPv6 address 1702 of its IPv6 header 1701, the IPv6 address of the IPv6 mobile agent 107 is set to the home IPv6 address 1703 and the IPv6 encapsulated IPv6 packet 1700 is generated and transmitted. The flow then returns to Step 1101. Incidentally, the processing procedure for encapsulating the IPv6 packet by the IPv6 encapsulation is the procedure that follows the Mobile IPv6.

The transfer-to-mobile node processing 1100 described above will be explained more concretely. When the IPv4/v6 mobile node 106 has moved from the LAN-a 100 to the LAN-b 101, "::11.0.0.1" is set as the information of the IPv4/v6 mobile node 106 to the mobile node IPv6 address 30 inside the mobile node management table 126 by the IPv6 movement assistance processing 1000 described already, "NULL" is set to the foreign IPv6 address 31 and "20.0.0.1" is set to the foreign IPv4 address 32. Therefore, when the IPv6 mobile agent 107 receives the IPv6 packet addressed to the IPv4/v6 mobile node 106, it adds the header IPv4 header 1401, in which "20.0.0.1" is set to the foreign IPv4 address 1402 and "10.0.0.20" is set to the home IPv4 address 1403, to this IPv6 packet and transfers it to the IPv4/v6 mobile node 106 of the LAN-b 101. This IPv4 encapsulated IPv6 packet 1500 is received by the IPv4/v6 mobile node 106, is IPv4-decapsulated by the IPv4 processing portion 111 and is processed as the ordinary IPv6 packet.

In this way, even when the IPv4/v6 mobile node moves from the LAN-a 100 as the IPv4/v6 network to the LAN-b 101 as the IPv4 network, this mobile node can receive the IPv6 packet transmitted by the IPv6 node 104 of the LAN-a 100.

Figure 12:
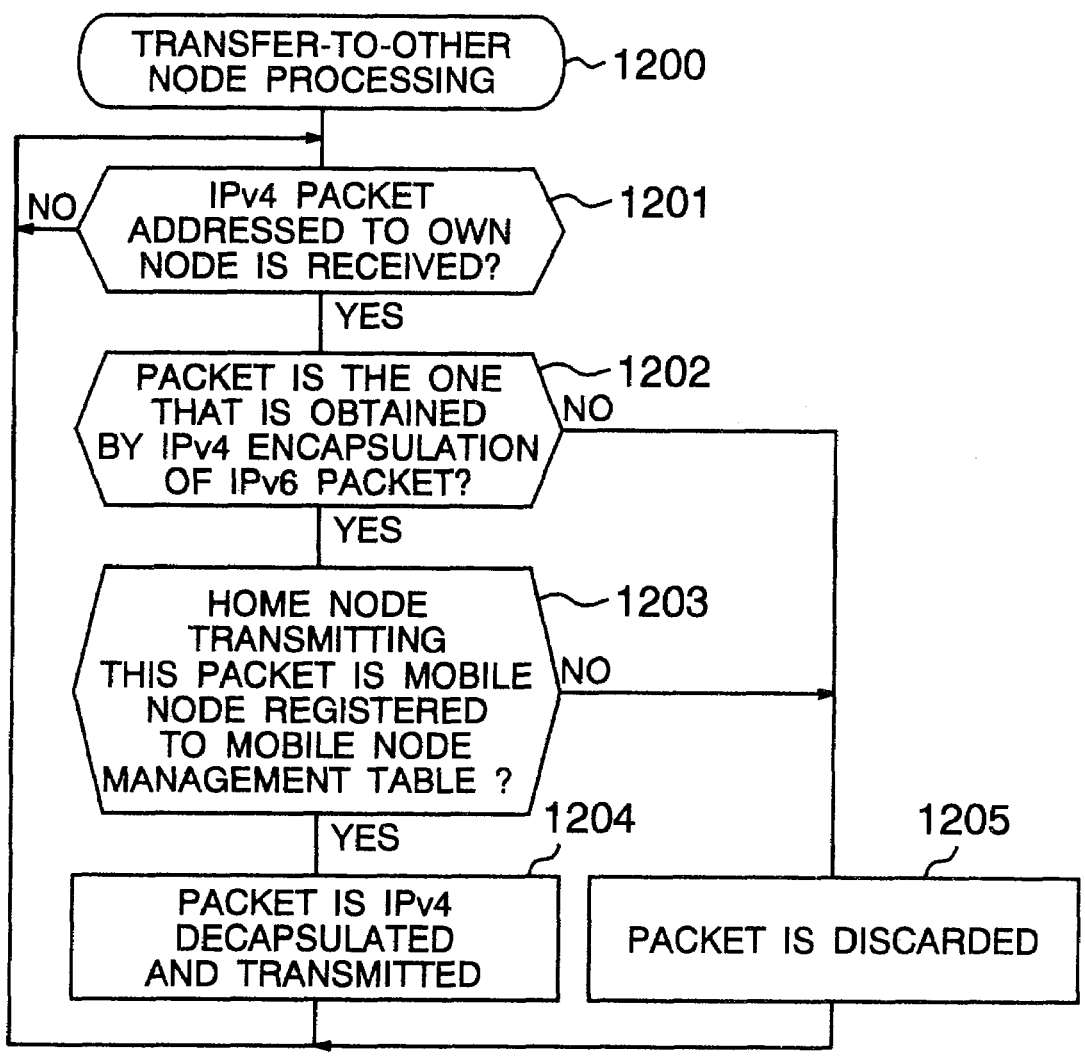
FIG. 12 is a flowchart showing a transfer-to-other node processing in the IPv6 mobile agent shown in FIG. 1.

FIG. 12 is a flowchart showing an example of the transfer-to-other node processing 1200 executed by the transfer-to-other node processing portion 123 of the IPv4 processing portion 122 in the IPv6 mobile agent 107.

At Step 1201, the mobile agent awaits the reception of the IPv4 packet addressed to its own (IPv6 mobile agent 107) and when this packet is received, the flow proceeds to Step 1202.

At Step 1202, whether or not the IPv4 packet so received is the IPv6 packet encapsulated by IPv4 encapsulation is checked, and when it is the IPv4 encapsulated IPv6 packet, the flow proceeds to Step 1203 and when it is not, the flow proceeds to Step 1205.

At Step 1203, whether or not the home node of the IPv4 encapsulated IPv6 packet is the mobile node registered to the mobile node management table 126 is checked, and if it is registered, the flow proceeds to Step 1204 and if it is not, the flow proceeds to Step 1205.

At Step 1204, the IPv4 encapsulated IPv6 packet is decapsulated by IPv4 decapsulation and is transmitted to the network where the node as the destination exists. The flow then returns to Step 1201.

At Step 1205, the IPv4 packet so received is discarded. The flow then returns to Step 1201.

The transfer-to-other node processing 1200 described above will be explained more concretely. Let's consider the case where the IPv4/v6 mobile node 106 transmits the IPv6 packet to the IPv6 node 104. In this instance, the IPv6 packet is subjected to IPv4 encapsulation by the IPv6 packet transmission processing 90 by using the IPv4 header 1401 in which "10.0.0.20" is set as the foreign IPv4 address 1402 (addressed to the IPv6 mobile agent 107) and "20.0.0.1" is set as the home IPv4 address 1403, and the IPv4 encapsulated IPv6 packet is transmitted to the IPv6 mobile agent 107. Receiving this packet, the IPv6 mobile agent 107 removes the IPv4 header 1401 of the IPv4 encapsulated IPv6 packet at Step 1204 after passing through Steps 1201, 1202 and 1203, and transmits the IPv6 packet 1501 to the LAN-a 100 in which the IPv6 node 104 as the address exists. This IPv6 packet is received as the ordinary IPv6 packet by the IPv6 node 104.

As described above, even when the mobile node has moved from the LAN-a 100 as the IPv4/v6 network to the LAN-b 101 as the IPv4 network, the IPv4/v6 mobile node 106 can transmit the IPv6 packet to the IPv6 node 104 of the LAN-a 100.

Incidentally, communication utilizing the IPv4 between the IPv4/v6 mobile node 106 and other nodes can be carried out by the movement assistance of the nodes in the IPv6 by the IPv4 mobile agent-1 105 and the IPv4 mobile agent-b 108 supporting the Mobile IPv4 as the existing method.

When the IPv4/v6 mobile node 106 returns from the LAN-b 101 to the LAN-a 100, the IPv4/v6 mobile node 106 detects the movement to the IPv6 or to the IPv4/v6 network by the movement detection processing described above. The mobile node is judged as returning to the LAN-a 100 by the IPv6 movement registration processing 70, and transmits the IPv6 movement registration request message 1300 in which "::11.0.0.1" is set to its own IPv6 address, "::11.0.0.1" which is the same as its own IPv6 address 1301 to the foreign IPv6 address 1302 and "NULL" to the foreign IPv4 address 1303, to the IPv6 mobile agent 107.

Receiving the IPv6 movement registration request message 1300, the IPv6 mobile agent 107 judges that the IPv4/v6 mobile node 106 returns to the LAN-a 100 because its own IPv6 address inside the IPv6 movement registration request message 1300 is the same as the foreign IPv6 address 1302, and omits the information on the IPv4/v6 mobile node 106 inside the mobile node management table 126. As a result, the IPv4/v6 mobile node 106 can make communication utilizing the ordinary IPv6.

Incidentally, the IPv4/v6 mobile node 106 reports its return to the LAN-a 100 to the IPv4 mobile agent-a 105, too, by the IPv4 movement registration request message in accordance with the Mobile IPv4 processing procedure and for this reason, communication utilizing the ordinary IPv4 can be made, too.

The embodiment given above automatically detects the movement between the networks by utilizing the IPv4 movement detection message and the IPv6 movement detection message, but it is also possible to employ the construction in which the user of the mobile node reports by himself to the movement detection processing portion 116 so as to execute the IPv4 movement registration processing 60, the IPv6 movement registration processing 70 or the IPv4-only movement registration processing 80.

Next, another embodiment of the present invention will be explained with reference to the drawings.

First, the explanation will be given on the case where the IPv4/v6 mobile node moves from the IPv4/v6 network to the IPv4 network.

Figure 18:
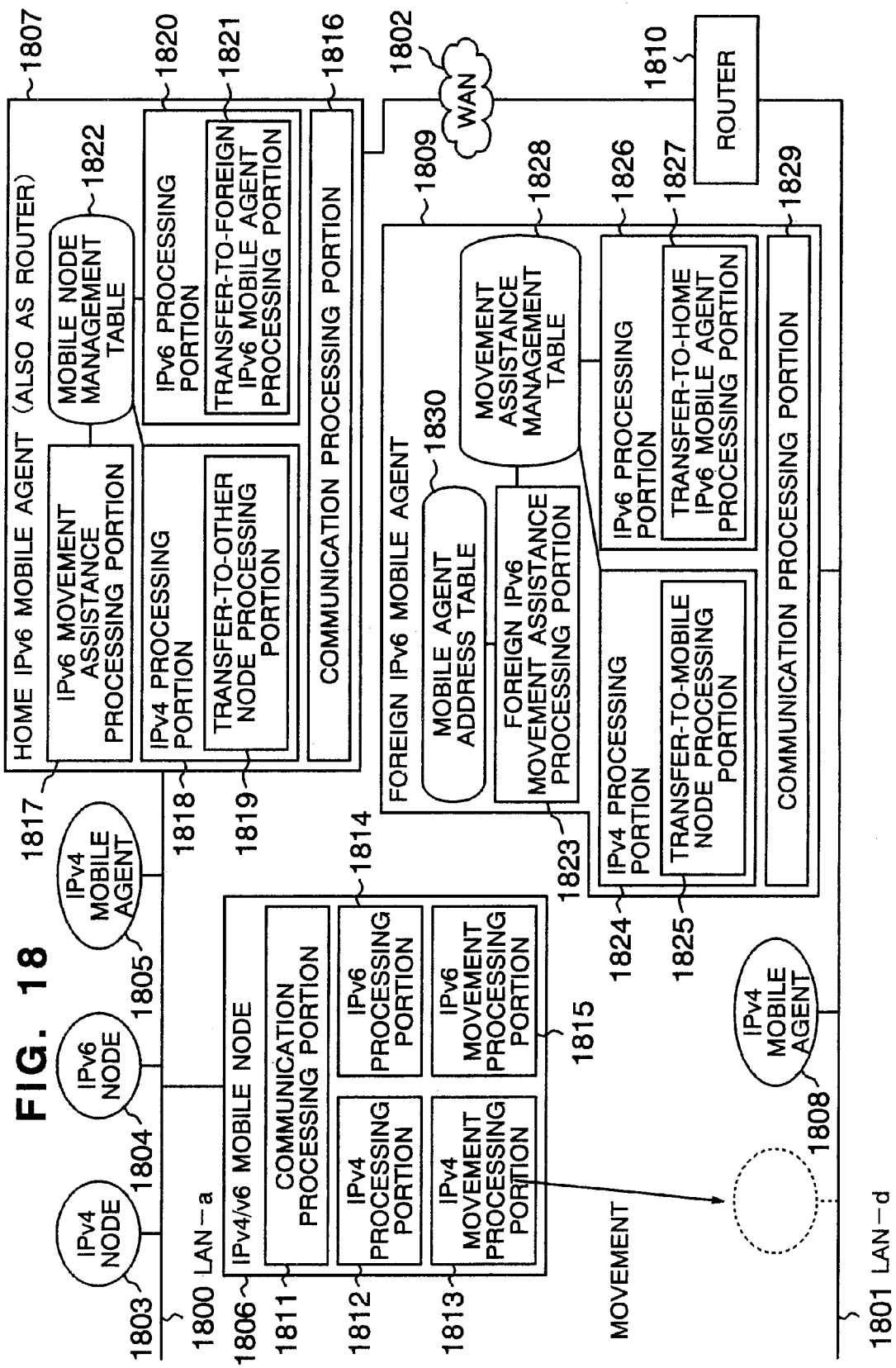
FIG. 18 is a structural view showing an example of a network to which the present invention is applied.

A structural example of the network system to which the present invention is applied and a structural example of the mobile agent will be explained with reference to FIG. 18. As shown in the drawing, the network system according to this embodiment includes a LAN-a 1800, a LAN-b 1801 and a WAN 1802 that connects the LAN-a 1800 and the LAN-b 1801 by a public line or an exclusive line. On the LAN-a 1800 exist an IPv4 node 1803 which executes communication by utilizing only the IPv4 as a protocol of a network layer as the third layer of an OSI reference model, an IPv6 node 1804 which executes communication by utilizing only the IPv6, an IPv4 mobile agent-a 1805 which assists the movement between the networks for the nodes executing communication by utilizing the IPv4 in accordance with the procedure of the Mobile IPv4, an IPv4/v6 mobile node 1806 which executes communication by utilizing both IPv4 and IPv6 and moves between the networks, and a home IPv6 mobile agent 1807 which assists the movement of a node when the node executing communication by utilizing the IPv6 modes to another network.

On the LAN-b 1801 exist an IPv4 mobile agent-b 1808 and a foreign IPv6 mobile agent 1809 which assists the movement of a node when the node executing communication by utilizing the IPv4 and the IPv6 and executing communication by utilizing IPv6 comes to the LAN-b 1801.

Incidentally, the home IPv6 mobile agent 1807 functions also as a router handling both of the IPv4 packet and the IPv6 packet and connects the LAN-a 1800 and the WAN 1802. The router 1810 handling only the IPv4 packet connects the LAN-b 1801 and the WAN 1802. Therefore, whereas both of the IPv4 packet and the IPv6 packet can come out from the networks beyond the router from the LAN-a 1800, only the IPv4 packet can come out from the LAN-b 1801. Incidentally, transmission/reception itself of the IPv4 packet and the IPv6 packet can be made inside the LAN-a 1800 and the LAN-b 1801.

In this embodiment, the IP addresses are listed below:

|  | IPv4 address | IPv6 address |
| --- | --- | --- |
| IPv4 node 1803 | "10.0.0.10" |  |
| IPv6 node 1804 |  | "11::20" |
| IPv4/v6 mobile node 1806 | "10.0.0.30" | "11::30" |
| IPv4 mobile agent-a 1805 | "10.0.0.11" |  |
| home IPv6 mobile agent 1807 | "10.0.0.1" | "11::1" |
| IPv4 mobile agent-b 1808 | "20.0.0.11" |  |
| foreign IPv6 mobile agent 1809 | "20.0.0.1" | "21::1" |

The IPv4/v6 mobile node 1806 comprises an IPv4 movement processing portion 1813 which executes a processing in accordance with the Mobile IPv4 when the node moves to another IPv4 network or to an IPv4/v6 network, an IPv6 movement processing portion 1815 which executes a processing in accordance with the Mobile IPv6 when the mobile node moves to another IPv6 network or to an IPv4/v6 network, an IPv4 processing portion 1812 which executes a processing in accordance with the services offered by the IPv4, an IPv6 processing portion 1814 which executes a processing in accordance with the services offered by the IPv6 and a communication processing portion 1811 which executes a transmission/reception control, etc. of a packet to the LAN.

The home IPv6 mobile agent 1807 comprises an IPv6 movement assistance portion 1817 which assists the movement for the mobile node (not particularly shown in the drawing) executing communication by utilizing the IPv6 and moving between the networks or for an IPv6 mobile node 1806, a mobile node management table 1822 which manages the information of the mobile node that has moved to another IPv6 network or to the IPv4/v6 network, an IPv6 processing portion 1818 which executes a processing in accordance with the services offered by the IPv4, a transfer-to-other node processing portion 1819 which executes a transfer processing of the IPv6 packet, which is transferred from the foreign IPv6 mobile agent 1809 and is transmitted by the IPv4/v6 mobile node 1806, to the IPv6 node as the destination, an IPv6 processing portion 1820 which executes a processing in accordance with the services offered by the IPv6, a transfer-to-foreign IPv6 mobile agent processing portion 1821 which executes a transfer processing of the IPv6 packet, which is transmitted from another IPv6 node to the IPv4/v6 mobile node 1806, to the foreign IPv6 mobile agent 1809 and a communication processing portion 1816 which executes a transmission/reception control, etc. of the packet to the LAN.

The foreign IPv6 mobile agent 1809 comprises a foreign IPv6 movement assistance portion 1823 which assists the movement of the IPv4/v6 mobile node 1806 when this node 1806 moves to the network (LAN-b 1801) to which the foreign IPv6 mobile agent 1809 belongs, a movement assistance management table 1828 which manages the information of this mobile node 1806, a mobile agent address table 1830 which registers the address information of the home IPv6 mobile agent 1807, an IPv4 processing portion 1824 which executes a processing in accordance with the services offered by the IPv4, a transfer-to-mobile node processing portion 1825 which executes a processing for transferring the packet, which is transferred from the home IPv6 mobile agent 1807 and is addressed to the IPv4/v6 mobile node 1806, to the IPv4/v6 mobile node 1806, an IPv6 processing portion 1826 which executes a processing in accordance with the services offered by the IPv6, a transfer-to-home IPv6 mobile agent processing portion 1812 which executes a processing for transferring the IPv6 packet, which is transmitted by the IPv4/v6 mobile node 1810 to another IPv6 node, to the home IPv6 mobile agent 1807, and a communication processing portion 1829 which executes a transmission/reception control, etc. of the packet to the LAN.

Among the constituent elements of the home IPv6 mobile agent 1807 described above, it is the IPv6 movement assistance portion 1817, the transfer-to-other node processing portion 1819, the transfer-to-foreign IPv6 mobile agent processing portion 1821 and the mobile node management table 1822 that constitute the characterizing part of the present invention. Among the constituent elements of the foreign IPv6 mobile agent 1809, it is the foreign IPv6 movement assistance portion 1823, the transfer-to-mobile node processing portion 1825, the transfer-to-home IPv6 mobile agent processing portion 1827, the mobile agent address table 1830 and the mobile agent management table 1828 that constitute the characterizing part of the present invention.

FIG. 19 shows an example of the mobile node management table 1822. As shown in this drawing, the mobile node management table 1822 includes a mobile node IPv6 address 1920 as the IPv6 address of the mobile node, the foreign IPv6 address 1921 representing the IPv6 address which the mobile node makes use of in the foreign IPv6 network or in the foreign IPv4/v6 network, and a foreign IPv6 mobile agent IPv4 address 1922 representing the IPv4 address of the foreign IPv6 mobile agent 109. Here, when the mobile node moves to the IPv6 network or to the IPv4/v6 network, "NULL" is set to the foreign IPv6 mobile agent IPv4 address 1922 and when the mobile node moves to the IPv4 network, the IPv4 address of the foreign IPv6 mobile agent 1809 existing inside that network is set to the address 1922. Incidentally, though the drawing shows the case where the entries for a plurality of mobile nodes exist, the entry of the mobile node does not exist in this table under the initial state. Further, the updating processing of this table will be described later.

Figure 20:
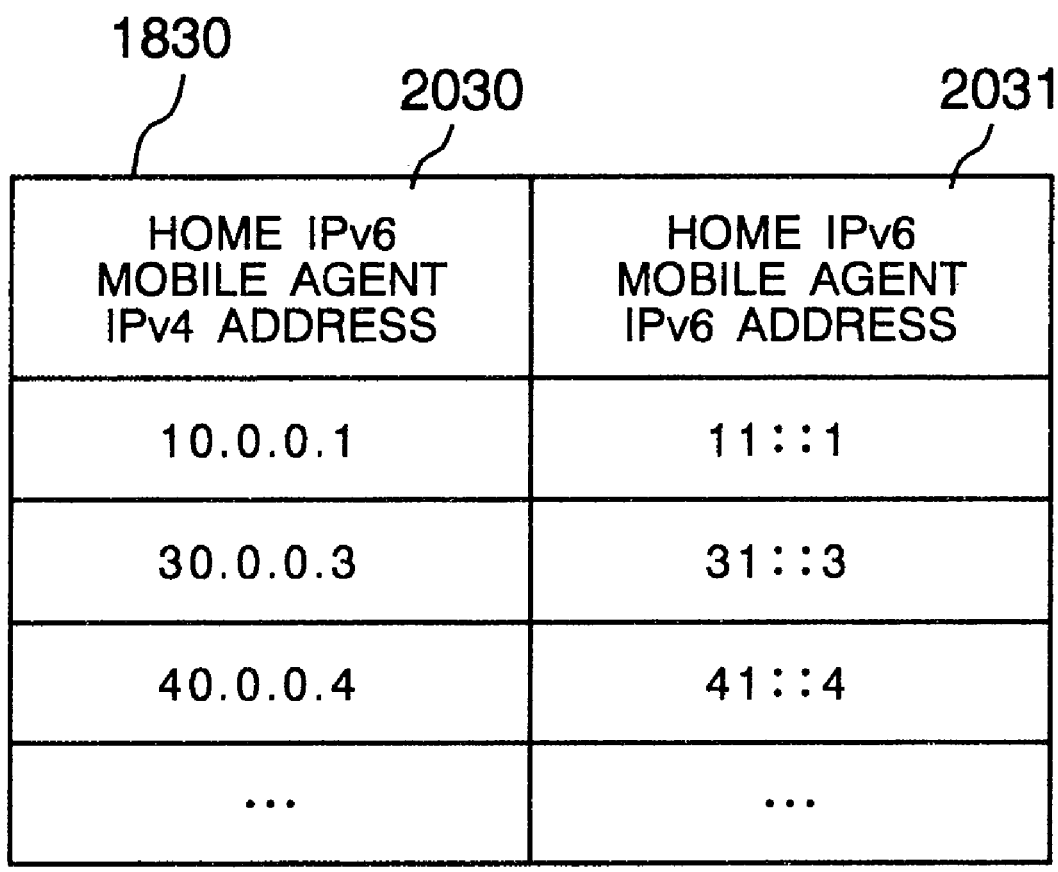
FIG. 20 is an explanatory view showing a structural example of a mobile agent address table used in a foreign IPv6 mobile agent shown in FIG. 18.

FIG. 20 shows an example of the mobile agent address table 1830 described above. As shown in this drawing, the mobile agent address table 1830 includes the home IPv6 mobile agent IPv4 address 2030 and the home IPv6 mobile agent IPv6 address 2031 as the IPv4 address and the IPv6 address of all the home IPv6 mobile agents existing in the network system (though this embodiment represents only the home IPv6 mobile agent 1807 on LAN-a 1800). This table is set by a manager, for example.

FIG. 21 shows an example of the movement assistance management table 1828 described above. As shown in the drawing, the movement assistance management table 1828 includes a mobile node IPv6 address 2140 as the IPv6 address of the IPv4/v6 mobile node 1806, a home IPv6 mobile agent IPv4 address 2141 as the IPv4 address of the home IPv6 mobile agent 1807 existing in the home network of the mobile node, and a registration flag 2142 representing whether the entry is "tentative registration" or "real registration". Incidentally, though this drawing represents the case where the entries for a plurality of mobile nodes exist, the entry of the mobile node does not exist in this table under the initial state. The updating processing of this table will be described later.

In the construction described above, the processings of the IPv4/v6 mobile node 1806, the home IPv6 mobile agent 1807 and the foreign IPv6 mobile agent 1809 when the IPv4/v6 mobile node 1806 moves from the LAN-a 1800 as the IPv4/v6 network to the LAN-b 1801 as the IPv4 network, and handling of each table described above, will be explained next in detail.

Figure 22:
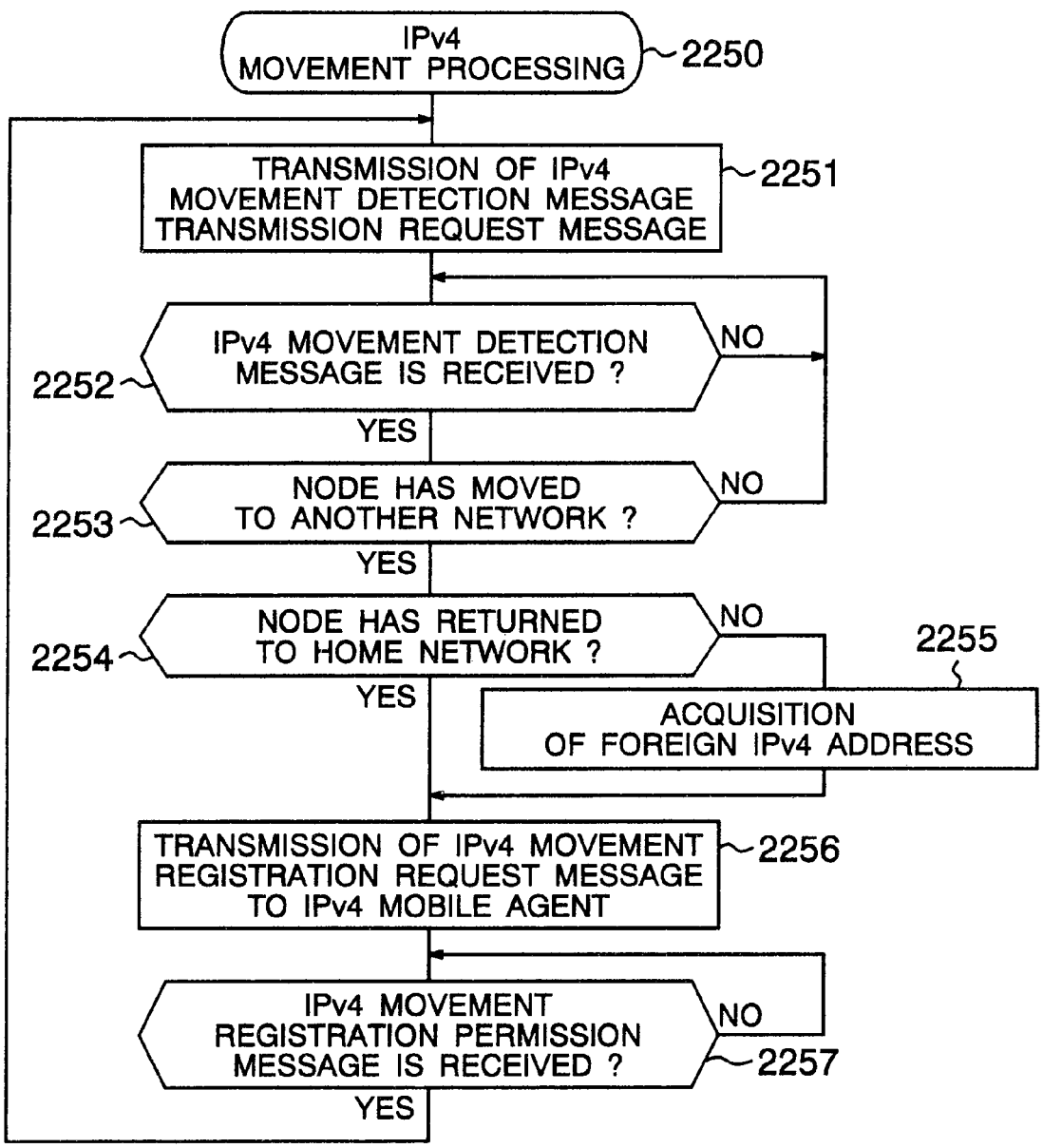
FIG. 22 is an operation flowchart showing an example of the procedure of an IPv4 movement processing in an IPv4/v6 mobile node shown in FIG. 18.

FIG. 22 is a flowchart showing an example of the processing of the IPv4 movement processing portion 1812 for detecting whether or not the IPv4/v6 mobile node 1806 has moved to another IPv4 network or to the IPv4/v6 network, and for executing various processings when the mobile node has moved. By the way, this IPv4 movement processing portion 1812 executes the processing in accordance with the processing procedure of the Mobile IPv4.

The IPv4 movement processing portion 1812 first transmits the message transmission request message for detecting the IPv4 movement as the message for requesting the transmission of the IPv4 movement detection message, which is in turn the message for detecting the movement of the mobile node to another IPv4 network or to the IPv4/v6 network (Step 2251). Incidentally, the IPv4 movement detection message is transmitted by the IPv4 mobile agent either periodically or when it receives the transmission request message of the IPv4 movement detection. Next, the IPv4 movement processing portion 1812 judges whether or not the IPv4 movement detection message is received (Step 2252). When the IPv4 movement detection message is received (Step 2252YES), the IPv4 movement processing portion 1812 judges from this message whether or not the mobile node moves to another network (Step 2253). Incidentally, the network address information is set inside the IPv4 movement detection message, and the movement is detected by comparing this address information with the IPv4 address of the IPv4/v6 mobile node 1806 of its own.

When the movement of the mobile node to another network is found as a result of the judgement described above (Step 2253YES), the IPv4 movement processing portion 1812 judges next whether or not the network as the visiting network is the home network of the IPv4/v6 mobile node 1806 (the LAN-a 1800 is the home network in this embodiment) (Step 2254). The IPv4 movement detection message is utilized at the time of this judgement, too. When it is not the home network as a result of this judgement, (Step 2254NO), the IPv4 movement processing portion 1812 then acquires the foreign IPv4 address that is used by the IPv4 mobile node-a 1805 when it transfers the IPv4 packet bound to the IPv4/v6 mobile node 1806 to the mobile node that is moving to another network (Step 2255). The IPv4/v6 mobile node 1806 acquires this foreign IPv4 address from the addresses offered by the IPv4 mobile agent-b 1808 or by utilizing the DHCP that automatically distributes the addresses, or by manual setting.

To report and register the movement to the IPv4 mobile agent-a 1805, the IPv4 movement processing portion 1812 transmits the IPv4 movement registration message (Step 2256). Thereafter, the IPv4 movement processing portion 1812 waits for the IPv4 movement registration permission message as the reply of the IPv4 movement registration request message from the IPv4 mobile agent-a 1805 (Step 2257) and after this message is received (Step 2257YES), the flow returns again to the first step 2251. The IPv4 movement processing portion 1812 repeats the processing described above.

Figure 23:
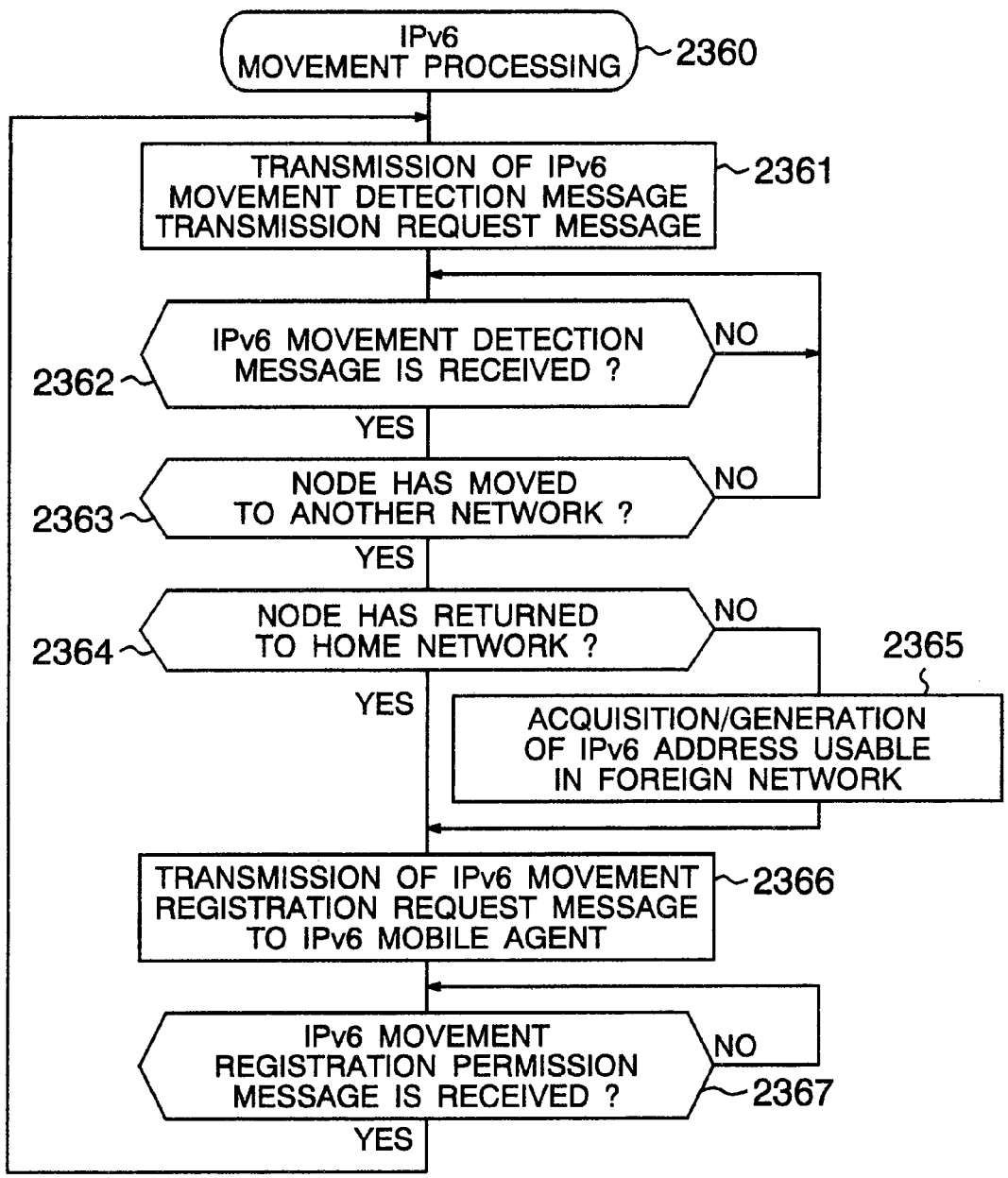
FIG. 23 is an operation flowchart showing an example of the procedure of an IPv6 movement processing in the IPv4/v6 mobile node shown in FIG. 18.

FIG. 23 is a flowchart showing an example of the processing of the IPv6 movement processing portion 1815 for detecting whether or not the IPv4/v6 mobile terminal 1806 has moved to another IPv6 network or to the IPv4/v6 network and for executing various processings when this mobile node has moved. Incidentally, this IPv6 movement processing portion 1815 executes the processing in accordance with the procedure of the Mobile IPv6.

The IPv6 movement processing portion 1815 first transmits the message transmission request message for detecting the IPv6 movement, which is the message for requesting the transmission of the IPv6 movement detection message as the message for detecting the movement to another IPv6 network or to the IPv4/v6 network (Step 2361). Incidentally, this IPv6 movement detection message is transmitted by the IPv6 mobile agent either periodically or when it receives the message transmission request message for detecting the IPv6 movement. Next, the IPv6 movement processing portion 1815 judges whether or not the IPv6 movement detection message is received (Step 2362). When this IPv6 movement detection message is received (Step 2362YES), the IPv6 movement processing portion 1815 judges from this message whether or not the mobile node has moved to another network (Step 2362). Incidentally, the network address information is set into the IPv6 movement detection message, and the movement detection is executed by comparing this address information with its own IPv6 address of the IPv4/v6 mobile terminal 1806.

If the result of judgement represents that the mobile node has moved to another network (Step 2363YES), the IPv6 movement processing portion 1815 judges next whether or not the visiting network is the home network (the LAN-a 1800 is the home network in this embodiment) (Step 2364). The IPv6 movement detection message is utilized for this judgement, too. When the destination of the movement is not the home network as a result of the judgement described above (Step 2364NO), the IPv6 movement processing portion 1815 then acquires the IPv6 address that can be used in the visiting network. Acquisition of this IPv6 address is made by utilizing the DHCP which automatically distributes the address, by the address automatic generation function as one of the functions offered by the IPv6, or by manual setting. In order to report and register the movement to the home IPv6 mobile agent 1807, the IPv6 movement processing portion 1815 transmits the IPv6 movement registration request message (Step 2366).

Figure 30:
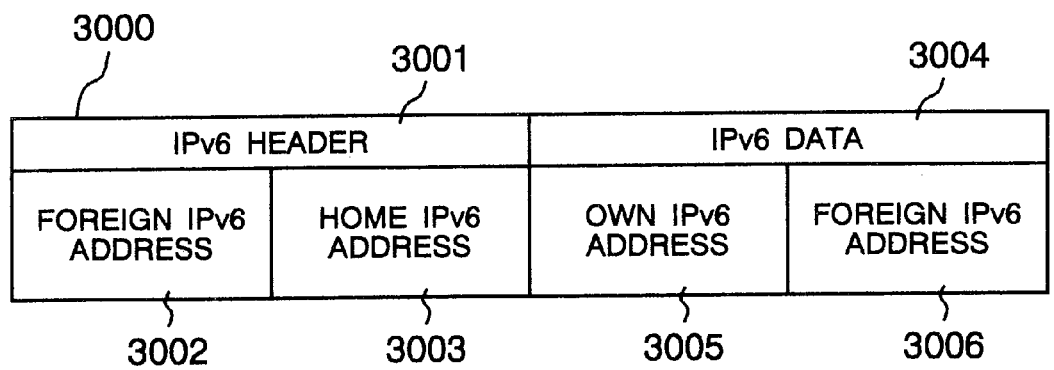
FIG. 30 is an explanatory view showing a structural example of an IPv6 movement registration request message.

FIG. 30 shows the data structure of the IPv6 movement registration request message transmitted by the IPv4/v6 mobile node 1806. As shown in the drawing, the IPv6 movement registration request message 3000 includes a IPv6 header 3001 and a IPv6 data 3004. The IPv6 header 3001 includes a foreign IPv6 address 3002 and a home IPv6 address. The IPv6 address of the home IPv6 mobile agent 1807 is set to the home IPv6 address 3002, and the IPv6 address which the IPv4/v6 mobile node 1806 acquires in the visiting network is set to the home IPv6 address 3003. The IPv6 data 3004 includes the IPv6 address 3005 as the IPv6 address of the node itself transmitting this message and the foreign IPv6 address 3006 as the IPv6 address which the mobile node acquires afresh in the visiting network. When the IPv4/v6 mobile node 1806 returns to the LAN-a 1800 as the home network, the same address as its own IPv6 address 3005 is set to the foreign IPv6 address 3006.

Thereafter, the IPv6 movement processing portion 1815 awaits until the IPv6 movement registration permission message as the reply of the IPv6 movement registration request message 3000 is received from the home IPv6 mobile agent 1807 (Step 2367) and after this message is received (Step 2367YES), the flow returns again to the initial Step 2361. Thereafter, the IPv6 movement processing portion 1815 repeats the processing described above.

Figure 24:
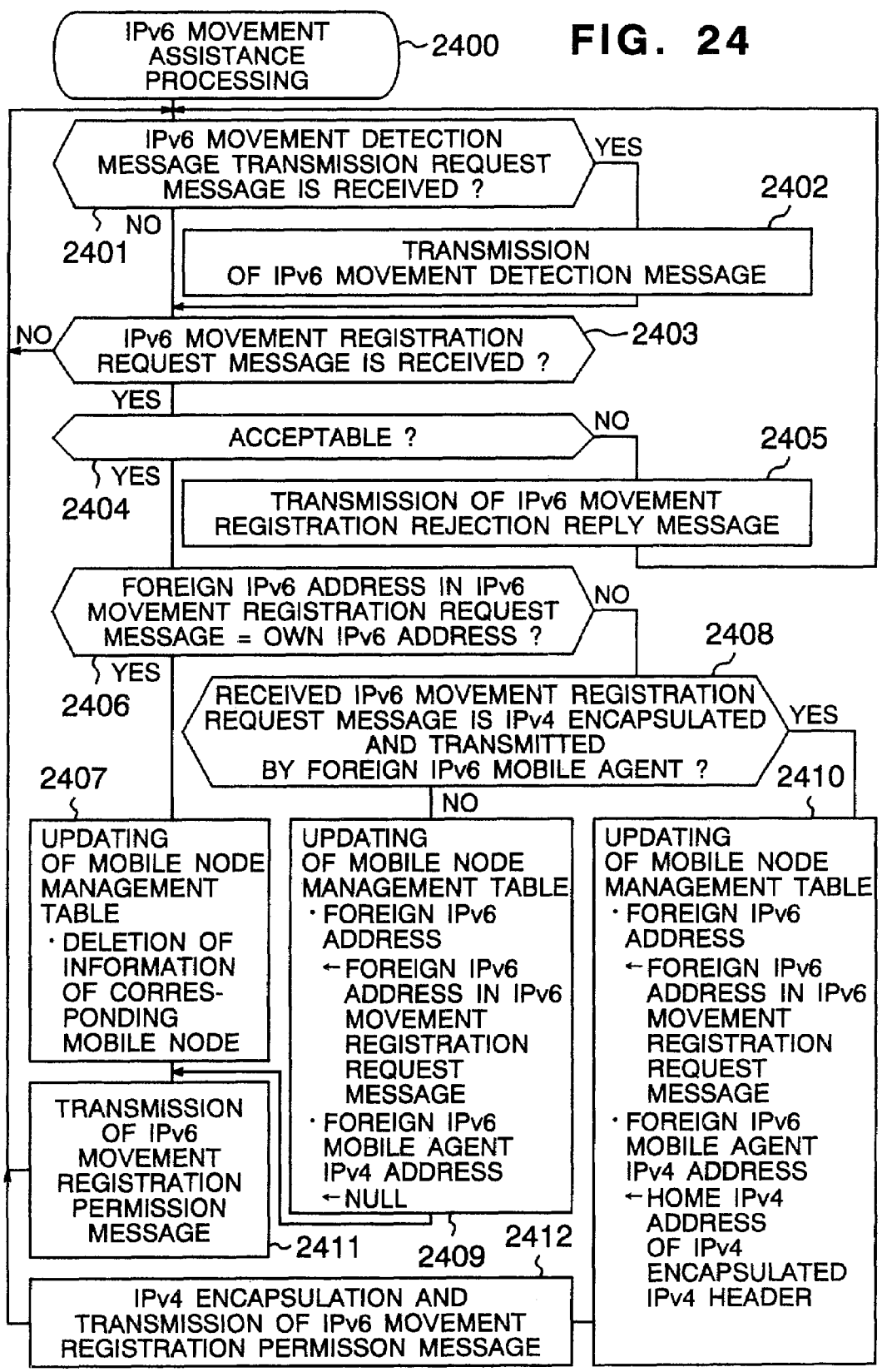
FIG. 24 is an operation flowchart showing an example of the procedure of an IPv6 movement assistance processing in a home IPv6 mobile agent shown in FIG. 18.

FIG. 24 is a flowchart showing an example of the processing of the IPv6 movement assistance processing portion 1817 which executes the assistance processing for the movement of the IPv6 mobile node (not particularly shown in the drawing) or the IPv4/v6 mobile node 1806 between the networks.

The IPv6 movement assistance processing portion 1817 first judges whether or not the IPv6 movement detection message transmission message is received (Step 2401). When this message is found received as a result of this judgement (Step 2401YES), the IPv6 movement assistance processing portion 1817 transmits the IPv6 movement detection message (Step 2402). The IPv6 movement assistance processing portion 1817 then judges whether or not the IPv6 movement registration request message 3000 is received (Step 2403). If the message is found received as a result of judgement (Step 2403YES), the IPv6 movement assistance processing portion further judges whether or not the request for this movement registration is acceptable (Step 2404). If the request is found unacceptable as a result of judgement (Step 2404NO), the IPv6 movement assistance processing portion 1817 transmits the IPv6 movement registration rejection message as the registration rejection reply message of the IPv6 movement registration request message 3000 to the mobile node.

If the request is acceptable (Step 2404YES), the IPv6 movement assistance processing portion 1817 then compares its own IPv6 address 3005 inside the message with the foreign IPv6 address (Step 2406). If they are found the same as a result of this comparison (Step 2406YES), the IPv6 movement assistance processing portion 1817 judges that the mobile node has returned to the home network, and deletes the corresponding information of the mobile node inside the mobile node management table 1812 (Step 2407). Then, the IPv6 movement assistance processing portion 1817 transmits the IPv6 movement registration permission message as the registration permission reply message of the IPv6 movement registration request message 3000 to the mobile node (Step 2411).

When the Ipv6 address 3005 and the foreign IPv6 address 3006 are found as the different addresses as a result of comparison (Step 2406NO), the IPv6 movement assistance processing portion 1817 further judges whether or not the IPv6 movement registration request message 300 so received is encapsulated by IPv4 encapsulation and transferred from the foreign IPv6 mobile agent 1809 (Step 2008). Incidentally, IPv4 encapsulation of the IPv6 movement registration request message 3000 by the foreign IPv6 mobile agent 1809 is effected by the later-appearing foreign IPv6 movement assistance processing portion 1823 inside the foreign IPv6 mobile agent 1809. When the home IPv6 mobile agent 1807 receives this IPv4 encapsulated IPv6 movement registration request message 3000, its own IPv4 processing portion 1818 executes IPv4 decapsulation and delivers the decapsulated message to the IPv6 movement assistance processing portion 1817. This IPv4 decapsulation by the IPv4 processing portion 1818 is one of the services offered by the existing IPv4.

When the message is not judged as being transferred as a result of the judgement as to IPv4 decapsulation and transfer (Step 2408NO), the IPv6 movement assistance processing portion 1817 judges that the mobile node has moved to another IPv6 network or to the IPv4/v6 network and sets the information of this mobile node to the mobile node management table 1822. At this time, the value of the foreign IPv6 address 3006 inside the IPv6 movement registration request message 3000, which is received, is set to the foreign IPv6 address 1921 inside the mobile node management table 1822 and "NULL" is set to the foreign IPv6 mobile agent IPv4 address 1922 (Step 2409). The IPv6 movement assistance processing portion 1817 then transmits the IPv6 movement registration permission message to the mobile node (Step 2411).

When the message is found as being IPv4 encapsulated and transferred as a result of the judgement described above (Step 2408YES), the IPv6 movement assistance processing portion 1817 judges that the mobile node has moved to the IPv4 network and sets the information of this mobile node to the mobile node management table 1822. At this time, the value of the foreign IPv6 address 3005 inside the IPv6 movement registration request message 3000, which is transferred, is set to the foreign IPv6 address 1921 inside the mobile node management table 1822, and the value of the home IPv4 address inside the IPv4 header, which is added to the IPv6 movement registration request message 3000 transferred, is set to the foreign IPv6 mobile agent IPv6 address 1922. The IPv6 movement assistance processing portion 1817 then executes IPv4 encapsulation of the IPv6 movement registration permission message as the reply to the mobile node and transfers the message (Step 2412).

The structure of the IPv6 movement registration permission message which is IPv4 encapsulated at this time is the same as the structure 1600 shown in FIG. 16. The foreign IPv6 mobile agent IPv4 address 1922 registered to the mobile node management table 1822 is set to the foreign IPv4 address 1402 inside the IPv4 header 1401, and own IPv4 address of the home IPv6 mobile agent 1807 is set to the home IPv4 address 1403.

The IPv6 movement assistance processing portion 1817 completes the processings as described above and repeats thereafter the processing described above.

Figure 25:
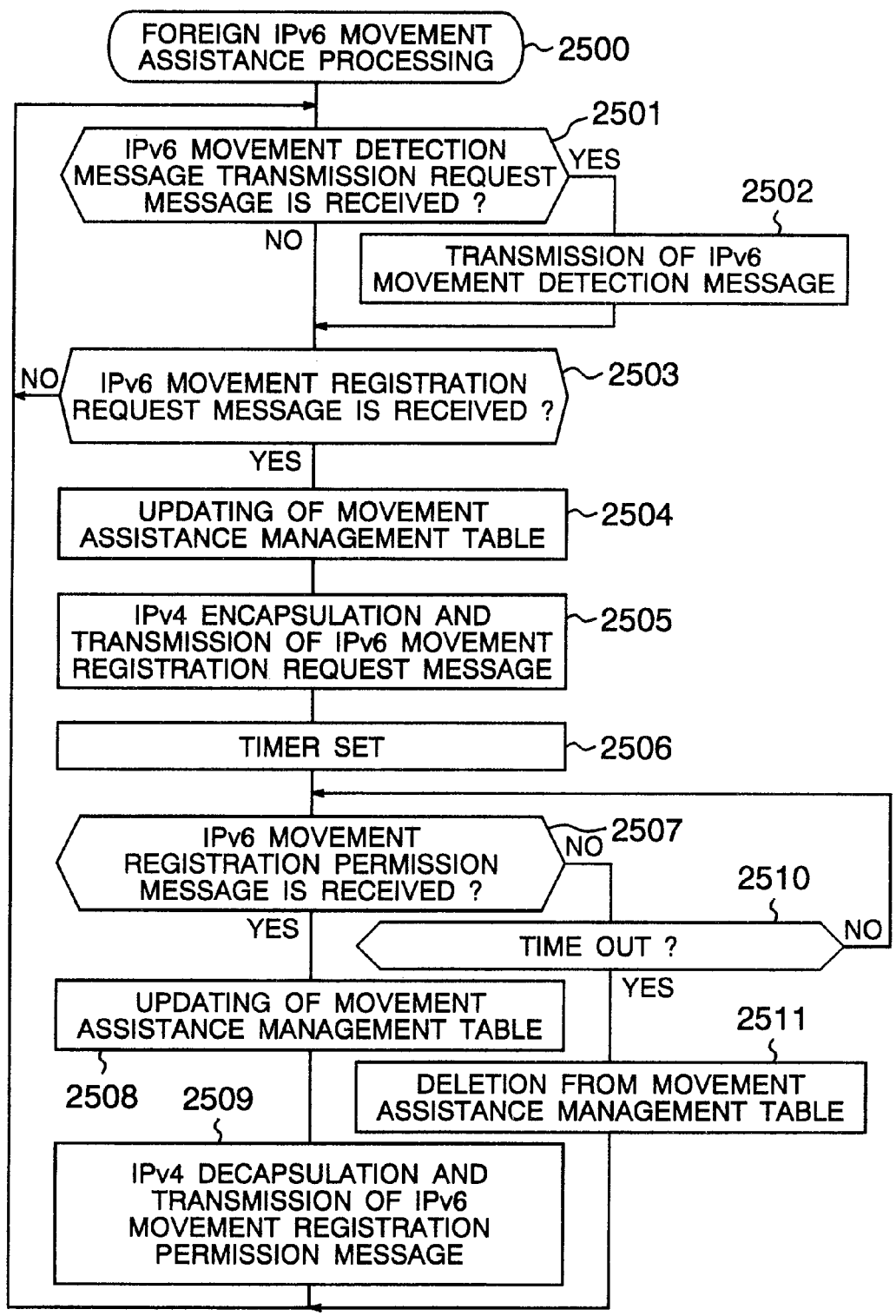
FIG. 25 is an operation flowchart showing an example of the procedure of a foreign IPv6 mobile agent shown in FIG. 18.

FIG. 25 is a flowchart showing an example of the processing of the foreign IPv6 movement assistance processing portion 1823 which executes the movement assistance processing for the IPv4/v6 mobile node 1806 between the networks at the foreign IPv6 mobile agent 1809.

The foreign IPv6 movement assistance processing portion 1823 first judges whether or not the message transmission request message for detecting the IPv6 movement is received (Step 2501). When this message is found received as a result of the judgement (Step 2501YES), the foreign IPv6 movement assistance processing portion 1823 transmits the IPv6 movement detection message (Step 2502). Next, the foreign IPv6 movement assistance processing portion 1823 judges whether or not the IPv6 movement registration request message 3000 is received (Step 2503). If this message is found received as a result of the judgement (Step 2503YES), the IPv6 movement assistance processing portion 1823 registers tentatively the information of this mobile node to the movement assistance management table 1828 (Step 1804). At this time, the value of own IPv6 address 3005 inside the IPv6 movement registration request message 3000 received is set to the mobile node IPv6 address 2140 of the movement assistance management table 1828, and the value of the home IPv6 mobile agent IPv4 address 2030 corresponding to the foreign IPv6 address 3002 inside the IPv6 movement registration request message 3000 is set to the home IPv6 mobile agent IPv4 address 2141 by looking up the mobile agent address table 1830. Further, "tentative registration" is set to the registration flag. The foreign IPv6 movement assistance processing portion 1823 executes IPv4 encapsulation of the IPv6 registration request message 3000 so received and transfers the encapsulated message to the home IPv6 mobile agent 1807 (Step 2505).

The structure of the IPv4 encapsulated IPv6 movement registration request message at this time is the same as the structure 1400 shown in FIG. 14. The IPv4 address 2141 of the home IPv6 mobile agent 1807 registered to the movement assistance management table 1828 is set to the foreign IPv4 address 1402 in the IPv4 header 1401, and own IPv4 address of the foreign IPv6 mobile agent 1809 is set to the home IPv4 address 1403.

Incidentally, after movement, the IPv4/v6 mobile node 1806 always transmits once the packet to the foreign IPv6 mobile agent 1809 in accordance with the processing procedure of the Mobile IPv6. Therefore, the foreign IPv6 mobile agent 1809 can receive the IPv6 movement registration request message 3000 address to the home IPv6 mobile agent 1807.

The foreign IPv6 movement assistance processing portion 1823 sets the timer (Step 806) and waits for the IPv6 movement registration permission message 1601 as the reply of the IPv6 movement registration request message 3000 for a predetermined time (Steps 2507 and 2510). Incidentally, the IPv6 movement registration permission message 1601 is encapsulated by IPv4 encapsulation and is transferred by the home IPv6 mobile agent 1807 as described above.

When the IPv6 movement registration permission message 1601 is received within the predetermined time (Step 2507YES), the foreign IPv6 movement assistance processing portion 1823 updates the registration flag 2142 corresponding to the mobile node, which is previously registered tentatively to the movement assistance management table 1828, to "real registration" assistance management table 1828, to "real registration" (Step 2508). Further, the home foreign IPv6 movement assistance processing portion 1823 executes IPv4 decapsulation of the IPv6 movement registration permission message 1601 received and transfers this message to the IPv4/v6 mobile node 1806 (Step 2509). When the IPv6 movement registration permission message 1601 is not received within the predetermined time (Step 2510YES), the foreign IPv6 movement assistance processing portion 1823 deletes the information of this mobile node from the movement assistance management table 1828 (Step 2511). The foreign IPv6 movement assistance processing portion 1823 completes the processings as described above and thereafter executes them repeatedly.

Figure 26:
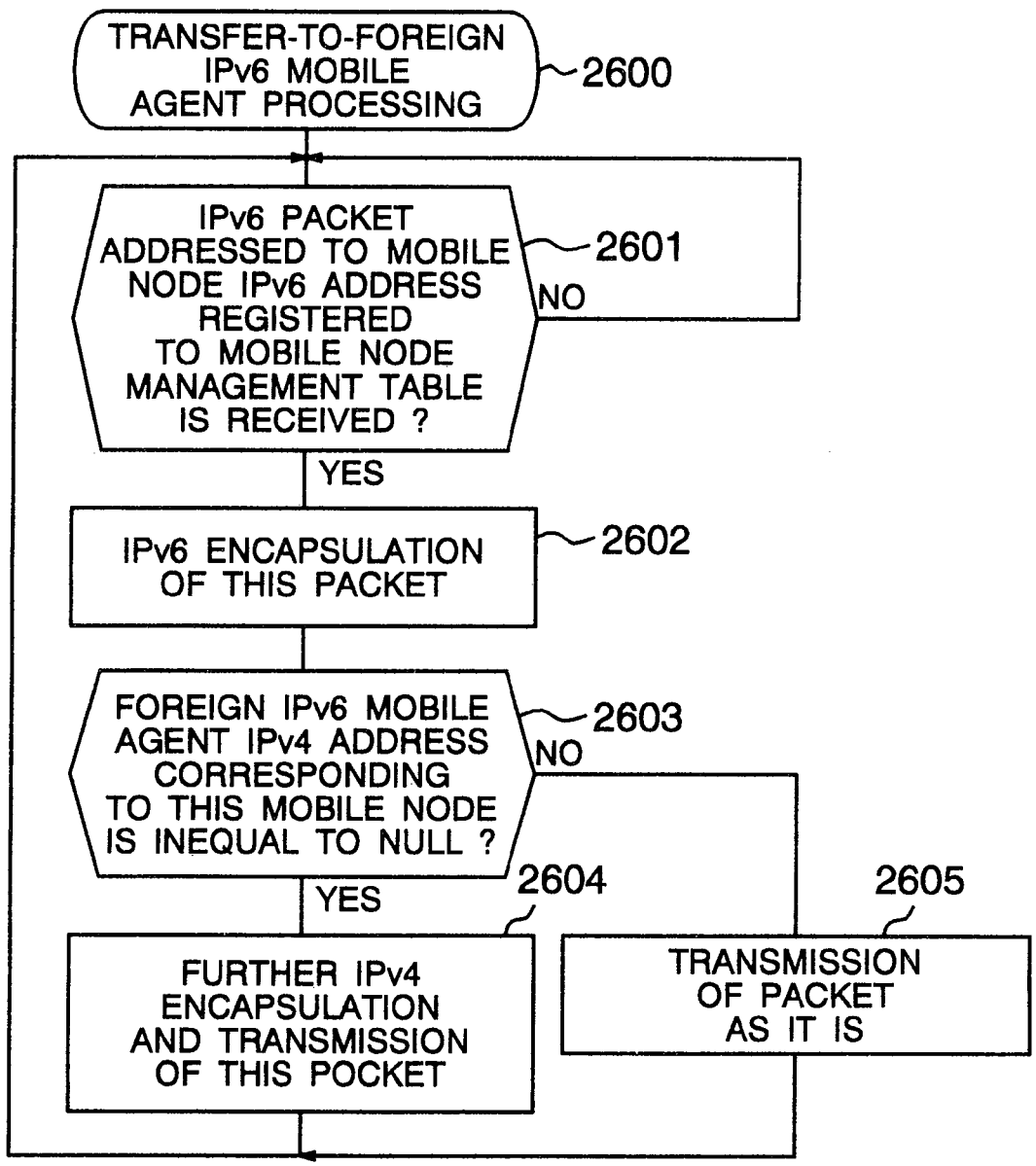
FIG. 26 is an operation flowchart showing an example of the procedure of a transfer-to-foreign IPv6 mobile agent processing in the home IPv6 mobile agent shown in FIG. 18.

FIG. 26 is a flowchart showing an example of the processing of the transfer-to-foreign IPv6 mobile agent processing portion 1821 which transfers the IPv6 packet, which other IPv6 node transmits to the IPv6 mobile node or to the IPv4/v6 mobile node 1806, to the foreign IPv6 mobile agent 1809 existing in the network to which the mobile node moves, at the home IPv6 mobile agent 1807.

The transfer-to-foreign IPv6 mobile agent processing portion 1821 first judges whether or not the IPv6 packet, which is registered to the mobile node management table 1822 and is addressed to the mobile node, among the IPv6 packets transmitted by the IPv6 node 1804 or other IPv6 nodes (not shown particularly in the drawing) is received (Step 2601). If this packet is found received as a result of the judgement, the transfer-to-IPv6 mobile agent processing portion 1821 executes afresh IPv6 encapsulation of this packet (Step 2602).

The structure of the IPv6 packet encapsulated by IPv6 encapsulation at this time is the same as the structure 1700 shown in FIG. 17. The corresponding foreign IPv6 address 1921 inside the movement assistance management table 1822 is set to the foreign IPv6 address 1702 inside the IPv6 header 1701 and the IPv6 address of the home IPv6 mobile agent 1807 of its own is set to the home IPv6 address 1703.

The transfer-to-foreign IPv6 mobile agent processing portion 1821 judges next whether or not the foreign IPv6 mobile agent IPv4 address 1922 of the corresponding mobile node inside the mobile node management table 1822 is "NULL" (Step 2603). If the foreign IPv6 mobile agent IPv4 address 1922 is found "NULL" as a result of the judgement (Step 2603NO), the transfer-to-foreign IPv6 mobile agent processing portion 1821 judges that the mobile node is moving to the IPv6 network or to the IPv4/v6 network and transmits as such the IPv6 encapsulated IPv6 packet 1700 (Step 2605). Incidentally, the processing procedures for executing IPv6 encapsulation of the IPv6 packet and transmitting the packet follow the procedures of the ordinary Mobile IPv6.

If the foreign IPv6 mobile agent IPv4 address 1922 is judged as being other than "NULL" as a result of the judgement (Step 2603YES), the transfer-to-foreign IPv6 mobile agent processing portion 1821 judges that this mobile node is moving to the IPv4 network, executes further IPv4 encapsulation of the IPv6 packet which has been IPv6 encapsulated already, and transmits it to the foreign IPv6 mobile agent 1809 (Step 2604).

Figure 31:
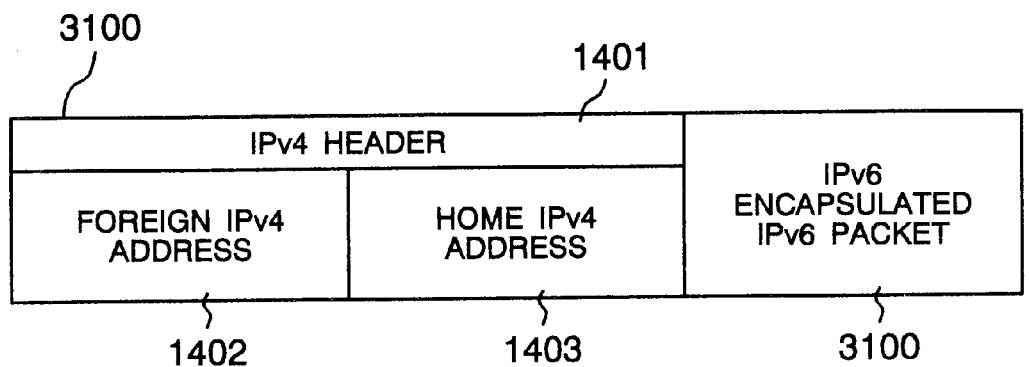
FIG. 31 is an explanatory view showing a structural example of a packet obtained by encapsulating an IPv6 encapsulated IPv6 packet by IPv4 encapsulation.

FIG. 31 shows the structure of the packet 3100 which is IPv4 encapsulated at this time. As shown in the drawing, this packet has the structure in which the IPv4 header 1401 is added afresh to the IPv6 encapsulated IPv6 packet 1700 shown in FIG. 17. The value of the corresponding foreign IPv6 mobile agent IPv4 address 1922 inside the mobile node management table 1822 is set to the foreign IPv4 address 1402 inside the IPv4 header 1401 and the value of the IPv4 address of the home IPv6 mobile agent 1807 of its own is set to the home IPv4 address 1403.

The transfer-to-foreign IPv6 mobile agent processing portion 1821 completes the processing and thereafter executes repeatedly the processing described above.

Figure 27:
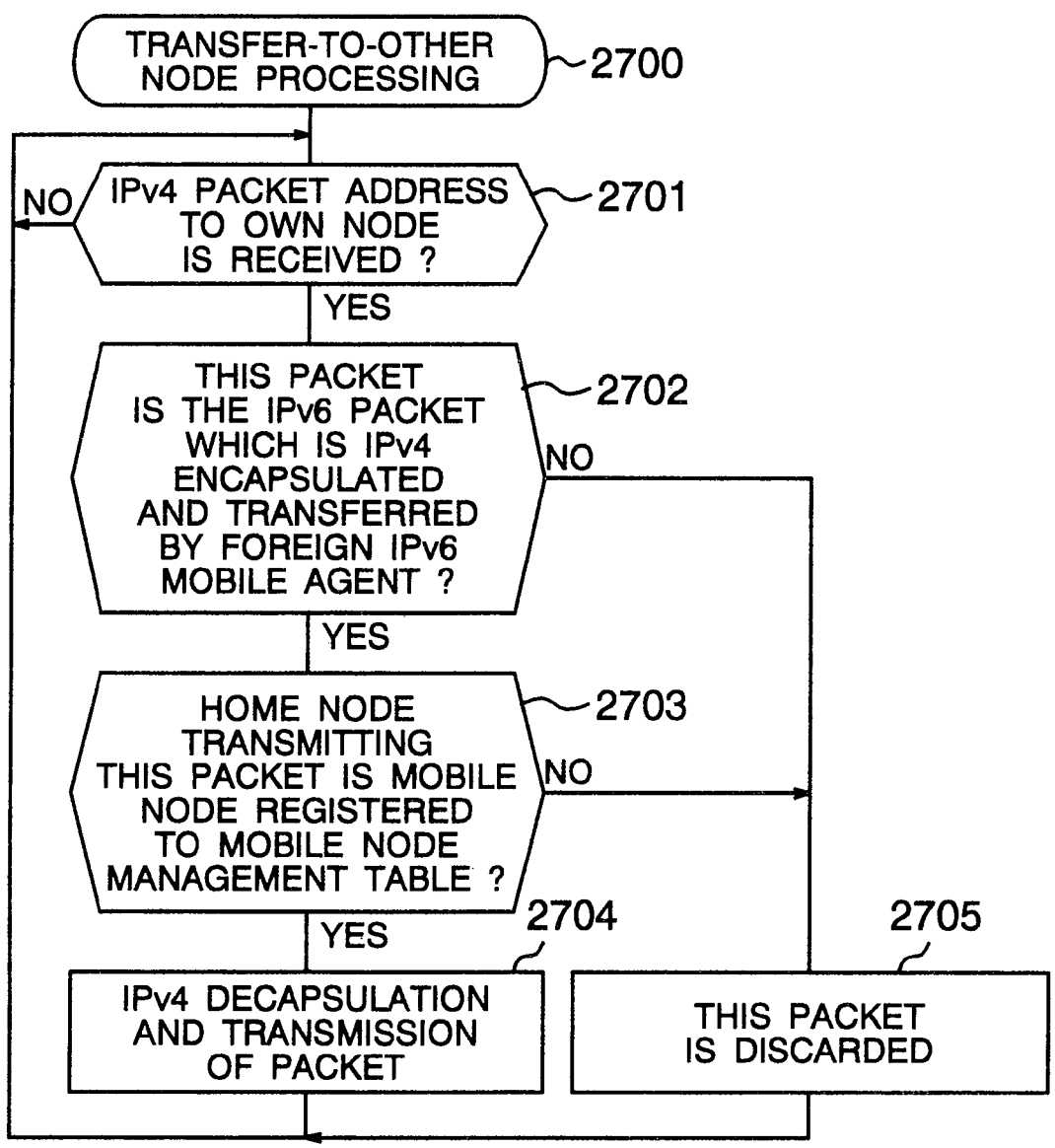
FIG. 27 is an operation flowchart showing an example of the procedure of a transfer-to-other node processing in the home IPv6 mobile agent shown in FIG. 18.

FIG. 27 is a flowchart showing an example of the processing executed by the transfer-to-other node processing portion 1819 when the IPv6 packet, which the IPv4/v6 mobile node 1806 transfers to other IPv6 node on the foreign IPv4 network, is IPv4 encapsulated and transferred from the foreign IPv6 mobile agent 1809, to the foreign IPv6 node, in the home IPv6 mobile agent 1807.

The transfer-to-other node processing portion 1819 first judges whether or not the IPv4 packet addressed to the home IPv6 mobile agent 1807 itself is received (Step 2701). If it is found received as a result of judgement (Step 2701YES), the transfer-to-other node processing portion 1819 then judges whether or not the packet so received is encapsulated by IPv4 encapsulation and transferred by the foreign IPv6 mobile agent 1809 (Step 2702). Incidentally, the transfer of the IPv6 packet by the foreign IPv6 mobile agent 1809 is executed by the transfer-to-home IPv6 mobile agent processing portion 1827 inside the foreign IPv6 mobile agent 1809 as will be described later. If it is not found the transferred IPv6 packet as a result of judgement (Step 2702NO), the transfer-to-other node processing portion 1819 discards this packet (Step 2705). If it is the transferred IPv6 packet (Step 2702YES), the transfer-to-other node processing portion 1819 further judges whether or not the home node of this IPv6 packet is the mobile node registered to the mobile node management table 1822 (Step 2703). If it is not found registered as a result of this judgement (Step 2703NO), the transfer-to-other node processing portion 1819 discards this packet (Step 2705). If it is found registered (Step 2703YES), the transfer-to-other node processing portion 1819 decapsulates this packet by IPv4 decapsulation and transmits it to the foreign IPv6 node (Step 2704).

The transfer-to-other node processing portion completes the processing and thereafter executes repeatedly the processing described above.

Figure 28:
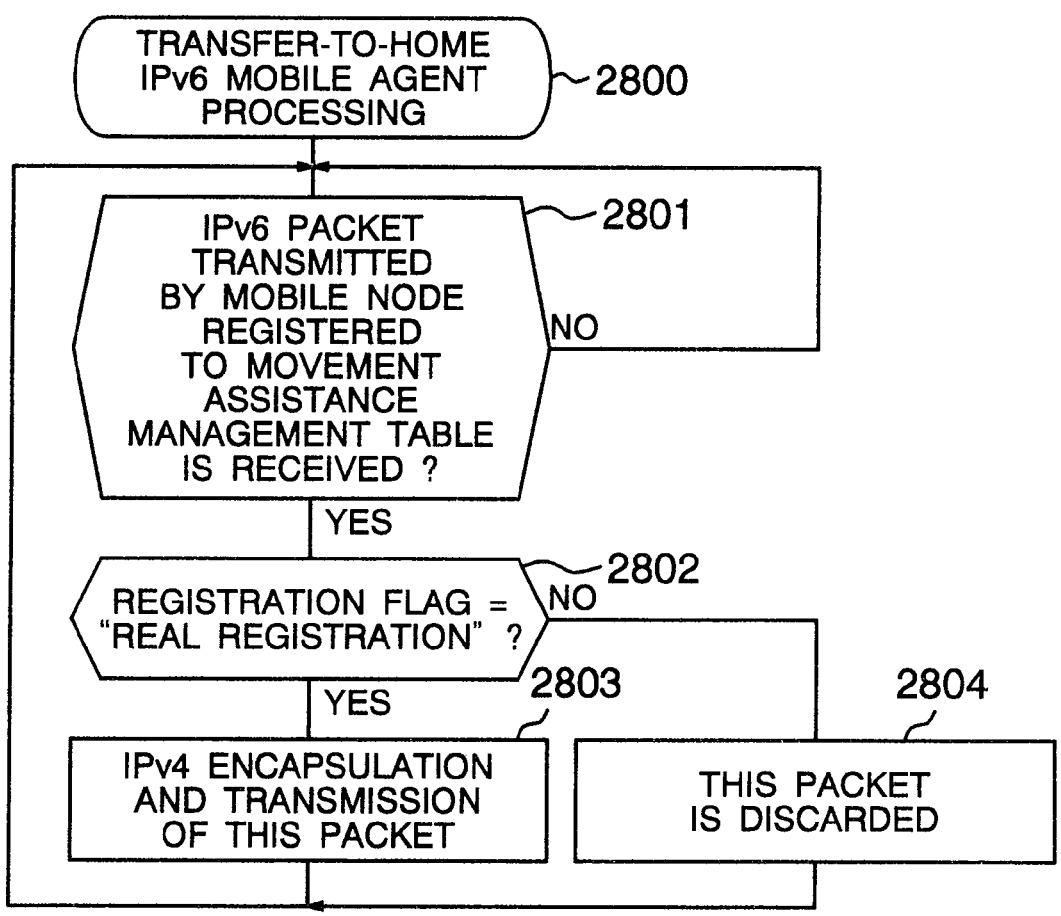
FIG. 28 is an operation flowchart showing an example of the procedure of a transfer-to-home IPv6 mobile agent processing in the foreign IPv6 mobile agent shown in FIG. 18.

FIG. 28 is a flowchart showing an example of the processing executed by the transfer-to-home IPv6 mobile agent processing portion 1827 for transferring the IPv6 packet, which is transmitted by the IPv4/v6 mobile node 1806 to other IPv6 node in the foreign IPv6 mobile agent 1809, to the home IPv6 mobile agent 107.

The transfer-to-home IPv6 mobile agent processing portion 1827 first judges whether or not the IPv6 packet transmitted from the IPv4/v6 mobile node 106 registered to the movement assistance management table 1828 is received (Step 2801). If the corresponding packet is found received as a result of this judgement, the transfer-to-home IPv6 mobile agent processing portion 1827 then judges whether or not the registration flag 2142 of the corresponding mobile node inside the mobile node management table 1828 is "real registration" (Step 2802). If it is found the "real registration" as a result of this judgement (Step 2802YES), the transfer-to-home IPv6 mobile agent processing portion 1827 then encapsulates the IPv6 packet so received by IPv4 encapsulation and transmits it to the home IPv6 mobile agent 1807 (Step 2803).

The structure of the IPv6 packet which is IPv4 encapsulated at this time is the same as the structure 1500 shown in FIG. 15.

The value of the corresponding home IPv6 mobile agent IPv4 address 2141 inside the movement assistance management table 1828 is set to the foreign IPv4 address 1402 inside the IPv4 header 1401, while own IPv4 address of the foreign IPv6 mobile agent 1809 itself is set to the foreign IPv4 address 1403.

If the registration flag 2142 is not found the "real registration" as a result of the judgement (Step 2802NO), the transfer-to-home IPv6 mobile agent processing portion 1827 discards the packet (Step 2804). The transfer-to-home IPv6 mobile agent processing portion 1827 completes the processing and thereafter executes repeatedly the processing described above.

Figure 29:
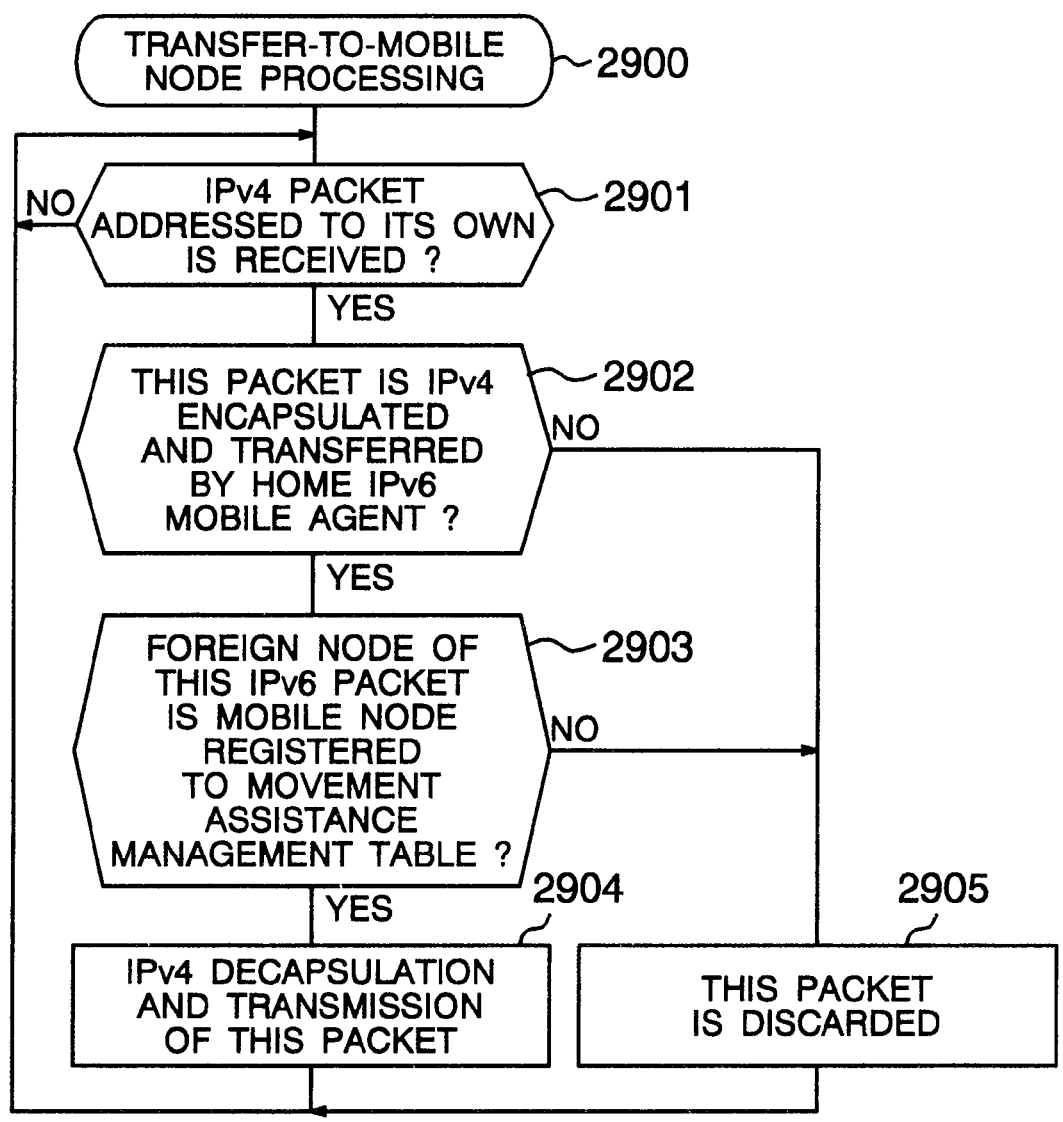
FIG. 29 is an operation flowchart showing an example of the procedure of a transfer-to-mobile node processing in the foreign IPv6 mobile agent shown in FIG. 18.

FIG. 29 is a flowchart showing an example of the processing of the transfer-to-mobile node processing portion 1825 which executes the processing for transferring the packet to IPv4/v6 mobile node 1806 when the IPv6 packet, which is transmitted by other IPv6 mobile node to the IPv4/v6 mobile node 1806 by the home IPv6 mobile agent 1807 in the foreign IPv6 mobile agent 1809, is encapsulated by IPv6 encapsulation, is further encapsulated by IPv4 encapsulation and is transferred.

The transfer-to-mobile node processing portion 1825 first judges whether or not the IPv4 packet addressed to the foreign IPv6 mobile agent 1809 is received (Step 2901). If the packet is found received as a result of this judgement (Step 2901YES), the transfer-to-mobile node processing portion 1825 then judges whether or not the packet so received is the one encapsulated by IPv4 encapsulation and transferred by the home IPv6 mobile agent 1807 (Step 2902). Incidentally, the transfer of the IPv6 packet by this home IPv6 mobile agent 1807 is executed by the foreign IPv6 mobile agent processing portion 1821 described above. If the packet is not found as the transferred IPv6 packet as a result of the judgement (Step 2902NO), the transfer-to-mobile node processing portion 1825 discards this packet (Step 2905). If it is found as the transferred packet (Step 2902YES), the transfer-to-mobile node processing portion 1825 further judges whether or not the foreign node of this IPv6 packet is the mobile node really registered to the movement assistance management table 1828 (Step 2903). The IPv6 address of the foreign node is the address of the foreign node contained in the IPv6 packet 1704. If it not found really registered as a result of the judgement (Step 2903NO), the transfer-to-mobile node processing portion 1825 discards this packet (Step 2905). If it is really registered (Step 2903YES), the transfer-to-mobile node processing portion 1825 decapsulates this packet by IPv4 decapsulation and then transfers it to the IPv4/v6 mobile node 1806 (Step 2904).

The transfer-to-mobile node processing portion 1825 completes the processing and thereafter executes repeatedly the processing described above.

The flow of the processings from FIGS. 22 to 29 described above will be explained hereby with reference to the network system shown in FIG. 18. When the IPv4/v6 mobile node 1806 exists on the LAN-a 1800 as the home network, the IPv4/v6 mobile node 1806 receives the IPv4 movement detection messages and the IPv6 movement detection message transmitted by the IPv4 mobile agent-a 1805 and the home IPv6 mobile agent 1807, respectively. Therefore, it is not judged as moving.

When the IPv4/v6 mobile node 1806 has moved to the LAN-b 1801, the IPv4/v6 mobile agent 1806 receives the messages from the IPv4 mobile agent-b 1808 and the foreign IPv6 mobile agent 1809, respectively. Therefore, the mobile is judged as having moved to other network. The IPv4/v6 mobile node 1806 transmits the IPv4 movement registration request message and the IPv6 movement registration request message 3000 to the IPv4 mobile agent-a 1805 and to the home IPv6 mobile agent 1807, respectively, by the IPv4 movement processing portion 1813 and the IPv6 movement processing portion 1815.

To this IPv6 movement registration request message 3000 are set "11::1" (home Ipv6 mobile agent 1807) as the foreign IPv6 address 3002, "21::30" (assumed as the IPv6 address used afresh on LAN-b 1801 by the IPv4/v6 mobile node 1806 in this embodiment) as the home IPv6 address 3003, "11::30" (IPv4/v6 mobile node 1806) as its own IPv6 address 3005, and "21::30" as the foreign IPv6 address 3006.

In this embodiment, the IPv6 packet cannot come out from the LAN-b 1801 beyond the router as described above, but can transmit and receive the IPv6 packet inside the LAN-b 1801. Therefore, the IPv4/v6 mobile node 1806 can receive the IPv6 movement detection message transmitted by the foreign IPv6 mobile agent 1809, and can also transmit the IPv6 movement registration request message 3000 to the LAN-b 1801.

The IPv6 movement registration request message 3000 is once received by the foreign IPv6 mobile agent 1809. The foreign IPv6 mobile agent 1809 adds the IPv4 header 1401, in which "10.0.0.1" (home IPv6 mobile agent 1807) is set as the foreign IPv4 address 1402 and "20.0.0.1" (foreign IPv6 mobile agent 1809) is set as the home IPv4 address 1403, to the message by its foreign IPv6 movement assistance processing portion 1823, and transfers the message to the home IPv6 mobile agent 1807. Thereafter, this message is received by the home IPv6 mobile agent 1807. After receiving this message, the home IPv6 mobile agent 1807 adds the IPv4 header 1401, in which "20.0.0.1" (foreign IPv6 mobile agent 1809) is set as the foreign IPv4 address 1402 and "10.0.0.1" (home IPv6 mobile agent 1807) is set as the foreign IPv4 address 1403, to the IPv6 movement registration permission message 1601 by its IPv6 movement assistance processing portion 1817, and transmits this message to the home IPv6 mobile agent 1809. Receiving this message, the foreign IPv6 mobile agent 1809 decapsulates this message by IPv4 decapsulation by the foreign IPv6 movement assistance processing portion 1823 and transmits decapsulated message to the IPv4/v6 mobile node 1806.

In consequence, registration of the movement of the IPv4/v6 mobile node 1806 to the home IPv6 mobile agent 1807 is completed. At this time are set "11::30" to the mobile node IPv6 address 20, "21::30" to the foreign IPv6 address 1921, and "20.0.0.1" to the foreign IPv6 mobile agent IPv6 address 2140 of the mobile node management table 1822, as the information of the IPv4/v6 mobile node 1806. Similarly, "11::30" is set to the mobile node IPv6 address 2140 and "10.0.0.1", to the home IPv6 mobile agent IPv4 address 2141 of the movement assistance management table 1828.

When the home IPv6 mobile agent 1807 receives the IPv6 packet transmitted by the IPv6 node 1804 to the IPv4/v6 mobile node 1806, it adds the IPv6 header 1701, in which "21::30" is set to the foreign IPv6 address 1702 and "11::1" is set to the home IPv6 address 1703, to this IPv6 packet by its transfer-to-foreign mobile agent processing portion 1821, and further adds the IPv4 header 1401, in which "20.0.0.1" is set to the foreign IPv4 address 1402 and "10.0.0.1" is set to the home IPv4 address 1403, and transfers the packet to the foreign IPv6 mobile agent 1809. The packet 3100 is received by the home IPv6 mobile agent 1809. This mobile agent 1809 decapsulates this packet by IPv4 decapsulation by its transfer-to-mobile node processing portion 1825 and transmits it to the IPv4/v6 mobile node 1806. The IPv4/v6 mobile node 1806 receives and processes this packet as the IPv6 packet in accordance with the ordinary Mobile IPv6 procedure.

When the home IPv6 mobile agent 1809 receives the IPv6 packet transmitted by the IPv4/v6 mobile node 1806 to the IPv6 node 1804, on the contrary, it adds the IPv4 header 1401, in which "10.0.0.1" (home IPv6 mobile agent 1807) is set to the foreign IPv4 address 1402 and "20.0.0.1" (foreign IPv6 mobile agent 1809) is set to the home IPv4 address 1403, to this packet by the transfer-to-home IPv6 mobile agent processing portion 1827 and transmits the packet to the home IPv6 mobile agent 1807. This IPv4 encapsulated packet 1500 is received by the home IPv6 mobile agent 1807. The home IPv6 mobile agent 1807 decapsulates this packet by IPv4 decapsulation by its transfer-to-other node processing portion 1819 and transmits the packet to the foreign IPv6 node 1804. The foreign IPv6 node 1804 receives and processes this packet as the ordinary IPv6 packet.

In the present invention, even when the IPv4/v6 mobile node 1806 moves from the LAN-a 1800 as the IPv4/v6 network to the LAN-b 1801 as the IPv4 network, the IPv4/v6 mobile node 1806 can receive the IPv6 packet transmitted from the IPv4/v6 mobile node 1804 to the IPv4/v6 mobile node 1806 as described above. On the contrary, the existing IPv6 node 1804 can receive the IPv6 packet transmitted by the IPv4/v6 mobile node 1806 to the IPv6 node 1804.

Further, communication making use of the IPv4 between other nodes and the IPv4/v6 mobile node 1806 can be made by means of the movement assistance by the IPv4 mobile agent-a 1805 supporting the Mobile IPv4 as the existing method and the movement assistance on the IPv4 by the IPv4 mobile agent-b 1808.

Incidentally, when the IPv4/v6 mobile node 1806 returns from the LAN-b 1801 to the LAN-a 1800, the IPv4/v6 mobile node 1806 detects this return to the home network by the IPv6 movement processing portion 1815 described above. Then, the IPv4/v6 mobile node 1806 transmits the IPv6 movement registration request message 3000 in which "11::30" is set to its own IPv6 address 3005 and "11::30" which is the same as its own IPv6 address 3005 is set to the home IPv6 address 3006, to the home IPv6 mobile agent 1807. Receiving this IPv6 movement registration request message 3000, the home IPv6 mobile agent 1807 judges that the IPv4/v6 mobile node has returned to the LAN-a 1800 as the home network because its own IPv6 address 3005 inside this message is the same as the foreign IPv6 address 3006, and then deletes the information about this mobile node inside the mobile node management table 1822. In consequence, the IPv4/v6 mobile node 1806 can execute communication utilizing the ordinary IPv6. Similarly, since the IPv4/v6 mobile node 1806 reports its return to the LAN-a 1800 to the IPv4 mobile agent-a 1805 in accordance with the processing procedure of the Mobile IPv4 by the IPv4 movement registration request message. Communication utilizing the ordinary IPv4 can be made, too.

In the embodiment described above, the movement of the mobile node between the networks is detected by utilizing the IPv4 movement detection message and the IPv4 detection message, but it is also possible to employ the system construction in which the user of the mobile node indicates by himself to the IPv4 movement processing portion 1813 and to the IPv6 movement processing portion and reports the movement to the IPv4 mobile agent and to the IPv6 mobile agent.

Next, the explanation will be given on the case where the IPv4/v6 mobile node moves from the IPv4/v6 network to the IPv6 network.

Figure 32:
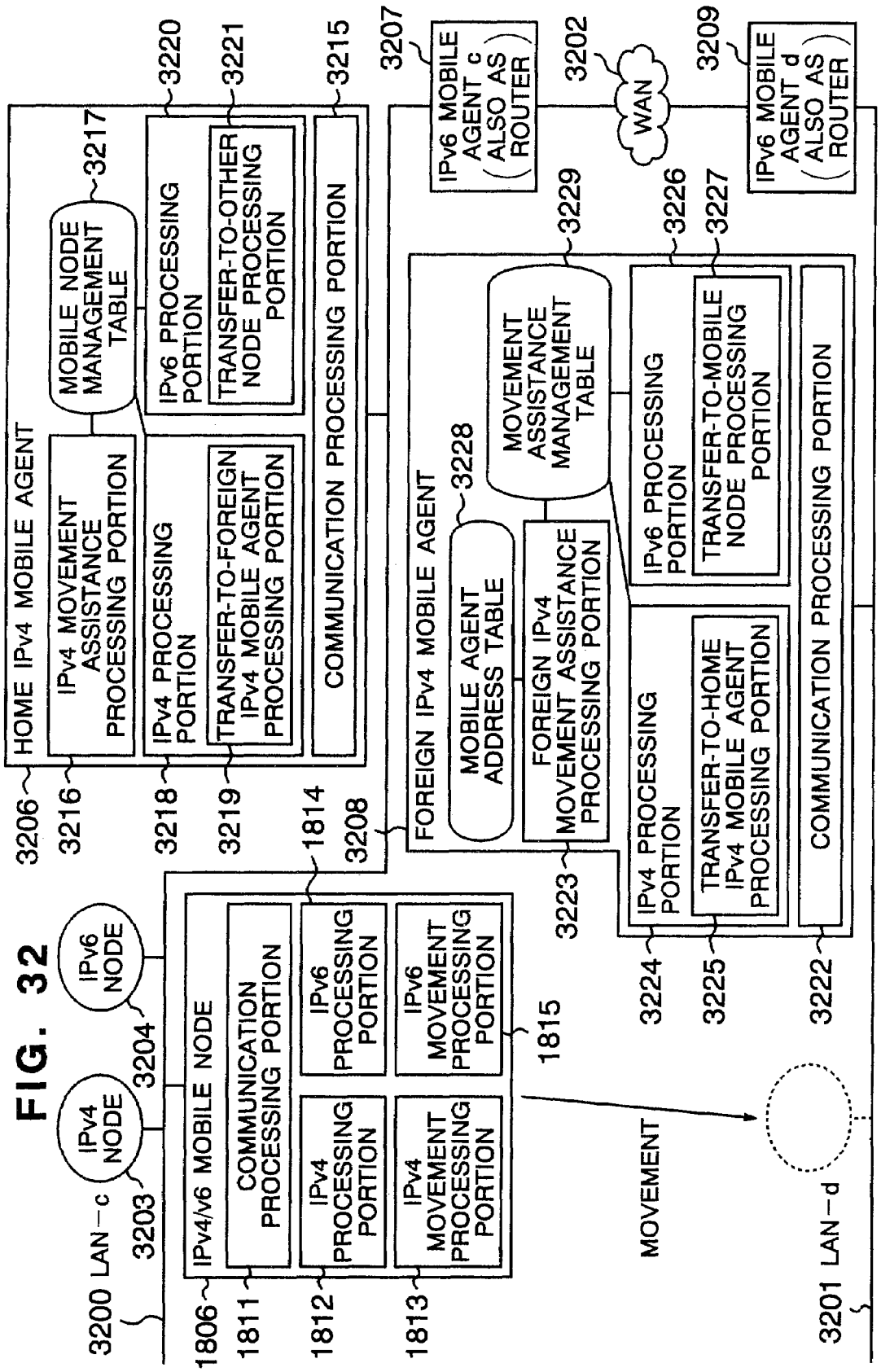
FIG. 32 is a structural view showing another example of a network to which the present invention is applied.

A structural example of the network system to which the present invention is applied and a structural example of the mobile agent will be described with reference to FIG. 32.

As shown in this drawing, the network system according to this embodiment includes a LAN-c 3200, a LAN-d 3201 and a WAN 1902 connecting the LAN-c 3200 and the LAN-d 3201 by a public line or an exclusive line. On the LAN-c 3200 exist an IPv4 node 3203 executing communication by utilizing only the IPv4, an IPv6 node 3204 executing communication by utilizing only the IPv6, an IPv4/v6 mobile node 1806 executing communication by utilizing both IPv4 and IPv6 and moving between the networks, a home IPv4 mobile agent-c 3206 executing communication by utilizing both IPv4 and IPv6 and assisting the movement of the node, which executes communication by utilizing the IPv4, between the networks, and an IPv6 mobile agent-c 3207 assisting the movement of the node, which executes communication by utilizing the IPv6 in accordance with the Mobile IPv6 procedure, between the networks. On the LAN-d 3201 exist a foreign IPv4 mobile agent 3208 which executes communication by utilizing the IPv4 and IPv6 and assists the movement of the node executing communication by utilizing the IPv4 when this node moves to the LAN-d 3201, and an IPv6 mobile agent-d 3209. Here, the IPv4/v6 mobile node 1806 is the same as the one shown in FIG. 18.

Incidentally, the IPv6 mobile agent-c 3207 functions also as a router handling both of the IPv4 packet and the IPv6 packet and connects the LAN-c 3200 and the WAN 3202. The IPv6 mobile agent-d 3209 functions also as a router handling only the IPv6 packet and connects the LAN-d 3201 and the WAN 3202. Therefore, both of the IPv4 packet and the IPv6 packet can go out to the external networks beyond the routers, whereas only the IPv6 packet can go out from the LAN-d 3201. Incidentally, transmission/reception itself of the IPv4 packet and the IPv6 packet inside the LAN-c 3200 and the LAN-d 3201 is possible.

In this embodiment, the IP addresses are tabulated below.

|  | IPv4 address | IPv6 address |
| --- | --- | --- |
| IPv4 node 3203 | "10.0.0.10" |  |
| IPv6 node 3204 |  | "11::20" |
| IPv4/v6 mobile node 1806 | "10.0.0.30" | "11::30" |
| home IPv4 mobile agent 3206 | "10.0.0.1" | "11::1" |
| home IPv4 mobile agent 3208 | "20.0.0.1" | "21::1" |

The home mobile agent 3206 includes an IPv4 movement assistance portion 3216 which executes communication by utilizing the IPv4 and assists the movement of an IPv4 mobile node (not particularly shown in the drawing) moving between the networks or an IPv4/v6 mobile node 1806, a mobile node management table 3217 which manages the information of the mobile node that has moved to another IPv4 network or to the IPv4/v6 network, an IPv4 processing portion 3218 which executes processing in accordance with the services offered by the IPv4, a transfer-to-foreign IPv4 mobile agent processing portion 3219 which executes a processing for transferring the IPv4 packet, which is transmitted by other IPv4 node to the IPv4/v6 mobile node 1806, to a foreign IPv4 mobile agent 3208, an IPv6 processing portion 3220 which executes processing in accordance with the services offered by the IPv6, a transfer-to-other node processing portion 3221 which executes a processing for transferring the IPv4 packet, which is transferred from the foreign IPv4 mobile agent 3208 and is transferred to the IPv4/v6 mobile node 1806, to the foreign IPv4 node, and a communication processing portion 3215 which executes transmission/reception control, etc. of the packet to and from the LAN.

The foreign IPv4 mobile agent 3206 comprises a foreign IPv4 movement assistance processing portion 3223 which assists the movement of the IPv4/v6 mobile node 1806 when this node 1806 moves to the network (LAN-d 3201) to which the foreign IPv4 mobile agent 3208 belongs, a movement assistance management table 3229 which manages the information of the mobile node, a mobile agent address table 3228 which registers the address information of the home IPv4 mobile agent 3206, an IPv4 processing portion 3224 which executes a processing in accordance with the services offered by the IPv4, a transfer-to-mobile agent processing portion 3225 which executes a processing for transferring the IPv4 packet, which is transmitted from the IPv4/v6 mobile node 1806 to other IPv4 node, to the home IPv4 mobile agent 3206, an IPv6 processing portion 3226 which executes a processing in accordance with the services offered by the IPv6, a transfer-to-mobile node processing portion 3227 which executes a processing for transferring the packet, which is transferred from the home IPv4 mobile agent 3206 to the IPv4/v6 mobile node 1806, to the IPv4/v6 mobile node 1806, and a communication processing portion 3222 which executes transmission/reception control, etc. of the packet to the LAN.

Here, among the constituent elements of the home IPv4 mobile agent 3206 described above, it is the IPv4 movement assistance processing portion 3216, the mobile node management table 3217, the transfer-to-foreign IPv4 mobile agent processing portion 3219 and the transfer-to-other node processing portion 3221 that constitute a characterizing part of the present invention. Among the constituent elements of the foreign IPv4 mobile agent 3208, the constituent elements according to the present invention are the foreign IPv4 movement assistance portion 3223, the mobile agent address table 3228, the movement assistance management table 3229, the transfer-to-home IPv4 mobile agent processing portion 3225 and the transfer-to-mobile node processing portion 3227.

FIG. 33 shows an example of the mobile node management table 3217 described above. As shown in the drawing, the mobile node management table 3217 includes a mobile node IPv4 address 3300 as the IPv4 address of the mobile node, a foreign IPv4 address 3301 representing the foreign IPv4 address when the home IPv4 mobile agent 3206 transfers the IPv4 packet address to the mobile node when this mobile node is moving to another IPv4 network or to the IPv4/v6 network, and a foreign IPv4 mobile agent IPv6 address 3302 representing the IPv6 address of the foreign IPv4 mobile agent. Here, "NULL" is set to the foreign IPv4 mobile agent IPv6 address 3302 when the mobile node is moving to the IPv4 network or to the IPv4/v6 network, and the IPv6 address of the foreign IPv4 mobile agent 3208 existing inside the IPv6 network is set when the mobile node is moving to this IPv6 network. Incidentally, though this drawing illustrates the case where entries for a plurality of moving nodes exist, the entry of the mobile node does not exist under the initial state. The updating processing of this table will be later described.

FIG. 34 shows an example of the mobile agent address table 3228 described above. As shown in this drawing, the mobile agent address table 3228 comprises the IPv6 addresses of all the home IPv4 mobile agents existing in the network system (though only the home IPv4 mobile agent 3206 on the LAN-c 3200 is shown in this embodiment), the home IPv4 mobile agent IPv6 address 3400 as the IPv4 address and the home IPv4 mobile agent IPv4 address 3401. This table is set by a manager, etc.

FIG. 35 shows an example of the movement assistance management table 3229 described above. As shown in this drawing, the movement assistance management table 3229 includes a mobile node IPv4 address 3500 as the IPv4 address of the IPv4/v6 mobile node 1806, a home IPv4 mobile agent IPv6 address 3501 as the IPv6 address of the home IPv4 mobile agent 3206 existing inside the home network of the mobile node, and a registration flag 3502 representing whether the entry is "tentative registration" or "real registration". Though this drawing illustrates the case where entries for a plurality of mobile nodes exist, the entry for the mobile node does not exist in this table under the initial state. The updating processing of this table will be described later.

In the construction described above, the processing operations of the IPv4/v6 mobile node 1806, the home IPv4 mobile agent 3206 and the foreign IPv4 mobile agent 3208, and handling of each table described above, when the IPv4/v6 mobile node 1806 has moved from the LAN-c 3200 as the IPv4/v6 network to the LAN-d 3201 as the IPv6 network, will be explained in detail.

Figure 36:
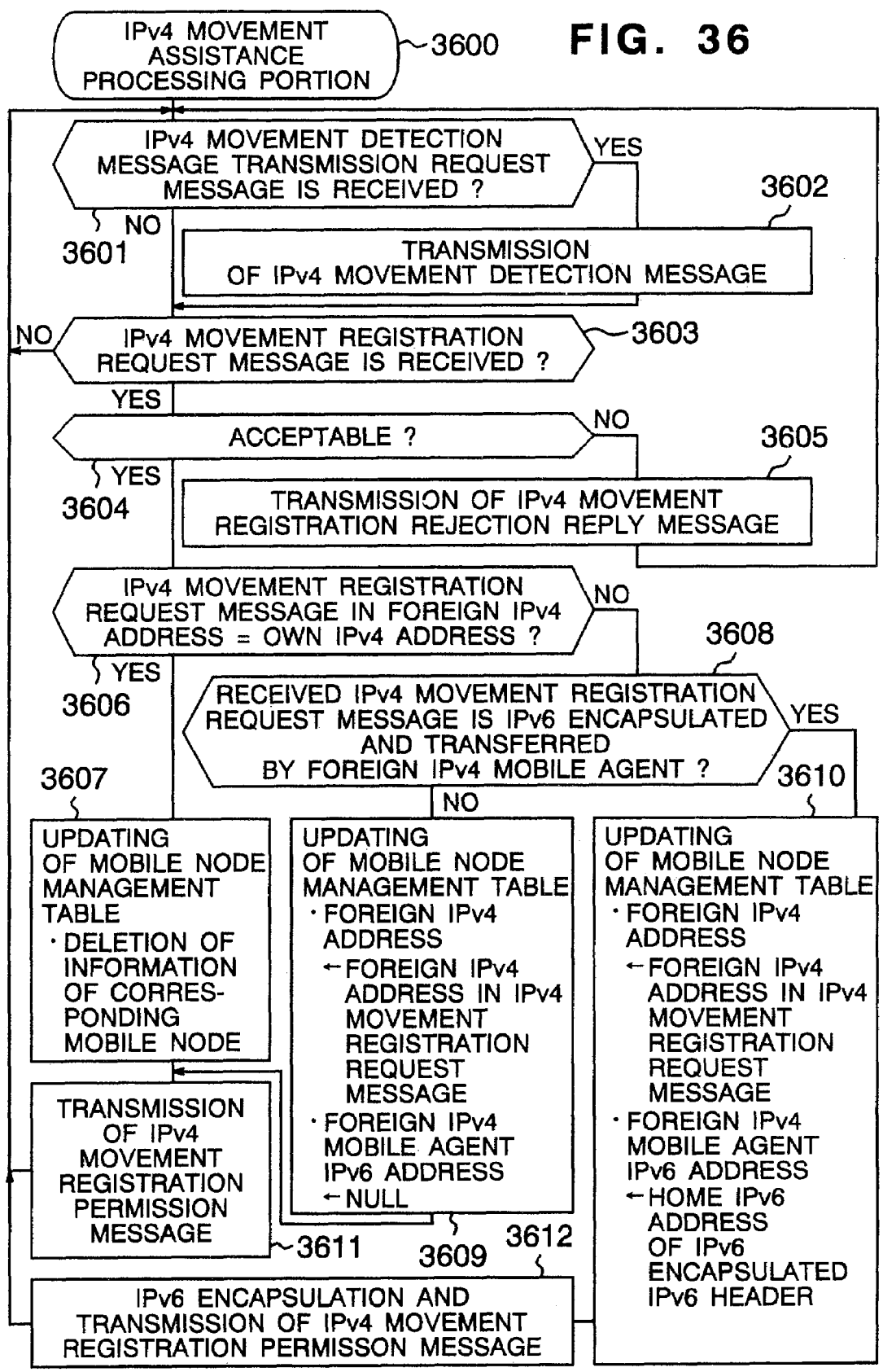
FIG. 36 is an operation flowchart showing an example of the procedure of an IPv4 movement assistance processing in a home IPv4 mobile agent shown in FIG. 32.

FIG. 36 is a flowchart showing an example of the processing of the IPv4 movement assistance processing portion 3216 for executing the assistance processing of the IPv4 mobile node (not particularly shown in the drawing) or the IPv4/v6 mobile node 1806, between the networks.

Figure 42:
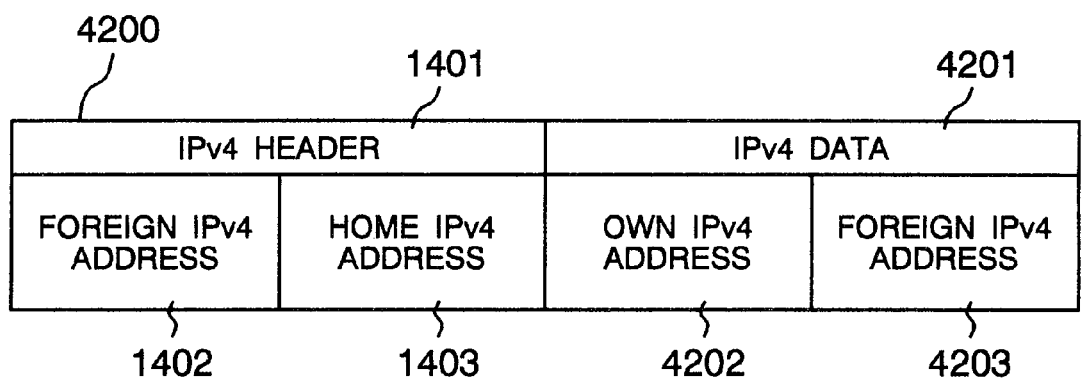
FIG. 42 is an explanatory view showing a structural example of an IPv4 movement registration request message.

The IPv4 movement assistance processing portion 3216 first judges whether or not the message transmission request message for detecting the IPv4 movement is received (Step 3601). When this message is found received as a result of this judgement (Step 3601YES), the IPv4 movement assistance processing portion 3216 transmits the IPv4 movement detection message (Step 3602). Next, the IPv4 movement assistance processing portion 3216 judges whether or not the IPv4 movement registration request message is received (Step 3603). Here, FIG. 42 shows the structure of this IPv4 movement registration request message 4200. As shown in the drawing, the IPv4 movement registration request message 4200 includes an IPv4 header 1401 and an IPv4 data 4201. The IPv4 header 1401 includes a foreign IPv4 address 1402 and a home IPv4 address 1403, and the IPv4 address of the home IPv4 mobile agent 3206 is set to the foreign IPv4 address 1402 while the IPv4 address of the IPv4/v6 mobile node 1806 is set to the home IPv4 address 1403. The IPv4 data 4201 includes the IPv4 address 4202 as own IPv4 address of the node transmitting this message and the foreign IPv4 address 4203 as the foreign address when the IPv4 packet address to this mobile agent is transferred. The same address as the IPv4 address 4202 is set to the foreign IPv4 address 4203 when the IPv4/v6 mobile node 1806 returns to the LAN-c 3200 as the home network. Incidentally, this message is transmitted by the IPv4 movement processing portion 1813 inside the IPv4/v6 mobile node 1806 explained already with reference to FIG. 22.

When the IPv4 movement registration request message 4200 is found received as a result of judgement (Step 3603YES), the IPv4 movement assistance processing portion 3216 further judges whether or not this movement registration request is acceptable (Step 3604). When it found unacceptable as a result of this judgement (Step 3604NO), the IPv4 movement assistance processing portion 3216 transmits an IPv4 movement registration rejection message as a rejection reply message to the IPv4 movement registration request message 4200 to the mobile node (Step 3605). If it is found acceptable (Step 3604YES), the IPv4 movement assistance processing 3600 then compares its own address 4202 inside the message with the foreign IPv4 address 4203 (Step 3606).

If own IPv4 address 4202 and the foreign IPv4 address 4203 are found the same as a result of the judgement described above (Step 3606YES), the IPv4 movement assistance processing portion 3216 judges that the mobile node has returned to the home network and detects the information of the corresponding mobile node inside the mobile node management table 3217 (Step 3607). The IPv4 movement assistance processing portion 3216 transmits the IPv4 movement registration permission message as the permission reply message of registration of the IPv4 movement registration request message 4200 to the mobile node (Step 3611).

If own IPv4 address 4202 and the foreign IPv4 address 4203 are found different as a result of the judgement (Step 3609NO), the IPv4 movement assistance processing portion 3216 further judges whether or not the IPv4 movement registration request message 4200 received is the message which is encapsulated by IPv6 encapsulation and transmitted by the foreign IPv4 mobile agent 3208 (Step 3608). Incidentally, this IPv6 encapsulation of the IPv4 movement registration request message 4200 by the foreign IPv4 mobile agent 3208 is executed by the foreign IPv4 movement assistance processing portion 3223 inside the later-appearing IPv4 mobile agent 3208. Receiving this IPv4 movement registration request message 4200 which is IPv6 encapsulated in this way, the home IPv4 mobile agent 3206 decapsulates the message by IPv6 decapsulation by its IPv6 processing portion 3220 and delivers the message to the IPv4 movement assistance processing portion 3216. IPv6 decapsulation by this IPv6 processing portion is one of the services offered by the existing IPv6.

If the result of the judgement represents that the message is not IPv6 encapsulated and is not transferred (Step 3608NO), the IPv4 movement assistance processing portion 3216 judges that the mobile node has moved to another IPv4 network or to the IPv4/v6 network and sets the information of this mobile node to the mobile node management table 3217 (Step 3609). At this time, the value of the foreign IPv4 address 4203 inside the received IPv4 movement registration request message 4200 is set to the foreign IPv4 address 3301 inside the mobile node management table 3217 and "NULL" is set to the foreign IPv4 mobile agent IPv6 address 3302. Then, the IPv4 movement assistance processing portion 3216 transmits the IPv4 movement registration permission message to the mobile node (Step 3611).

If the message is found the one that is IPv6 encapsulated and is transferred as a result of the judgement (Step 3608YES), the IPv4 movement assistance processing portion 3216 judges that the mobile node has moved to the IPv6 network and sets the information of this mobile node to the mobile node management table 3217 (Step 3610). At this time, the value of the foreign IPv4 address 4203 inside the transferred IPv4 movement registration request message 3300 is set to the foreign IPv4 address 3301 inside the mobile node management table 3217, and the value of the home IPv6 address inside the IPv6 added to the transferred IPv4 movement registration request message 4200 is set to the foreign IPv4 mobile agent IPv6 address 3302. The IPv4 movement assistance processing portion 3216 encapsulates and transmits the IPv4 movement registration permission message as the reply to the mobile node (Step 3612).

Figure 43:
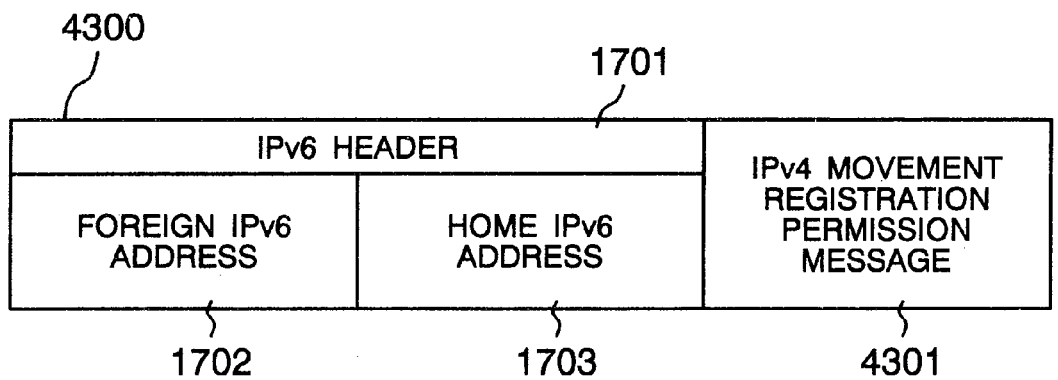
FIG. 43 is an explanatory view showing a structural example of a packet obtained by IPv6 encapsulation of an IPv4 movement registration permission message.

The data structure of the IPv6 encapsulated IPv4 movement registration permission message 4301 at this time is shown in FIG. 43. As shown in the drawing, this message has the construction in which the IPv6 header 1701 is added to the IPv4 movement registration permission message 4301. The foreign IPv4 mobile agent IPv6 address 3302 registered to the mobile node management table 3217 is set to the foreign IPv6 address 1702 inside the IPv6 header 1701 and own IPv6 address of the home IPv4 mobile agent 3206 itself is set to the home IPv6 address 3003.

The IPv4 movement assistance processing portion 3216 completes the processing and thereafter repeats the processing described above.

Figure 37:
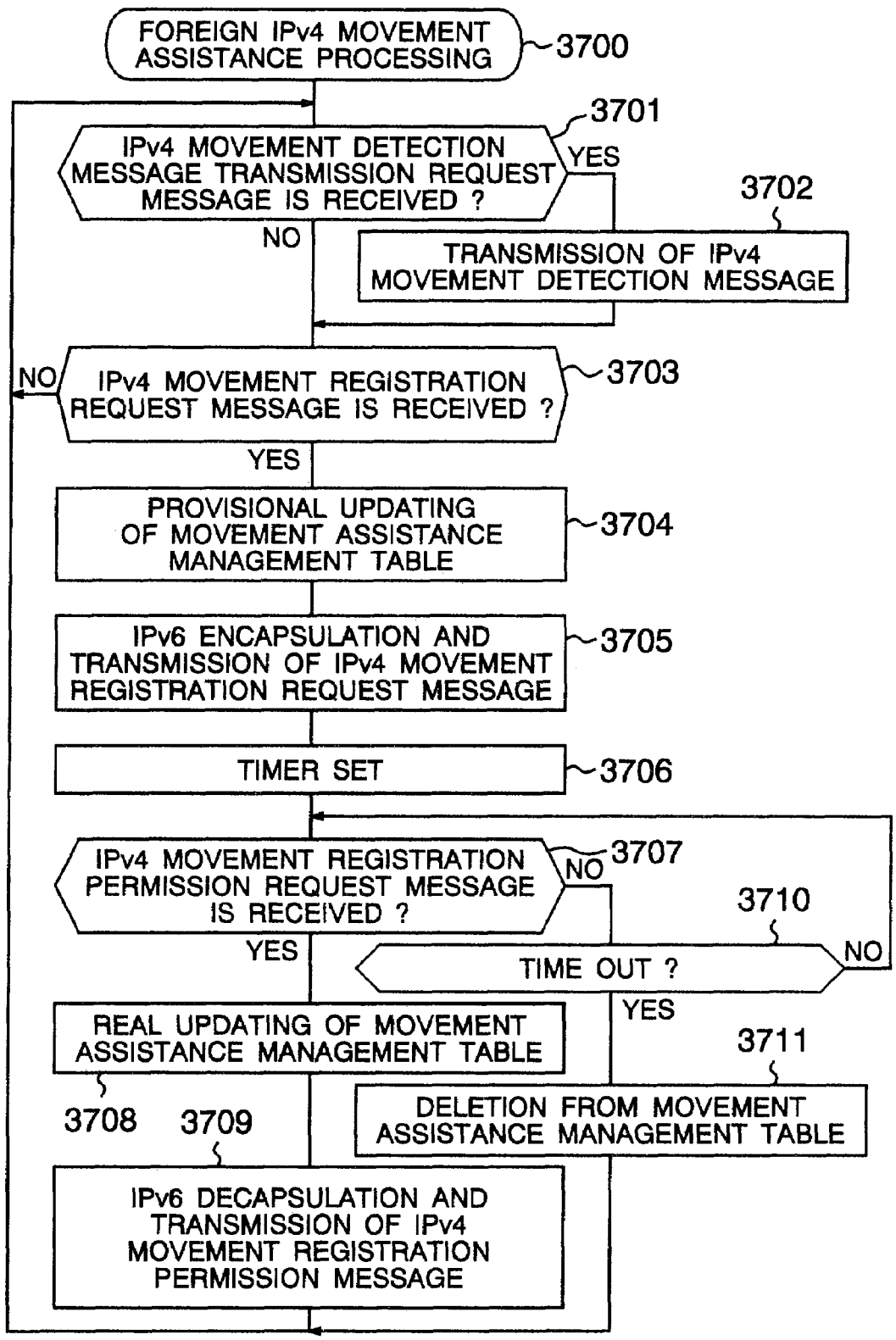
FIG. 37 is an operation flowchart showing an example of the procedure of the foreign IPv4 movement assistance processing in the foreign IPv4 mobile agent shown in FIG. 32.

FIG. 37 is a flowchart showing an example of the processing of the foreign IPv4 movement assistance processing portion 3223 for executing the movement assistance processing of the IPv4/v6 mobile node 1806 between the networks in the foreign IPv4 mobile agent 3208.

The foreign IPv4 movement assistance processing portion 3223 first judges whether or not the message transmission request message for detecting the IPv4 movement is judged (Step 3701). If this message is found received as a result of this judgement (Step 3701YES), the foreign IPv4 movement assistance processing portion 3223 transmits the IPv4 movement detection message (Step 3702). Next, the foreign IPv4 movement assistance processing portion 3223 judges whether or not the IPv4 movement registration request message 4200 is received (Step 3703). If this message is found received as a result of the judgement (Step 3703YES), the foreign IPv4 movement assistance processing portion 3223 tentatively registers the information of this mobile node to the movement assistance management table 3229 (Step 3704). At this time, the value of own IPv4 address 4202 inside the received IPv4 movement registration request message 4200 is set to the foreign IPv4 address 3500 inside the mobile node management table 3229 and the value of the home IPv4 mobile agent IPv6 address 3400, that corresponds to the foreign IPv4 address 1402 inside the IPv4 movement registration request message 4200, is set to the home IPv4 mobile agent IPv6 address 3501 by looking up the mobile agent address table 3228. Further, "tentative registration" is set to the registration flag 3502. The foreign IPv4 movement assistance processing portion 3223 encapsulates by IPv6 encapsulation the IPv4 movement registration request message 4200 so received, and transfers the message to the home IPv4 mobile agent 3206 (Step 3705).

Figure 44:
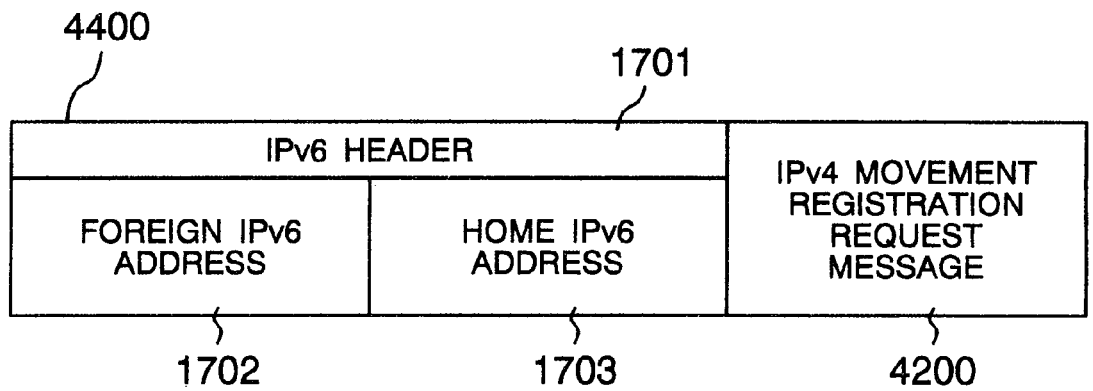
FIG. 44 is an explanatory view showing a structural example of a packet obtained by IPv6 encapsulation of an IPv4 movement registration request message.

The structure of the IPv6 encapsulated IPv4 movement registration request message 4200 at this time is shown in FIG. 44. As shown in this drawing, the message 4400 has the construction in which the IPv6 header 1701 is added to the IPv4 movement registration permission message 4200 shown in FIG. 42. The home IPv4 mobile agent IPv6 address 3501 registered to the movement assistance management table 3229 is set to the foreign IPv6 address 1702 inside the IPv6 header 1701, and own IPv6 address of the foreign IPv4 mobile agent 3208 is set to the home IPv6 address 1703.

Incidentally, the IPv4/v6 mobile node 1806 always transmits after its movement the packet to the foreign IPv4 mobile agent 3208 in accordance with the processing procedure of the Mobile IPv4. Therefore, the foreign IPv4 mobile agent 3208 can receive the IPv4 movement registration request message 4200.

The foreign IPv4 movement assistance processing portion 3223 sets the timer (Step 3706) and waits for the IPv4 movement registration permission message 4301 as the reply to the IPv4 movement registration request message 4200 for a predetermined time (Steps 3707 and 3710). By the way, this IPv4 movement registration permission message 4301 is encapsulated to the IPv6 encapsulated message and is transmitted by the home IPv4 mobile agent 3206 as described above.

If the IPv4 movement registration permission message 4301 is received within the predetermined time (Step 3707YES), the foreign IPv4 movement assistance processing portion 3223 updates the registration flag 3502 corresponding to the mobile node, which has been tentatively registered to the mobile agent management table 3229 previously, to "real registration" (Step 3708). Further, the foreign IPv4 movement assistance processing portion 3223 decapsulates by IPv6 decapsulation the IPv6 header 1701 added to the received IPv4 movement registration permission message 4301 and transfers the message to the IPv4/v6 mobile node 1806 (Step 3709). If the IPv4 movement registration permission message 4301 is not received within the predetermined time (Step 3701YES), the foreign IPv4 movement assistance processing portion 3223 deletes the information of this mobile node from the movement assistance management table 3229 (Step 3711).

The foreign IPv4 movement assistance processing portion 3223 completes the processing and thereafter repeats the processing described above.

Figure 38:
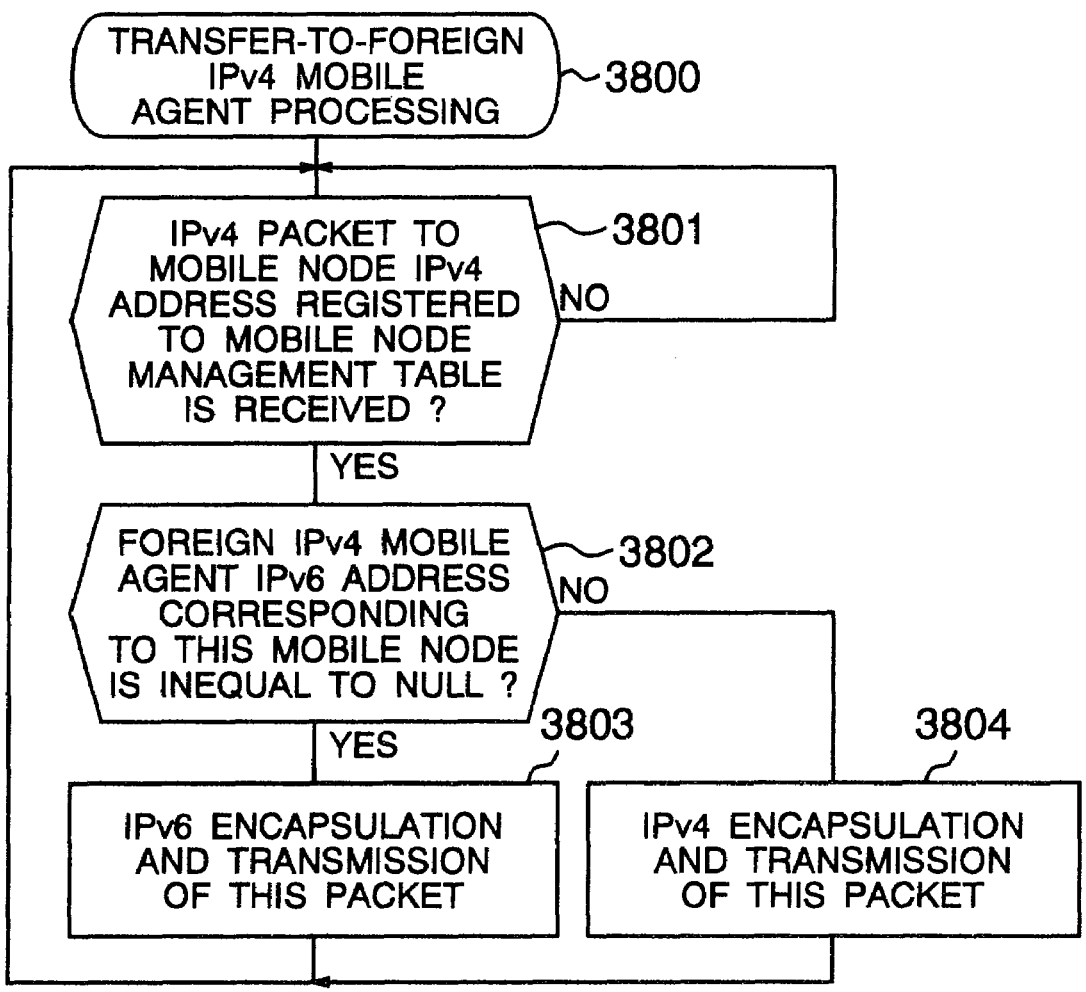
FIG. 38 is an operation flowchart showing an example of the procedure of a transfer-to-foreign IPv4 mobile agent processing in a home IPv4 mobile agent shown in FIG. 32.

FIG. 38 is a flowchart showing an example of the processing of the transfer-to-foreign IPv4 mobile agent processing portion 3219 which executes the processing for transferring the IPv4 packet transmitted by other IPv4 node to the IPv4 mobile node (not particularly shown in the drawing) or to the IPv4/v6 mobile agent 1806 to the foreign IPv4 mobile agent 3208 existing in the foreign network of the mobile node, in the home IPv4 mobile agent 3206.

The transfer-to-foreign IPv4 mobile agent processing portion 3219 first judges whether or not the IPv4 packet addressed to the mobile node registered to the mobile node management table 3217 among the IPv4 packets transmitted by the IPv4 node 1804 and other IPv4 nodes (not particularly shown in the drawing) is received (Step 3801). If the corresponding packet is found received as a result of this judgement (Step 3801YES), the transfer-to-foreign IPv4 mobile agent processing portion 3219 then judges whether or not the foreign IPv4 mobile agent IPv6 address 3302 of the corresponding mobile node inside the mobile node management table 3217 is "NULL" (Step 3802). If the foreign IPv4 mobile agent IPv6 address 3302 is found "NULL" as a result of the judgement (Step 3802NO), the transfer-to-foreign IPv4 mobile agent processing portion 3219 judges that the mobile node is moving to the IPv4 network or to the IPv4/v6 network, and encapsulates the IPv4 packet so received by IPv4 encapsulation and transmits the encapsulated packet (Step 3804). Incidentally, the processing procedure for effecting IPv4 encapsulation and transferring the packet follows the ordinary Mobile IPv4.

If the foreign IPv4 mobile agent IPv6 address 3302 is found to be other than "NULL" as a result of the judgement (Step 3802YES), the transfer-to-foreign IPv4 mobile agent processing portion 3219 judges that the mobile node is moving to the IPv6 network, encapsulates the received IPv4 packet by IPv6 encapsulation and transmits the encapsulated packet to the foreign IPv4 mobile agent 3208 (Step 3803).

Figure 45:
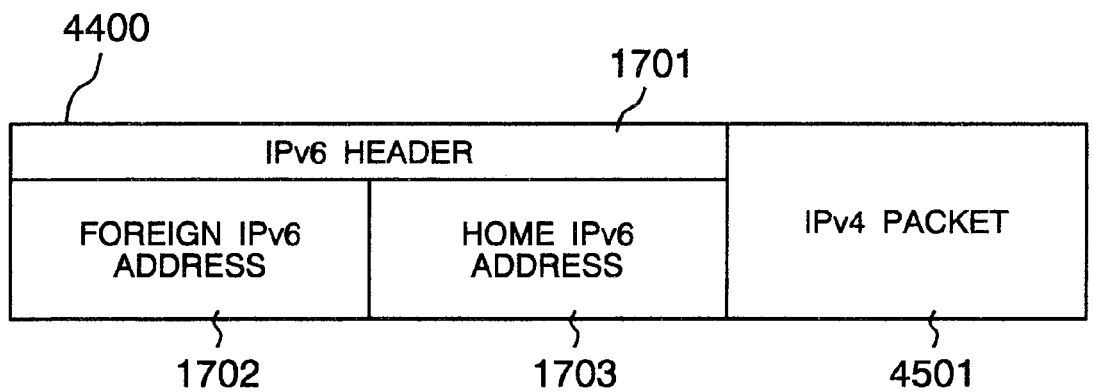
FIG. 45 is an explanatory view showing a structural example of a packet obtained by IPv6 encapsulation of an IPv4 packet.

The structure of the IPv6 encapsulated IPv4 packet at this time is shown in FIG. 45. This packet has the construction in which the IPv6 header 1701 is added afresh to the IPv4 packet 4501. The value of the foreign IPv4 mobile agent IPv6 address 3302 inside the mobile node management table 3217 is set to the foreign IPv6 address 1702 inside the IPv6 header 1701, and own IPv6 address of the home IPv4 mobile agent 3206 is set to the home IPv6 address 1703.

The transfer-to-foreign IPv4 mobile agent processing portion 3219 completes the processing and thereafter executes repeatedly the processing described above.

Figure 39:
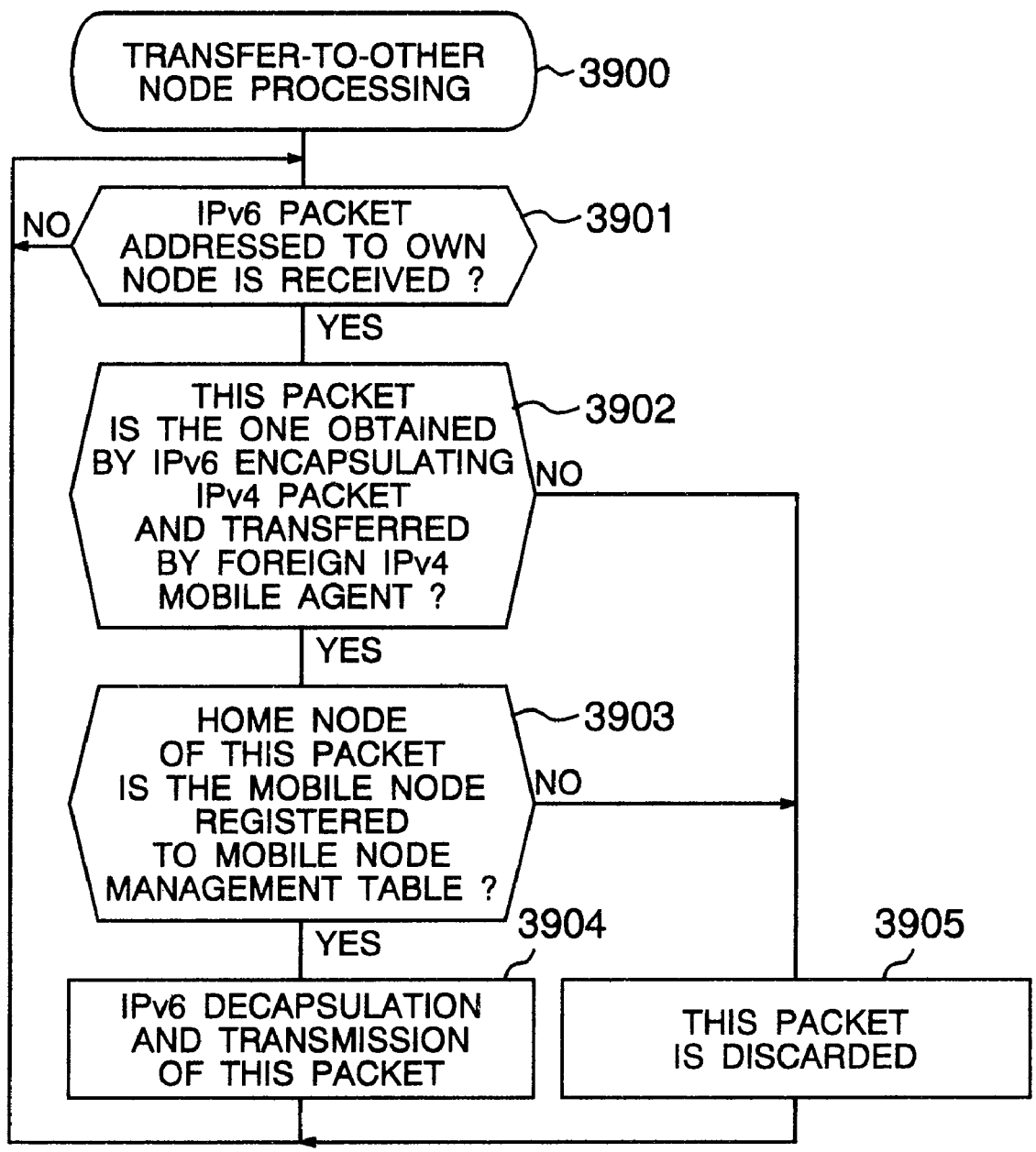
FIG. 39 is an operation flowchart showing an example of the procedure of a transfer-to-other node processing in the home IPv4 mobile agent shown in FIG. 32.

FIG. 39 is a flowchart showing an example of the processing of the transfer-to-other node processing portion 3221 which executes the processing for transferring the packet to the IPv4 node when the IPv4 packet transmitted by the IPv4/v6 mobile node 1806 to other IPv4 node on the foreign IPv6 network is encapsulated by IPv6 encapsulation and transferred by the foreign IPv4 mobile agent 3208, in the home IPv4 mobile agent 3206.

The transfer-to-other node processing portion 3221 first judges whether or not the IPv6 packet address to the home IPv4 mobile agent 3208 itself is received (Step 3901). If the packet is found received as a result of this judgement (Step 3901YES), the transfer-to-other node processing portion 3221 then judges whether or not the packet is the IPv4 packet that is encapsulated and transferred by the foreign IPv4 mobile agent 3208 (Step 3902). Incidentally, this transfer of the IPv4 packet by the foreign IPv4 mobile agent 3208 is executed by the transfer-to-IPv4 mobile agent processing portion 3225 inside the later-appearing foreign IPv4 mobile agent 3208. If the packet is not found the transferred IPv4 packet as a result of the judgement (Step 3902NO), the transfer-to-other node processing portion 3221 discards this packet (Step 3905). If it is found the transferred IPv4 packet (Step 3902YES), the transfer-to-other node processing portion 3221 further judges whether or not the foreign node of this IPv4 packet is the mobile node registered to the mobile node management table 3217 (Step 3903). If it is not found registered as a result of the judgement (Step 3903NO), the transfer-to-other node processing portion 3221 discards this packet (Step 3905). If it is found registered (Step 3903YES), the transfer-to-other node processing portion 3221 decapsulates this packet by IPv6 decapsulation and transmits it to the foreign IPv4 node (Step 3904).

The transfer-to-other node processing portion 3221 completes the processing and thereafter repeats the processing described above.

Figure 40:
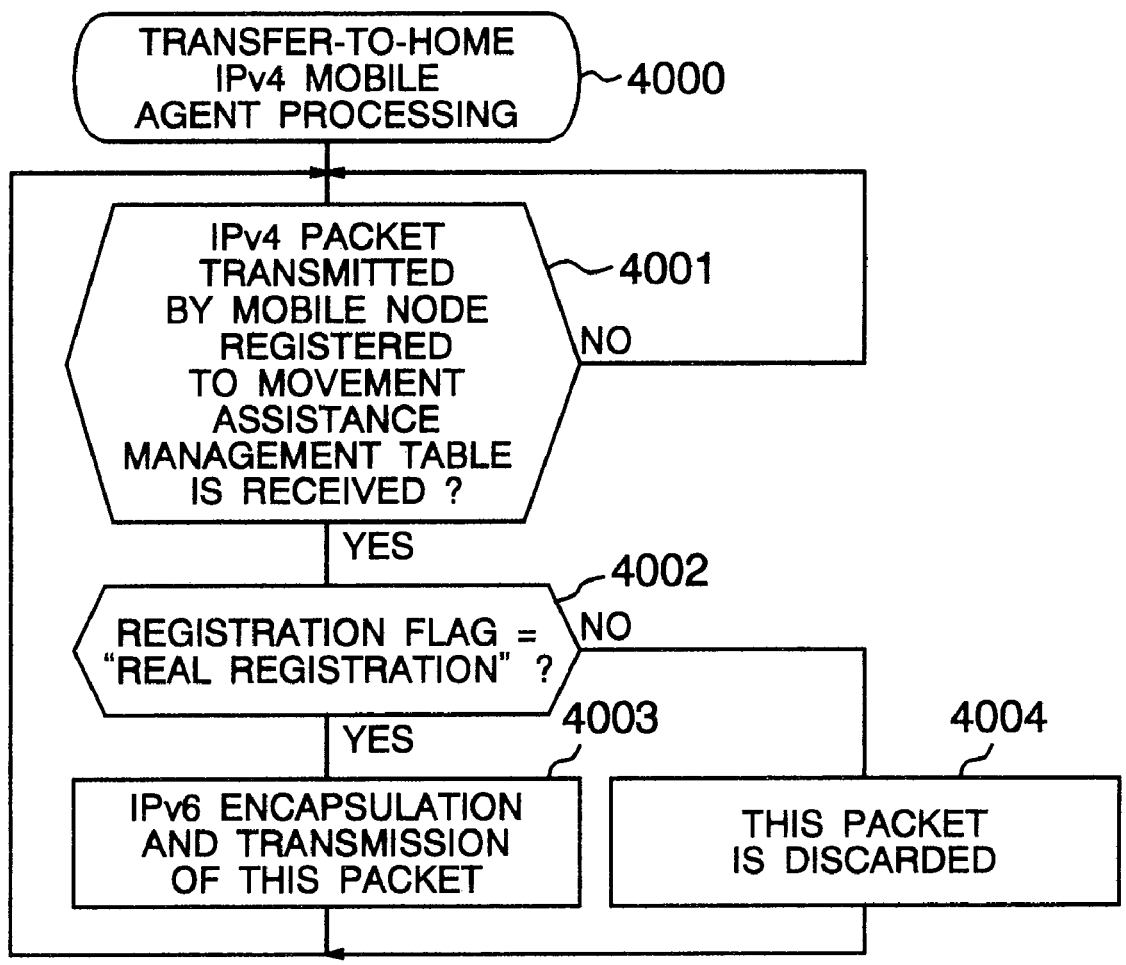
FIG. 40 is an operation flowchart showing an example of the procedure of a transfer-to-home IPv4 mobile agent in the foreign IPv4 mobile agent shown in FIG. 32.

FIG. 40 is a flowchart showing an example of the processing of the transfer-to-home IPv4 mobile agent processing portion 3225 which executes the processing for transferring the IPv4 packet, which the IPv4/v6 mobile node 1806 transmits to other IPv4 nodes, to the home IPv4 mobile agent 3206 in the foreign IPv4 mobile agent 3208.

The transfer-to-home IPv4 mobile agent processing portion 3225 first judges whether or not the IPv4 packet, which is registered to the movement assistance management table 3229 and is transmitted by the IPv4/v6 mobile agent 1806, is received (Step 4001). If the corresponding packet is found received as a result of this judgement (Step 4001YES), the transfer-to-home IPv4 mobile agent processing portion 3225 then judges whether or not the registration flag 3502 of the corresponding mobile node inside the mobile node management table 3229 is "real registration" (Step 4002). If the registration flag is found the "real registration" as a result of the judgement (Step 4002YES), the transfer-to-home IPv4 mobile agent processing portion 3225 encapsulates the received IPv4 packet by IPv6 encapsulation and transmits it to the home IPv4 mobile agent 3206 (Step 4003).

The IPv4 packet subjected to IPv6 encapsulation at this time has the same structure as the structure shown already in FIG. 45. The value of the corresponding home IPv4 mobile agent IPv6 address 3501 inside the movement assistance management table 3229 is set to the foreign IPv6 address inside the IPv6 header 1701 and the IPv6 address of the foreign IPv4 mobile agent 3208 itself is set to the foreign IPv6 address 1703.

If the registration flag 3502 is not found the "real registration" as a result of the judgement (Step 4002NO), the transfer-to-home IPv4 mobile agent processing portion 3225 discards this packet (Step 4004). The transfer-to-home IPv4 mobile agent processing portion 3225 completes the processing and thereafter repeats the processing described above.

Figure 41:
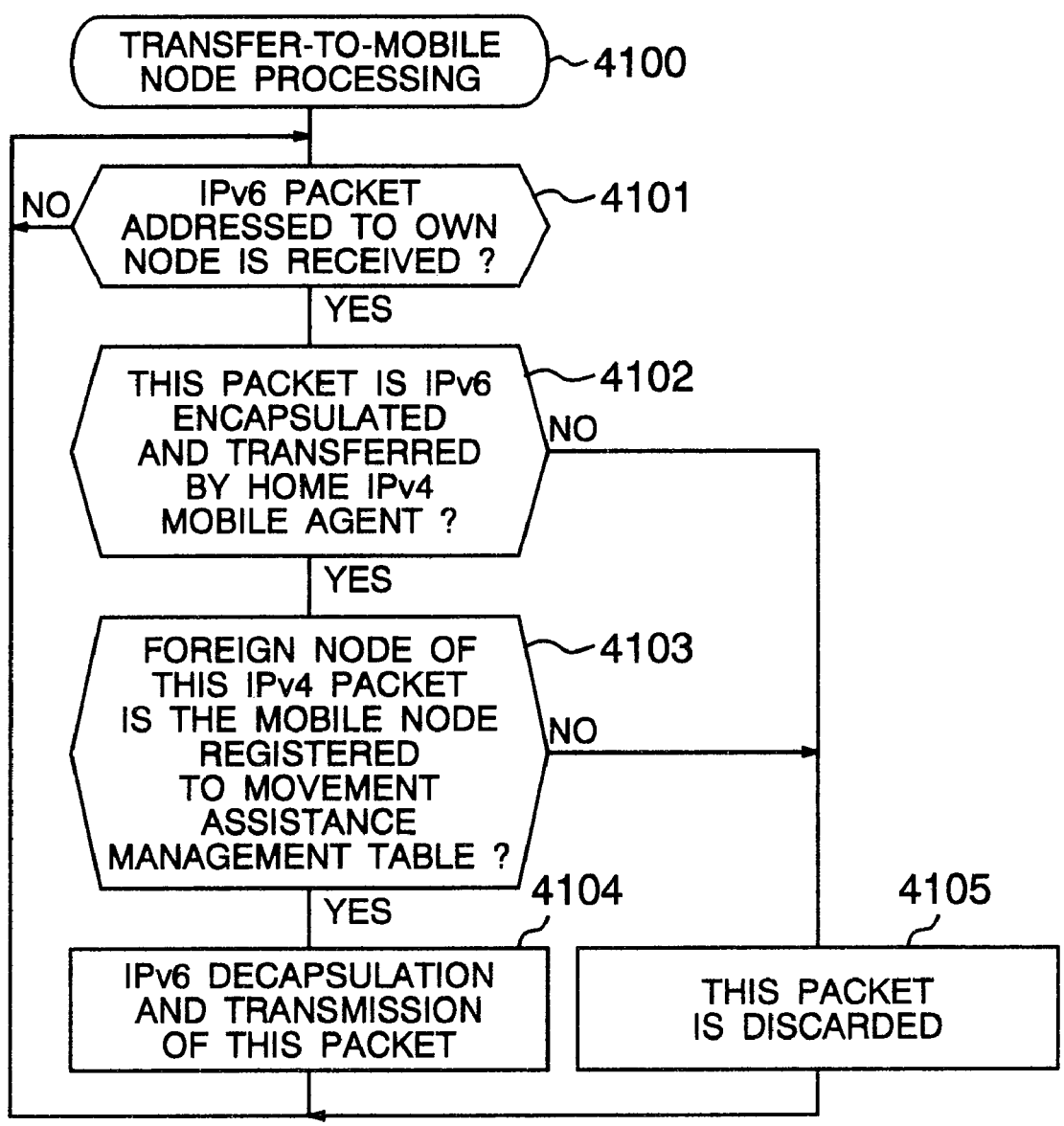
FIG. 41 is an operation flowchart showing an example of the procedure of a transfer-to-mobile node processing in the foreign IPv4 mobile agent shown in FIG. 32.

FIG. 41 is a flowchart showing an example of the processing of the transfer-to-other mobile node processing portion 3227 which executes the processing for transferring the packet to the IPv4/v6 mobile node 1806 when the IPv4 packet transmitted by other IPv4 node to the IPv4/v6 mobile node 1806 by the home IPv4 mobile agent 3206 is encapsulated by IPv6 encapsulation and is transferred, in the foreign IPv4 mobile agent 3208.

The transfer-to-mobile node processing portion 3227 first judges whether or not the IPv6 packet addressed to the foreign IPv4 mobile agent 3208 itself is received (Step 4101). If it is found received as a result of this judgement (Step 4101YES), the transfer-to-mobile node processing portion 3227 then judges whether or not the received packet is the IPv4 packet which is IPv6 encapsulated and transferred by the home IPv4 mobile agent 3206 (Step 4102). Incidentally, this transfer of the IPv4 packet by the home IPv4 mobile agent 3206 is executed by the home IPv4 movement assistance processing portion 3219 described above. If the packet is not the transferred IPv4 packet as a result of the judgement (Step 4102NO), the transfer-to-mobile node processing portion 3227 discards this packet (Step 4105). If it is the transferred IPv4 packet (Step 4102YES), the transfer-to-mobile node processing portion 3227 further judges whether or not the node of this IPv4 packet is the mobile node registered really to the movement assistance management table 3229 (Step 4103). If the node is not found registered really (Step 4103NO) as a result of this judgement, the transfer-to-mobile node processing portion 3227 discards the packet (Step 4105). If it is found registered really (Step 4103YES), the transfer-to-mobile node processing portion 3227 decapsulates this packet by IPv6 decapsulation and transfers the packet to the IPv4/v6 mobile agent 1806 (Step 4104).

The transfer-to-other node processing is completed and thereafter the processing described above is repeatedly executed.

The flow of the processings shown in FIG. 22 and in FIGS. 36 to 41 will be explained with reference to the network system shown in FIG. 32. When the IPv4/v6 mobile node 1806 exists on the LAN-c 3200 as the home network, the IPv4/v6 mobile node 1806 is judged as not moving because it receives the IPv4 movement detection message and the IPv6 movement detection message transmitted by the home IPv4 mobile agent 3206 and the IPv6 mobile agent-c 3207, respectively.

When the IPv4/v6 mobile node 1806 has moved to the LAN-d 3201, the IPv4/v6 mobile node 1806 is judged as having moved to another network because it receives the IPv4 movement detection message and the IPv6 movement detection message transmitted by the foreign IPv4 mobile agent 3208 and the IPv6 mobile agent-d 3209, respectively. Then, the IPv4/v6 mobile node transmits the IPv4 movement registration request message 4200 and the IPv6 movement registration request message 3000 by means of the IPv4 movement processing portion 1813 and the IPv6 movement processing portion 1815 to the home IPv4 mobile agent 3206 and to the IPv6 mobile agent-c 3207, respectively.

To this IPv4 movement registration request message 4200 are set "10.0.0.1" (home IPv4 mobile agent 3206) as the foreign IPv4 address 1402, "10.0.0.30" as its own IPv4 address 3202 and "20.0.0.30" (as the foreign IPv4 address which the IPv4/v6 mobile node 1806 acquires from the foreign IPv4 mobile agent 3208 in the foreign LAN-d 3201 in this embodiment), as the transfer IPv4 address.

In this embodiment, the IPv4 packet cannot come out from the LAN-d 3201 beyond the router to the external network as described above but can transmit/receive the IPv4 packet inside the LAN-d 3201. Therefore, the IPv4/v6 mobile node 1806 can receive the IPv4 movement detection message transmitted by the foreign IPv4 mobile agent 3208 and can also transmit the IPv4 movement registration request message 4200 to the LAN-d 3201.

This IPv4 movement registration request message 4200 is once received by the foreign IPv4 mobile agent 3208. The foreign IPv4 mobile agent 3208 adds the IPv6 header 1701, in which "11::1" (home IPv4 mobile agent 3206) is set as the foreign IPv6 address 1702 and "21::1" (foreign IPv4 mobile agent 3208) is set as the home IPv6 address 1703, to this message 4200 by means of its foreign IPv4 movement assistance processing portion 3223, and transfers the message to the home IPv4 mobile agent 3206. Thereafter, this message is received by the home IPv4 mobile agent 3206. After receiving this message, the home IPv4 mobile agent 3206 adds the IPv6 header 1701, in which "21::1" (foreign IPv4 mobile agent 3206) is set as the foreign IPv6 address 1702) and "11::1" (home IPv4 mobile agent 3208) is set as the home IPv6 address 1703, to the IPv4 movement registration permission message 4301 by means of its IPv4 movement assistance processing portion 3216, and transfers the message to the foreign IPv4 mobile agent 3208. Receiving this message, the foreign IPv4 mobile agent 3208 decapsulates the message by IPv6 decapsulation by its foreign IPv4 movement assistance processing portion 3223 and transmits the message to the IPv4/v6 mobile node 1806.

In this way, registration of the movement of the IPv4/v6 mobile node 1806 to the home IPv4 mobile agent 3206 is completed. At this time, "10.0.0.30" is set as the information of the IPv4/v6 mobile node 1806 to the mobile node IPv4 address 3300 of the mobile node management table 3217, "20.0.0.30" is set to the foreign IPv4 address 3301 and "21::1" is set to the foreign IPv4 mobile agent IPv6 address 3302. Further, "10.0.0.30" is set to the mobile node IPv4 address 3500 of the movement assistance management table 3229 and "11::1" is set to the foreign IPv4 mobile agent IPv6 address 3501.

Receiving the IPv4 packet transmitted from the IPv4 node 3203 to the IPv4/v6 mobile node 1806, the home IPv4 mobile agent 3206 adds the header 1701, in which "21::1" (foreign IPv4 mobile agent 3208) is set to the foreign IPv6 address 1702 and "11::1" (home IPv4 mobile agent 3206) is set to the home IPv6 address 1703, to the IPv4 packet by means of the transfer-to-foreign IPv4 mobile agent processing portion 3219, and transfers the packet to the foreign IPv4 mobile agent 3208. The IPv6 encapsulated packet is received by the foreign IPv4 mobile agent 3208. The foreign IPv4 mobile agent 3208 decapsulates this packet by IPv6 decapsulation by its transfer-to-node processing portion 3227 and transmits it to the IPv4/v6 mobile node 1806. The IPv4/v6 mobile node 1806 receives and processes this packet as the IPv4 packet in accordance with the procedure of the ordinary Mobile IPv4.

When the IPv4/v6 mobile node 106 receives the IPv4 packet transmitted to the IPv4 node 3203, on the contrary, the foreign IPv4 mobile agent 3208 adds the IPv6 header 1701, in which "11::1" (home IPv4 mobile agent 3206) is set to the foreign IPv6 address 1702 and "21::1" (foreign IPv4 mobile agent 3208) is set to the home IPv6 address 1703, to the packet by means of the transfer-to-home IPv4 mobile agent processing portion 3205 and transmits the packet to the home IPv4 mobile agent 3206. The IPv6 encapsulated packet is received by the home IPv4 mobile agent 3206. The home IPv4 mobile agent 3206 decapsulates this packet by IPv6 decapsulation by its transfer-to-other node processing portion 3221 and then transmits it to the foreign IPv4 node 3203. The IPv4 node 3203 receives and processes this packet as the ordinary IPv4 packet.

According to the present invention described above, even when the IPv4/v6 mobile node 1806 moves from the LAN-c 3200 as the IPv4/v6 network to the LAN-d 3201 as the IPv6 network, the IPv4/v6 mobile node 1806 can receive the IPv4 packet transmitted by the IPv4 node 3203 to the IPv4/v6 mobile node 1806. On the contrary, the existing IPv4 node 3203 can receive the IPv4 packet transmitted by the IPv4/v6 mobile node 1806 to the IPv4 node 3203.

Communication by making use of the IPv6 between other node and the IPv4/v6 mobile node 1806 can be made by the assistance of movement by the IPv6 mobile agent-c 3207 supporting the IPv6 and by the assistance of movement of the node in the IPv6 by the IPv6 mobile agent-d 3209.

Incidentally, when the IPv4/v6 mobile node 1806 returns from the LAN-d 3201 to the LAN-c 3200, the IPv4/v6 mobile node 1806 detects its return to the home network by the IPv4 movement processing 1813 described already. Then, the IPv4/v6 mobile node 1806 transmits the IPv4 movement registration request message, in which "10.0.0.30" is set to its own address 4202 and "10.0.0.30" having the same address as its own IPv4 address 4202 to the foreign IPv4 address 4203, to the home IPv4 mobile agent 3206. Receiving this IPv4 movement registration request message 4200, the home IPv4 mobile agent 3206 judges that the IPv4/v6 mobile node 1806 has returned to the LAN-c 3200 as the home network because its own IPv4 address 4202 in the message has the same address as that of the foreign IPv4 address 4203, and then deletes the information of this mobile node in the mobile node management table 3217. As a result, the IPv4/v6 mobile node 1806 can make communication by utilizing the ordinary IPv4. Similarly, the IPv4/v6 mobile node 1806 reports the return to the LAN-c 3200 by the IPv6 movement registration request message 3000 to the IPv6 mobile agent-c 3207, too, in accordance with the processing procedure of the Mobile IPv6. Therefore, communication utilizing the ordinary IPv6 can be made, as well.

The invention claimed is:

1. In a network in which a first Internet Protocol (IP) network and a second IP network are mutually connected, the first IP network allowing communications compliant with a first kind of IP and a second kind of IP, and the second IP network allowing communications compliant with the first kind of IP, a method for controlling, by a mobile agent, a mobile node that can perform communications compliant with the second kind of IP with another mobile node belonging to the first IP network when the mobile node can perform communications compliant with the second kind of IP is moved from the first IP network to the second IP network, comprising:

a step of encapsulating, by a first mobile agent belonging to the first IP network, a first kind of IP header to an IP packet compliant with the second kind of IP transmitted from said another mobile node to the mobile node moved from the first IP network to the second IP network, the first IP header setting, as a transmission destination address, an IP address compliant with the first kind of IP of a second mobile agent belonging to the second IP network, and setting, as a transmission source address, an IP address compliant with the first kind of IP of the first mobile agent;

a step of transmitting, to the second mobile agent, the IP packet encapsulated with the first kind of IP header; and a step of decapsulating, by the second mobile agent, the first kind of IP header from the IP packet, and thereafter transmitting the IP packet to the mobile node.

2. The method according to claim 1, wherein the first kind of IP is IPv4 and the second kind of IP is IPv6.

3. The method according to claim 1, wherein the first kind of IP is IPv6 and the second kind of IP is IPv4.

4. In a network in which a first Internet Protocol (IP) network and a second IP network are mutually connected, the first IP network allowing communications compliant with a first kind of IP and a second kind of IP, and the second IP network allowing communications compliant with the first kind of IP, a method for controlling, by a mobile agent, a mobile node that can perform communications compliant with the second kind of IP with another mobile node belonging to the first IP network when the mobile node that can perform communications compliant with the second kind of IP is moved from the first IP network to the second IP network, comprising:

a step of encapsulating, by a first mobile agent belonging to the first IP network, a second kind of IP header to an IP packet compliant with the second kind of IP transmitted from said another mobile node to the mobile node moved from the first IP network to the second IP network, the second kind of IP header setting, as a transmission destination address, an IP address compliant with the second kind of IP of the mobile node regarding the second IP network, and setting, as a transmission source address, an IP address compliant with the second kind of IP of the first mobile agent, and thereafter further encapsulating thereto the first kind of IP header setting, as a transmission destination address, an IP address compliant with the first kind of IP of a second mobile agent belonging to the second IP network, and setting, as a transmission source address, an IP address compliant with the first kind of IP of the first mobile agent;

a step of transmitting, to the second mobile agent, the IP packet encapsulated with the second kind of IP header and the first kind of IP header; and a step of decapsulating, by the second mobile agent, the first kind of IP header from the IP packet thus transmitted, and thereafter transmitting the IP packet to the mobile node.

5. The method according to claim 4, wherein the first kind of IP is IPv4 and the second kind IP is IPv6.

6. The method according to claim 4, wherein the first kind of IP is IPv6 and the second kind of IP is IPv4.

7. In a network in which a first Internet Protocol (IP) network and a second IP network are mutually connected, the first IP network allowing communications compliant with a first kind of IP and a second kind of IP, and the second IP network allowing communications compliant with the first kind of IP, a method for controlling, by a mobile agent, a mobile node that can perform communications compliant with the second kind of IP with another mobile node belonging to the first IP network when the mobile node that can perform communications compliant with the second kind of IP is moved from the first IP network to the second IP network, comprising:

a step of encapsulating, by a second mobile agent belonging to the second IP network, a first kind of IP header to an IP packet compliant with the second kind of IP transmitted from the mobile node moved from the first IP network to the second IP network to said another mobile node, the first IP header setting, as a transmission destination address, an IP address compliant with the first kind of IP of a first mobile agent belonging to the first IP network, and setting, as a transmission source address, an IP address compliant with the first kind of IP of the second mobile agent;

a step of transmitting, to the first mobile agent, the IP packet encapsulated with the first kind of IP header; and a step of decapsulating, by the first mobile agent, the first kind of IP header from the IP packet to thereafter transmit the IP packet to said another mobile node.

8. The method according to claim 7, wherein the first kind of IP is IPv4 and the second kind of IP is IPv6.

9. The method according to claim 7, wherein the first kind of IP is IPv6 and the second kind of IP is IPv4.

10. In a network in which a first IP (Internet Protocol) network and a second IP network are mutually connected, the first IP network allowing communications compliant with a first kind of IP and a second kind of IP, and the second IP network allowing communications compliant with the first kind of IP, a method for controlling, by a mobile agent, a mobile node that can perform communications compliant with the second kind of IP with another mobile node belonging to the first IP network when the mobile node that can perform communications compliant with the second kind of IP is moved from the first IP network to the second IP network, comprising:

- a step of encapsulating, by a second mobile agent belonging to the second IP network, a first kind of IP header to a movement registration request message received from the mobile node moved from the first IP network to the second IP network and compliant with the second kind of IP of a first mobile agent belonging to the first IP network for notifying to the first mobile agent that the mobile node moved, and setting, as a transmission source address, an IP address compliant with the first kind of IP of the second mobile agent;

- a step of transmitting, to the first mobile agent, the movement registration request encapsulated with the first kind of IP header;

- a step of encapsulating, by said first mobile agent, a first kind of IP header to a message compliant with the second kind of IP, for permitting movement of the mobile node, the first kind of IP header setting, as a transmission destination address, an IP address compliant with the first kind of IP of the second mobile agent, and setting, as a transmission source address, an IP address compliant with the first kind of IP of the first mobile agent;

- a step of transmitting, to the second mobile agent, the message encapsulated with the first kind of IP header; and

- a step of decapsulating, by the second mobile agent, the first kind IP header from the message, and thereafter transmitting the message to the mobile node.

11. The method according to claim 10, wherein the first kind of IP is IPv4 and the second kind of IP is IPv6.

12. The method according to claim 10, wherein the first kind of IP is IPv6 and the second kind of IP is IPv4.

* * * * *